US007333963B2

(12) United States Patent
Widrow et al.

(10) Patent No.: US 7,333,963 B2
(45) Date of Patent: Feb. 19, 2008

(54) COGNITIVE MEMORY AND AUTO-ASSOCIATIVE NEURAL NETWORK BASED SEARCH ENGINE FOR COMPUTER AND NETWORK LOCATED IMAGES AND PHOTOGRAPHS

(76) Inventors: Bernard Widrow, 860 Lathrop Dr., Stanford, CA (US) 94305; Juan Carlos Aragon, 340 Ventura Ave., Apt. 16, Palo Alto, CA (US) 94306; Brian Mitchell Percival, 456 Fernando Ave., Palo Alto, CA (US) 94306

( * ) Notice: Subject to any disclaimer, the term of this patent is extended or adjusted under 35 U.S.C. 154(b) by 0 days.

(21) Appl. No.: 11/245,860

(22) Filed: Oct. 7, 2005

(65) Prior Publication Data
US 2006/0133699 A1 Jun. 22, 2006

Related U.S. Application Data

(60) Provisional application No. 60/617,245, filed on Oct. 7, 2004.

(51) Int. Cl.
*G06E 1/00* (2006.01)
*G06E 3/00* (2006.01)
*G06F 15/18* (2006.01)
*G06G 7/00* (2006.01)
*G06N 3/08* (2006.01)
*G06K 9/62* (2006.01)

(52) U.S. Cl. ............... 706/18; 706/20; 706/25; 706/934; 382/155; 382/159

(58) Field of Classification Search .......... 706/15, 706/16, 18, 20, 25, 934; 382/155, 159
See application file for complete search history.

(56) References Cited

U.S. PATENT DOCUMENTS

| 4,939,749 A | | 7/1990 | Zurcher | |
| 5,131,055 A | * | 7/1992 | Chao | 382/214 |
| 5,257,389 A | * | 10/1993 | Liu et al. | 706/18 |
| 5,465,308 A | * | 11/1995 | Hutcheson et al. | 382/159 |
| 5,481,621 A | * | 1/1996 | Kuratomi et al. | 382/156 |
| 6,014,653 A | * | 1/2000 | Thaler | 706/16 |

(Continued)

OTHER PUBLICATIONS

Jacobs,C.E. et. al. "Fast Multiresolution Image Querying" 1995.*

(Continued)

*Primary Examiner*—David Vincent
*Assistant Examiner*—Benjamin Buss

(57) ABSTRACT

Designs for cognitive memory systems storing input data, images, or patterns, and retrieving it without knowledge of where stored when cognitive memory is prompted by query pattern that is related to sought stored pattern. Retrieval system of cognitive memory uses autoassociative neural networks and techniques for pre-processing query pattern to establish relationship between query pattern and sought stored pattern, to locate sought pattern, and to retrieve it and ancillary data. Cognitive memory, when connected to computer or information appliance introduces computational architecture that applies to systems and methods for navigation, location and recognition of objects in images, character recognition, facial recognition, medical analysis and diagnosis, video image analysis, and to photographic search engines that when prompted with a query photograph containing faces and objects will retrieve related photographs stored in computer or other information appliance, and will identify URL's of related photographs and documents stored on the World Wide Web.

20 Claims, 38 Drawing Sheets

U.S. PATENT DOCUMENTS

| | | | |
|---|---|---|---|
| 6,038,337 A * | 3/2000 | Lawrence et al. | ........... 382/155 |
| 6,418,424 B1 * | 7/2002 | Hoffberg et al. | ............... 706/21 |
| 6,937,978 B2 | 8/2005 | Liu | |
| 2003/0053647 A1 | 3/2003 | Kates | |

OTHER PUBLICATIONS

Antani,S. et. al. "A Biomedical Information System for Combined Content-Based Retrieval of Spine X-ray Images and Associated Text Information" 2002.*

Zhang,B-L. et. al. "Face Recognition by Applying Wavelet Subband Representation and Kernel Associative Memory" 2004.*

Kulkarni,S. et. al. "An Intelligent Hybrid Approach for Content-Based Image Retrieval" 2002.*

Niblack,W. et. al. "Updates to the QBIC System" 1997.*

Zhang,J. et. al. "Face Recognition: Eigenface, Elastic Matching, and Neural Nets" 1997.*

Niblack,W. et. al. "The QBIC Project: Querying Images By Content Using Color, Texture, and Shape" 1993.*

Hjelmås,E. et. al. "Face Detection: A Survey" 2001.*

Müller,H. et. al. "A Review of content-based image retrieval systems in medical applications—clinical benefits and future directions" Feb. 2004.*

Su,M-C. et. al. "Associative-Memory-Based Human Face Detection" 2001.*

Aitkenhead,M.J. et. al. "A neural network face recognition system" 2003.*

Catalan,J.A. et. al. "Dimension Reduction of texture features for image retrieval using hybrid associative neural networks" 2000.*

Kulkarni,S. et. al. "An Autoassociator for Automatic Texture Feature Extraction" 2001.*

Paquet,E. et. al. "Nefertiti: a query by content system for three-dimensional model an image databases management" 1999.*

Srihari,R.K. "Automatic Indexing and Content-Based retrieval of Captioned Images" 1995.*

Wang,J.Z. et. al. "SIMPLIcity Semantics—sensitive integrated Matching for Picture Libraries" 2001.*

Wu,J.K. "CORE: a content-based retrieval engine for multimedia information systems" 1995.*

* cited by examiner

(a)
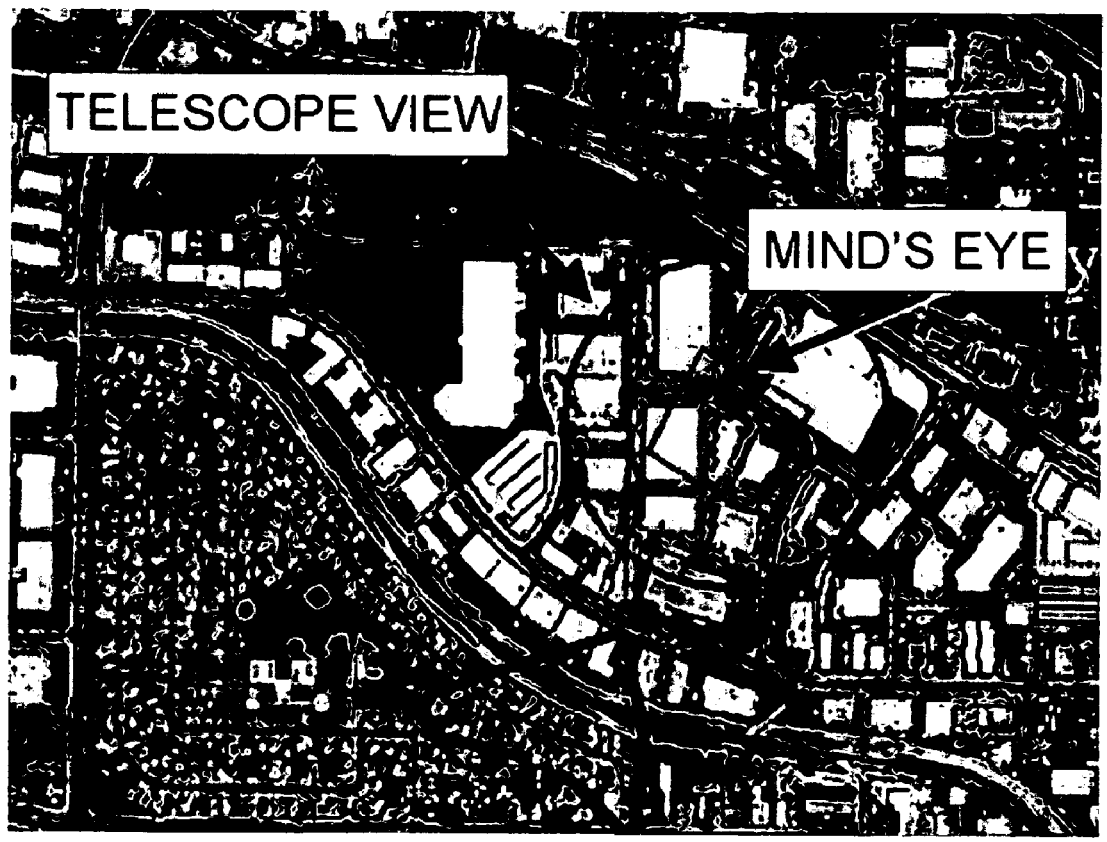
Fig 5 (b)

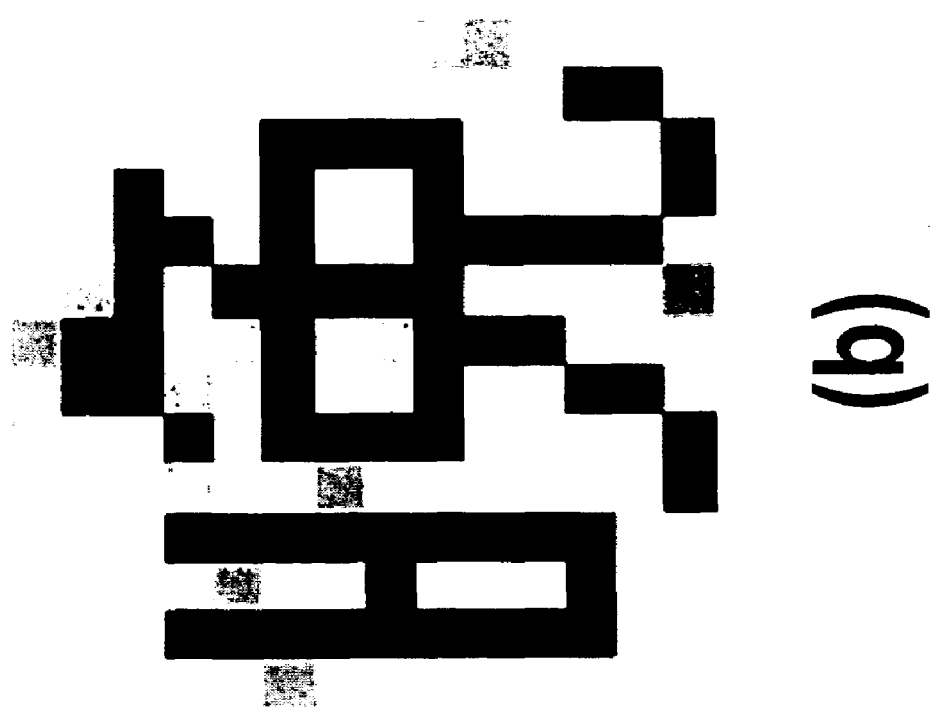
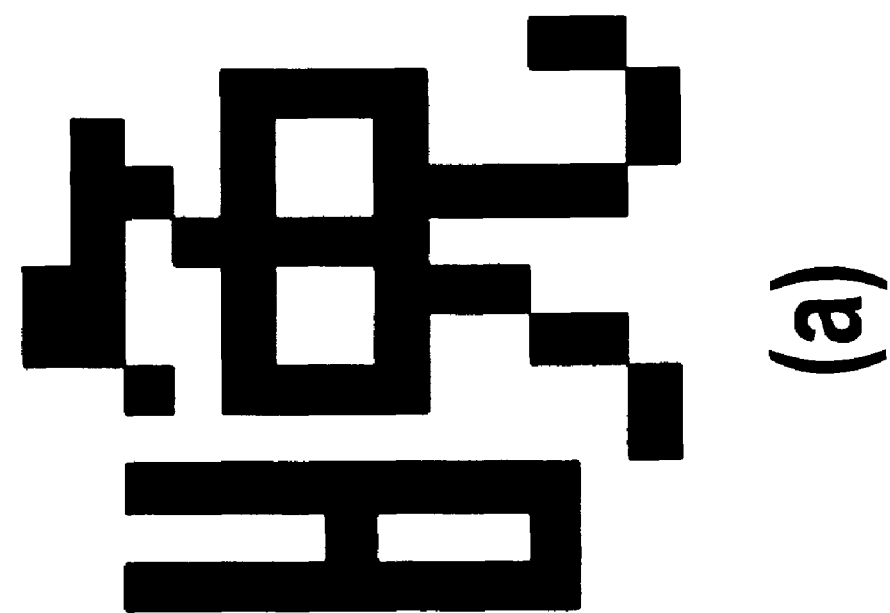
Fig 19

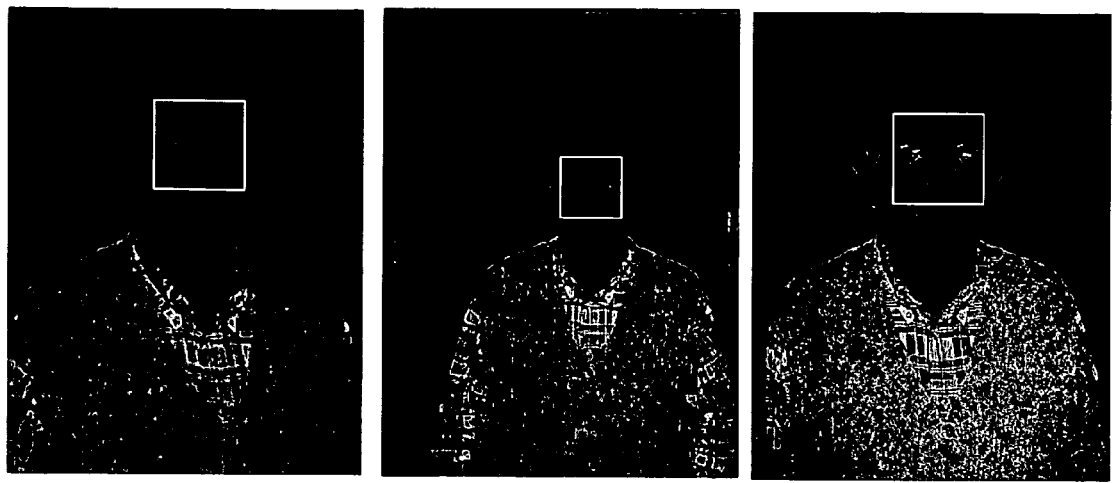
(a)
Fig 23 (b)

(a)
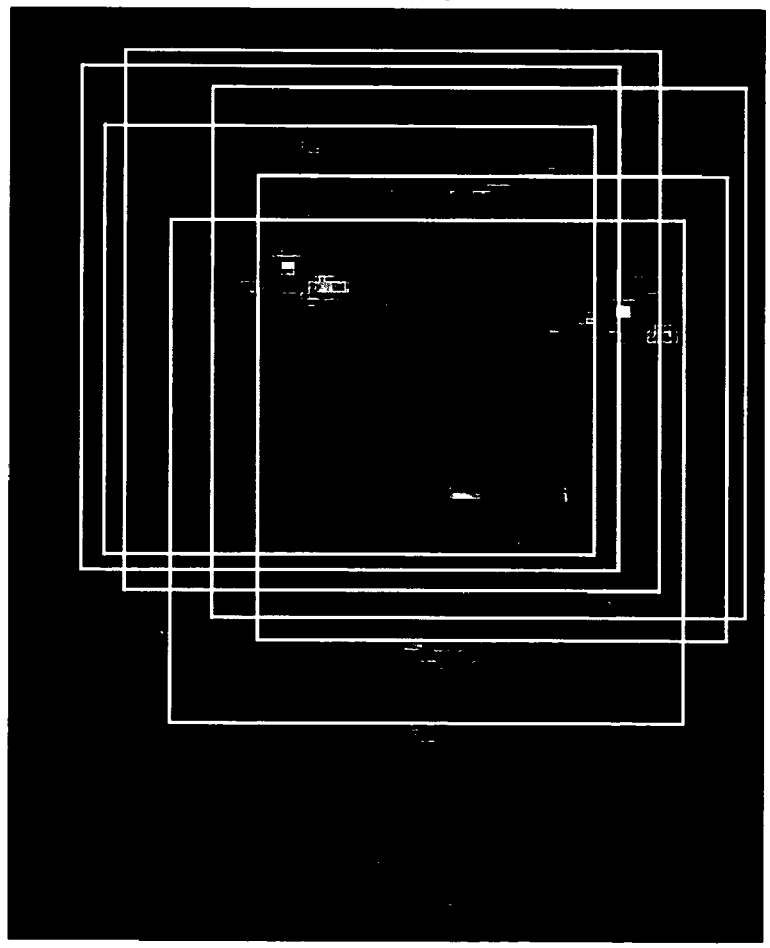
Fig 25 (b)

(a)
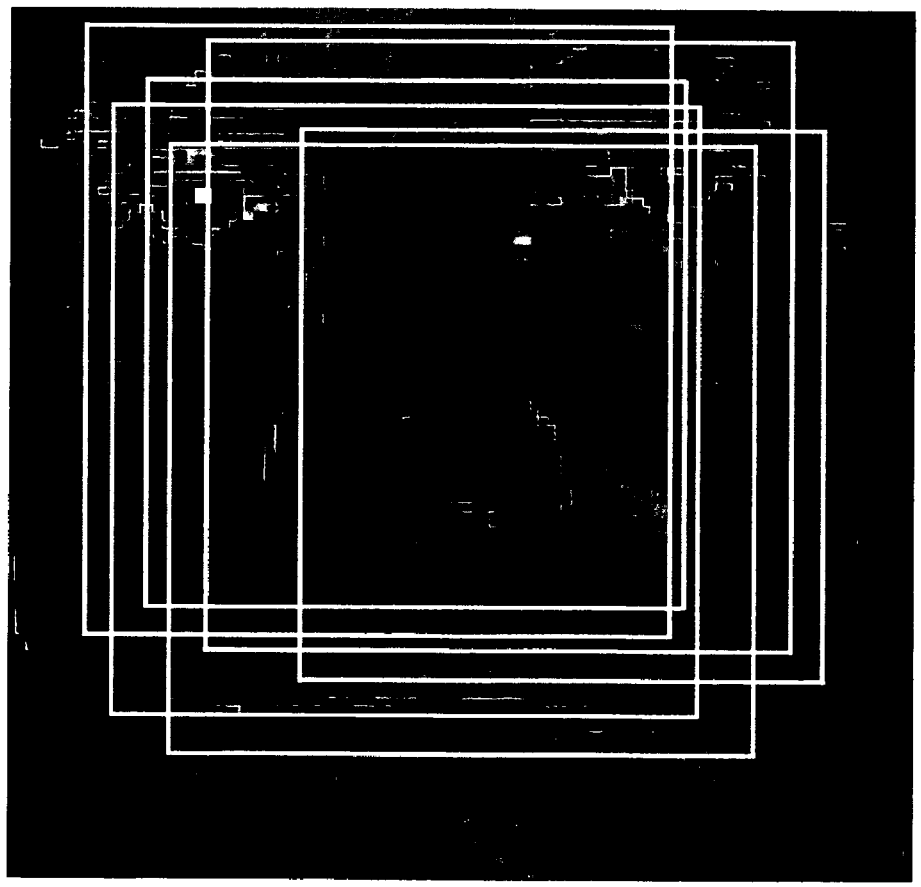
Fig 26 (b)

(a)
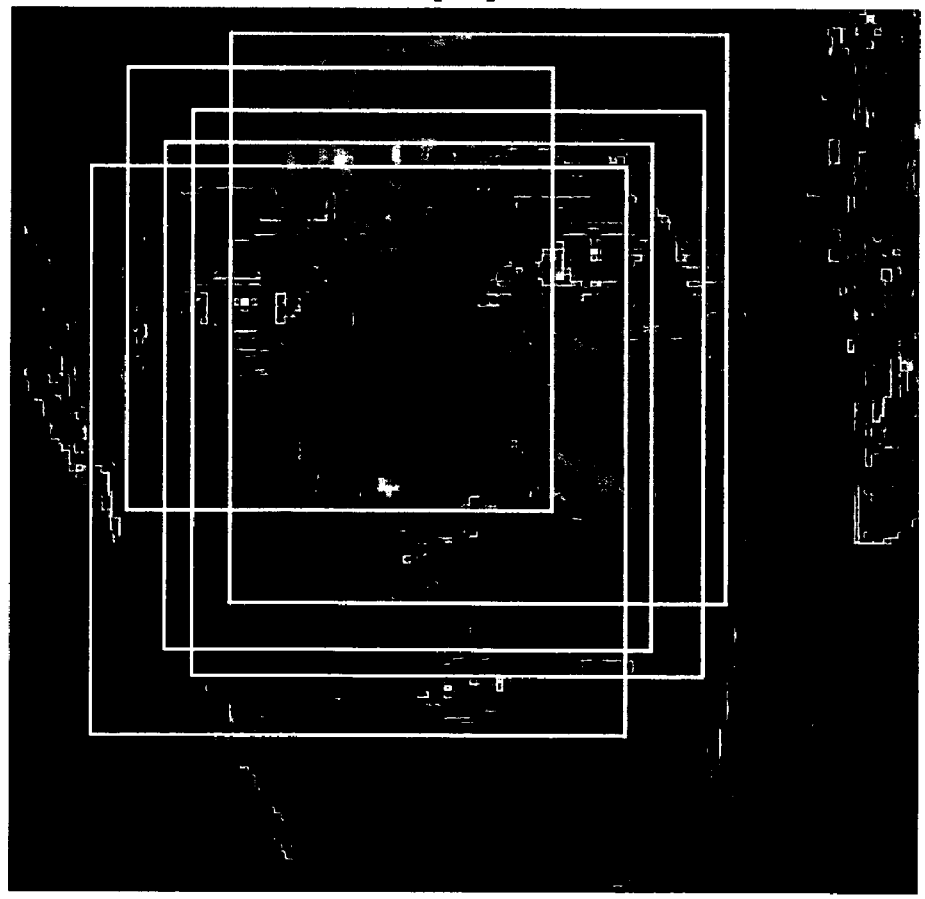
Fig 27 (b)

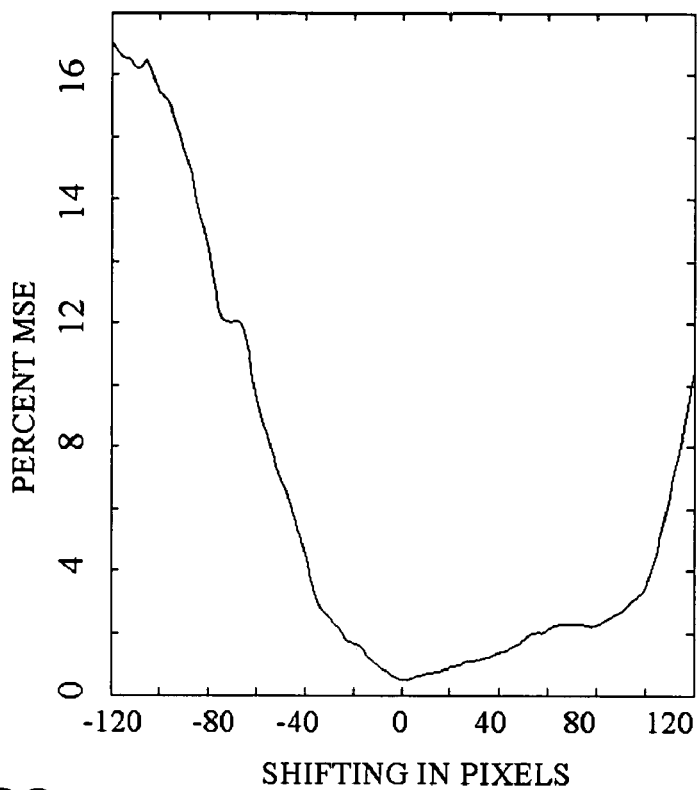
Fig 28 SHIFTING IN PIXELS (LEFT/RIGHT TRANSLATION)
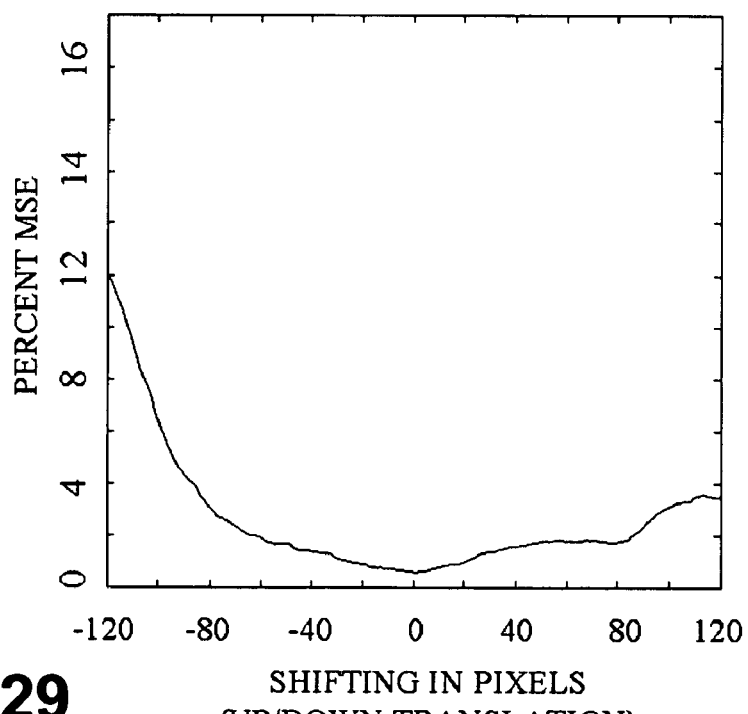
Fig 29 SHIFTING IN PIXELS (UP/DOWN TRANSLATION)

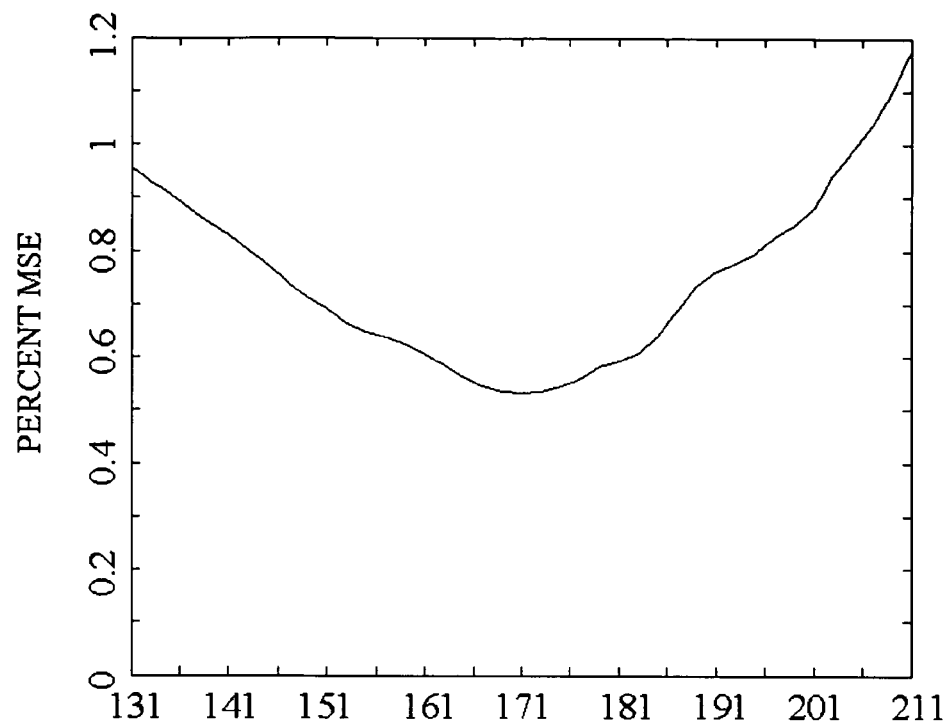
Fig 30 SIZE OF THE SENSING WINDOW IN PIXELS (ZOOMING IN AND OUT)
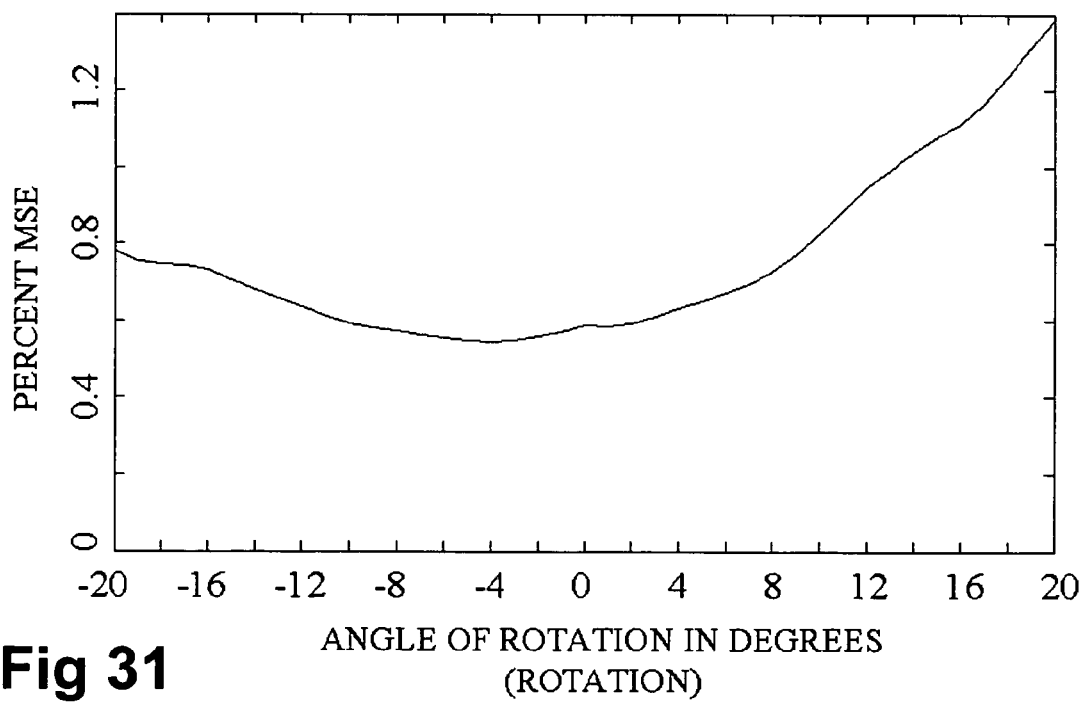
Fig 31 ANGLE OF ROTATION IN DEGREES (ROTATION)

COGNITIVE MEMORY AND AUTO-ASSOCIATIVE NEURAL NETWORK BASED SEARCH ENGINE FOR COMPUTER AND NETWORK LOCATED IMAGES AND PHOTOGRAPHS

RELATED APPLICATIONS

This application claims priority to U.S. Provisional Patent Application Ser. No. 60/617,245 filed Oct. 7, 2004, entitled "A Cognitive Memory", which is hereby incorporated by reference. U.S. patent application Ser. No. 11/145,861, filed 7 Oct. 2005 entitled System And Method For Cognitive Memory And Auto Associative Neural Network Based Pattern Recognition is also a related application.

FIELD OF THE INVENTION

This invention relates generally to the field of computer memory, pattern recognition, neural networks; and more particularly to cognitive memory systems and methods for pattern recognition and matching and systems and methods for searching and matching based on such computer memory structures, pattern recognition, and neural networks.

BACKGROUND OF THE INVENTION

With a conventional computer memory, numbers, data, patterns, etc. are stored in specific memory locations. When programming the computer, the programmer must be aware of the memory addresses where data is stored in order to retrieve this data when needed. The cognitive memory of this invention stores incoming data and patterns in any available location. The data and patterns are recovered without knowledge of where they are stored when the memory is prompted by an input pattern that is related to but not necessarily identical to the stored pattern. An autoassociative neural network is used to establish the relationship between the prompting pattern and the sought-after pattern.

Bracketed numbers refer to references listed in the References section of this specification. Modern pattern recognition techniques [22, 24, 35] are multifaceted and highly varied. Generally, patterns to be recognized are pre-processed with feature detection, biometric measurements, etc. and the pre-processed patterns are then fed to a classifier, which is trainable, often a neural network. The output of the classifier is usually a binary-coded vector that represents the class of the input pattern. The recognition system is trained with a set of training patterns. Once the system is trained, the training patterns are generally discarded, and the system is then set to classify patterns.

The methodology of the present invention differs from this. One difference is that the training patterns are retained and not discarded. They are stored in memory folders together with ancillary data, including their identifications. The pattern recognition process of this invention is a two-step procedure. The first step allows the input pattern to be modified in certain allowable ways (such as rotation, translation, scaling, etc.) in attempting to relate this input prompt to the stored training patterns. The autoassociative neural network indicates when and if the modified pattern matches one of the training patterns. If there is a "hit," the second step begins with a search for the matching training pattern. Once this is found, the contents of the memory folder storing the hit training pattern becomes available, which contains the identity of the input pattern and related ancillary data. The ancillary data may contain other patterns that could prompt further searches, establishing other connections between the recorded data in the memory folders. This could be used to relate time-sequential data such as video or audio patterns.

The cognitive memory of this invention is able to store within a unified electronic memory system visual inputs (pictures and sequences of pictures), auditory inputs (acoustic patterns and sequences of patterns), tactile inputs, inputs from other kinds of sensors such as radar, sonar, etc., and to retrieve stored content as required. The cognitive memory design described herein is based on concepts derived from life experience, from the literature of psychology, psychiatry, and neurobiology [6, 10, 23, 36, 40], and from years of research using artificial neural networks and adaptive and learning systems. Certain conjectures about human memory are key to the central idea. The design of a practical and useful memory system is described herein, a memory system that may also serve as a model for understanding many elements of human memory.

The memory system of this invention does not function like a computer memory in which specific data is stored in specific numbered registers or addresses, and retrieval is done by reading the contents of the specified memory register or address. Nor are data retrieved by matching keywords as with a conventional document search. The stored sensory data would neither have keywords nor would it be located in known or specified memory locations. Incoming sensory data would be stored at the next available empty memory location, and indeed could be stored redundantly at several empty locations. In any case, the location of any specific piece of recorded data would be unknown.

One form of retrieval is initiated by a prompt pattern from a current set of sensory inputs or input patterns. A search through the memory would be made to locate stored data that correlates with or relates to the present real-time sensory inputs. The search would be done by a retrieval system that makes use of autoassociative artificial neural networks [15].

Another form of retrieval is initiated by a prompt pattern which could be a pattern already stored in the memory or from a problem-solving element that would make use of retrieved memory output data. This form of retrieval resembles the phenomenon of human train-of-thought, in which one memory triggers another, which initiates a chain of memories. Each recalled sensory pattern, or memory, is used as a prompt to recall further memories.

A primary attribute of the proposed cognitive memory architecture is that it is scalable without performance degradation. Larger memories could store more sensory data, but storage and retrieval times would not increase with memory size.

Applications of cognitive memory systems to analysis of aerial imagery, human facial images, sounds, rote learning for game-playing, adaptive control systems, pattern recognition, and to other practical problems are possible.

REFERENCES

A list of references is provided corresponding to the bracketed reference numbers appearing throughout the specification. Each reference listed in the following list or otherwise identified in this patent application is incorporated by reference into this application.

[1] J. A Barnden. High-level reasoning, computational challenges for connectionism, and the Conposit solution. *Appl. Intell.*, 5(2):103-135, April 1995.

[2] B. E. Burnside, D. L. Rubin, and R. Shachter. A Bayesian network for mammography. Technical Report SMI-2001-0867, Stanford Medical Informatics, 2000.

[3] G. A. Carpenter and S. Grossberg. Adaptive resonance theory. In M. A. Arbib, editor, *The Handbook of Brain Theory and Neural Networks*, pages 87-90, MIT Press, Cambridge, Mass., 2nd edition, 2003.

[4] B. Denby, P. Garda, B. Granado, C. Kiesling, J.-C. Prevotet and A. Wassatch. Fast Triggering in High Energy Physics Experiments Using Hardware Neural Networks. *IEEE Trans. On Neural Networks*, 14(5):1010-1027, September 2003.

[5] R. O. Duda, P. E. Hart, and D. G. Stork. *Pattern Classification*. John Wiley & Sons, New York, 2nd edition, 2001.

[6] H. Eichenbaum. *The Cognitive Neuroscience of Memory: An Introduction*. Oxford University Press, New York, 2002.

[7] L. Esserman, H. Cowley, C. Eberle, A. Kirkpatrick, S. Chang, K. Berbaum, and A. Gale. Improving the accuracy of mammography: volume and outcome relationships. *J. Natl. Cancer Inst.*, 94(5):321-323, 6 Mar. 2002.

[8] K. Fukushima. Cognitron: a self-organizing multilayered neural network. *Biol. Cybern.*, 20(3-4): 127-136, 5 Nov. 1975.

[9] K. Fukushima and S. Miyake. A self-organizing neural network with a function of associative memory: feedback-type cognitron. *Biol. Cybern.*, 28(4):201-208, 3 Mar. 1978.

[10] J. M. Fuster. *Cortex and Mind: Unifying Cognition*. Oxford University Press, New York, 2002.

[11] R. Gadea, J. Cerda, F. Ballester and A. Mocholi. Artificial Neural Network Implementation on a single FPGA of a Pipelined On-Line Backpropagation. In *ISSS 2000, Madrid, Spain*, September 2000.

[12] S. Grossberg. Adaptive pattern classification and universal recoding: I. Parallel development and coding of neural feature detectors. *Biol. Cybern.*, 23(3):121-134, 30 Jul. 1976.

[13] S. Grossberg. Adaptive pattern classification and universal recoding: II. Feedback, expectation, olfaction, illusions. *Biol. Cybern.*, 23(4):187-202, 30 Aug. 1976.

[14] S. Haykin. *Neural Networks: A Comprehensive Foundation*. Prentice Hall, Upper Saddle River, N.J., 2nd edition, 1999.

[15] R. Hecht-Nielsen. *Neurocomputing*. Addison Wesley, Reading, Mass., 1989.

[16] R. Hecht-Nielsen. A theory of cerebral cortex. Technical Report 03.01, UCSD Institute for Neural Computation, La Jolla, Calif., 24 Oct. 2003.

[17] R. Hecht-Nielsen. A theory of thalamocortex. In R. Hecht-Nielsen and T. McKenna, editors. *Computational Models for Neuroscience: Human Cortical Information Processing*, pages 85-124. Springer Verlag, London, 2003.

[18] R. Hecht-Nielsen and T. McKenna, editors. *Computational Models for Neuroscience: Human Cortical Information Processing*, Springer Verlag, London, 2003.

[19] J. H. Holland. Genetic algorithms. *Sci. Am.*, 267(1):44-50, July 1992.

[20] T. Kohonen. *Self-Organization and Associative Memory*. Springer Verlag. Berlin, 3d edition, 1989.

[21] T. Kohonen. *Self-Organizing Maps*. Springer, Berlin, 3d edition, 2001.

[22] S. Y. Kung, M. W. and S. H. Lin. *Biometric Authentication: A Machine Learning Approach*. Prentice Hall PTR, Upper Saddle River, N.J., 2005.

[23] I. B. Levitan and L. K. Kaczmarek. *The Neuron: Cell and Molecular Biology*. Oxford University Press, New York, 2001.

[24] G. Medioni and S. B. Kang, editors. *Emerging Topics in Computer Vision*. Prentice Hall PTR, Upper Saddle River, N.J., 2004.

[25] D. E. Meyer and D. E. Kieras. A computational theory of executive cognitive processes and multiple-task performance: I. Basic mechanisms. *Psychol. Rev.*, 104(1):3-65, January 1997.

[26] D. E. Meyer and D. E. Kieras. A computational theory of executive cognitive processes and multiple-task performance: II. Accounts of psychological refractory-period phenomena. *Psychol. Rev.*, 104(4):749-791, January 1997.

[27] D. E. Meyer and D. E. Kieras. An overview of the EPIC architecture for cognition and performance with applications to human-computer interaction. *Hum.-Comp. Interact.*, 12(4)391-438, 1997.

[28] C. L. Nash, K. O. Perlmutter, and R. M. Gray. Evaluation of Bayes risk weighted vector quantization with posterior estimation in the detection of lesions in digitized mammograms. In *Proc. Asilomar Conf. Signals Syst. Computers*, volume 1, pages 716-720, Pacific Grove, Calif., October-November 1994.

[29] A. Newell. *Unified Theories of Cognition*. Harvard University Press. Cambridge, Mass. 1990.

[30] K. R. Nichols. A Reconfigurable Computing Architecture for Implementing Artificial Neural Networks on FPGA. Master's Thesis, The University of Guelph, December 2003.

[31] F. Rosenblatt. The perceptron: a probabilistic model for information storage and organization in the brain. *Psychol., Rev.*, 65(6):386-408, 1958.

[32] A. L. Samuel. Some studies in machine learning using the game of checkers. *IBM J. Res. Dev.*, 3(3):210-229, 1959.

[33] A. L. Samuel. Some studies in machine learning using the game of checkers II. *IBM J. Res. Dev.*, 11(6)601-617, 1967.

[34] W. B. Scoville and B. Milner. Loss of recent memory after bilateral hippocampal lesions. *J. Neurol. Neurosurg. Psychiatry*, 20(1):11-21, 1957.

[35] L. G. Shapiro and G. C. Stockman. *Computer Vision*. Prentice Hall, Upper Saddle River, N.J., 2001.

[36] G. M. Shepherd, editor. *The Synaptic Organization of the Brain*. Oxford University Press, New York, 5th edition, 2003.

[37] L. R. Squire. Memory and the hippocampus: a synthesis from findings with rats, monkeys and humans. *Psychol. Rev.*, 99(2)195-231, April 1992.

[38] K. Steinbuch. Die Learnmatrix. *Kybemetik*, 1(1):36-45, 1961.

[39] K. Steinbuch and U. A. W. Piske. Learning matrices and their applications. *IEEE Trans. Electron. Computers*, 12:846-862, 1963.

[40] L. W. Swanson. *Brain Architecture: Understanding the Basic Plan*. Oxford University Press. New York, 2003.

[41] E. Thurfjell, M. G. Thurfjell, E. Egge, and N. Bjurstam. Sensitivity and specificity of computer-assisted breast cancer detection in mammography screening. *Acta Radiol.*, 39(4):384-388, July 1998.

[42] M. P. Walker. A refined model of sleep and the time course of memory formation. Accepted for publication in *Behav. Brain Sci.*, 2004.

[43] P. J. Werbos. Beyond Regression: New Tools for Prediction and Analysis in the Behavioral Sciences. PhD thesis, Harvard University, Cambridge, Mass., August 1974.

[44] B. Widrow and M. E. Hoff. Adaptive switching circuits. In *IRE WESCON Conv. Rec.*, volume 4, pages 96-104, 1960.

[45] B. Widrow and M. Kamenetsky. On the efficiency of adaptive algorithms. In S. Haykin and B. Widrow, editors, *Least-Mean-Square Adaptive Filters*. John Wiley & Sons, New York, 2003.

[46] B. Widrow and M. Kamenetsky. Statistical efficiency of adaptive algorithms. *Neural Netw.*, 16(5-6):735-744, June-July 2003.

[47] B. Widrow and M. A. Lehr. 30 years of adaptive neural networks: perception, Madaline, and backpropagation. *Proc. IEEE*, 78(9):1415-1442, September 1990.

[48] B. Widrow and S. D. Stearns. *Adaptive Signal Processing*. Prentice Hall, Upper Saddle River, N.J., 1985.

[49] M. Young, R. G. Eggleston, and R. Whitaker. Direct manipulation interface techniques for interaction with software agents. In *Proc. RTO Human Factors Med. Panel Symp.*, 19-1-19-10, Oslo, Norway, April 2000.

[50] M. Young, R. G. Eggleston, and R. Whitaker. Direct manipulation interface techniques for interaction with software agents. In *Proc. RTO Human Factors Med. Panel Symp.*, 19-1-19-10, Oslo, Norway, April 2000.

SUMMARY

In one aspect, the invention provides systems, methods, and designs for a "cognitive" memory system patterned after human memory. A conventional computer with a conventional memory can be connected to this cognitive memory to create a new and enhanced computer architecture, capable of solving problems in the fields of pattern recognition, speech recognition, adaptive control, and information retrieval based on images, sounds and other sensory inputs.

It is another aspect, the invention provide systems, methods, and designs for applications of the cognitive memory to navigation systems, to location and recognition of objects seen in photographs or images, to character recognition, to searching photographs stored on computers or other information appliances, such as desktop computers, laptop computers, handheld computers, personal digital assistants, or mobile telephones, for selected objects or people, to surveillance and security image analysis, to recognition of facial images, to searching for photographs of selected objects and people stored on the World Wide Web, to medical image analysis and diagnosis, and to video image analysis.

In another aspect the invention provides a cognitive memory comprising a system including sensory devices that provide input data such as optical patterns, acoustic patterns, tactile patterns, radar patterns, sonar patterns, and the like; conventional memory devices for storing such patterns; and a data retrieval system, based on autoassociative artificial neural networks, for recovering stored information containing patterns that match incoming prompting patterns. Many applications for such a memory are possible. A set of applications described herein are pattern recognition, object location, navigation, character recognition, recognition of human faces, surveillance, search of computer-stored photographs, and search of photographs stored on the World Wide Web or on information appliances interconnected through similar networks.

In another aspect, the invention provides a cognitive memory system for storing in the form of patterns input data or information, wherein subsequent retrieval of said patterns from said cognitive memory system is accomplished in response to related, but not necessarily identical, input query patterns.

In another aspect, the invention provides a cognitive memory system for storing sensory input data and patterns, said data and patterns stored in memory folders, each memory folder capable of storing a plurality of patterns, storing simultaneously inputted patterns from a plurality of sensors, storing other ancillary data, a retrieval system capable of retrieving the contents of each said memory folder when presented with a related prompt pattern, derived from an input query pattern, and a system capable of relating said prompt pattern to one of the patterns stored in said memory folders.

In another aspect, the invention provides a method for accessing sensory data and patterns, said method comprising: storing sensory input data and patterns in a memory element of a memory data structure, each memory element of said memory data structure capable of simultaneously receiving a plurality of input data and patterns from a plurality of sensors, and storing said plurality of input data and patterns and optionally storing other ancillary data associated with said input data and patterns; retrieving a contents of at least one of said plurality of memory elements of said memory data structure in response to receiving a related prompt pattern, the prompt pattern derived from an input query pattern; and relating said prompt pattern to one of the plurality of input data or patterns stored in one of said memory elements of said memory data structure. In another aspect, the invention provides for the method being implemented as a computer program and computer program product comprising a computer readable storage and a computer program having instructions stored therein.

In another aspect, the invention provides a surveillance system including security checkpoints that use cognitive memory and pattern matching techniques for recognizing faces or other objects.

In another aspect, the invention provides a human face recognition system for recognizing person's faces contained in a query photograph.

In another aspect, the invention provides a photographic or image search engine for a computer or other information appliance, the photographic or image search engine characterized in that photographs or images stored in said computer or other information appliance are accessible to said photographic search engine, and are retrieved in response to receipt of a query comprising at least one query photograph or image, the query photograph or image having a relationship to said photographs or images stored in said computer or other information appliance.

In another aspect, the invention provides a photographic or image search engine for a computer or other information appliance, the photographic or image search engine characterized in that photographs or images stored in said computer or other information appliance are accessible to said photographic or image search engine, and are retrieved in response to receipt of a query comprising at least one text or symbolic information and at least one photograph or image, wherein both the at least one text or symbolic information and at least one photograph or image have a relationship to said photographs or images stored in said computer or other information appliance.

In another aspect, the invention provides in a photographic search engine for the World Wide Web or interconnected networks of computers, servers, information networks, or information appliances, wherein photographs or images are stored on web servers or other information storage appliances are accessible to said photographic search engine, and are retrieved in response to receipt of a query consisting of a photograph, the query photograph, where said query photograph has one or more objects of interest or people's faces, and said photographs stored on said web servers or said other information storage appliances contain objects of interest or people's faces, a method for performing a search for photographs or images comprising: (a) locating said objects of interest or people's faces in both said query photograph and in said photographs stored on said web servers or said other information storage appliances; and (b) relating said objects of interest in said query photograph to corresponding objects in said photographs stored on said web servers or said other information storage appliances.

In another aspect, the invention provides that this method further includes: (a) crawling or searching said World Wide Web or other network of information appliances to collect photographs or images and the paths, addresses, or URL's of said photographs or images or of documents containing said photographs or images; (b) locating images of objects of interest or people's faces from said photographs, and storing the located images with the paths, addresses, or URL's of said photographs or said documents containing said photographs in a buffer; (c) storing said located images and their respective paths, addresses or URL's in said photographic search engine; (d) detecting if said located images contain objects of interest or people's faces that are contained in located images already stored in said photographic search engine; (e) storing together in a list all paths, addresses and URL's of all said located images containing the same object of interest or person's face; and (f) responding to a query photograph, and providing as a search output said list of all paths, addresses, and URL's for each located image related to said query photograph.

The various methods and procedures may be implemented as computer programs and/or as computer program products, the computer program product including a computer readable storage and a computer program including instructions for performing at least some of the steps of the method stored therein.

BRIEF DESCRIPTION OF THE DRAWINGS

The foregoing and other objects of the invention will be more clearly understood from the following detailed description when read in conjunction with the accompanying drawings, wherein:

FIG. 5(a) shows an aerial photograph of Simi Valley, Calif., full view.

FIG. 5(b) shows a zoomed-in portion of FIG. 5(a), overlaid on which are the outline of the aircraft (aircraft outline), the view through the telescope (circle), and the square area called the mind's eye, which is the current image being presented to the cognitive memory to determine if the image corresponds to one of the images stored in the cognitive memory.

FIG. 19(a) shows an input pattern applied to the autoassociative neural network of the cognitive memory trained to recognize a set of Chinese characters.

FIG. 19(b) shows the output pattern from the autoassociative neural network corresponding to the input pattern presented in FIG. 19 (a), with an MSE of 0.25%, which demonstrates recognition.

FIG. 23 (a) shows three photographs of Bernard Widrow used for training.

FIG. 23 (b) shows a test photograph of Juan Carlos Aragon, Victor Eliashberg, and Bernard Widrow, used to locate and recognize Bernard Widrow among all the faces.

FIG. 25(a) shows one face detected in the test photograph of FIG. 23.

FIG. 25(b) shows the scanning process performed by the high-resolution neural network over the face detected in FIG. 25 (a), which was not recognized.

FIG. 26(a) shows another face detected in the test photograph of FIG. 23.

FIG. 26(b) shows the scanning process performed by the high-resolution neural network over the face detected in FIG. 25(a), which was recognized as Bernard Widrow's.

FIG. 27(a) shows another face detected in the test photograph of FIG. 23.

FIG. 27(b) shows the scanning process performed by the high-resolution neural network over the face detected in FIG. 27(a), which was not recognized.

FIG. 28 shows a plot of the effects on percent MSE due to horizontal translation, as the sensing window shifts left and right from optimum while the cognitive memory scanned Bernard Widrow's face in the test photograph of FIG. 23 with the high-resolution neural network.

FIG. 29 shows a plot of the effects on percent MSE due to vertical translation, as the sensing window shifts up and down from optimum while the cognitive memory scanned Bernard Widrow's face in the test photograph of FIG. 23 with the high-resolution neural network.

FIG. 30 shows a plot of the effects on percent MSE due to zooming, as the sensing window zooms in and out from optimum while the cognitive memory scanned Bernard Widrow's face in the test photograph of FIG. 23 with the high-resolution neural network.

FIG. 31 shows a plot of the effects on percent MSE due to rotation, as the sensing window rotates clockwise and counter-clockwise from optimum while the cognitive memory scanned Bernard Widrow's face in the test photograph of FIG. 23 with the high-neural resolution network.

DETAILED DESCRIPTION OF EMBODIMENTS OF THE INVENTION

Figure 1:
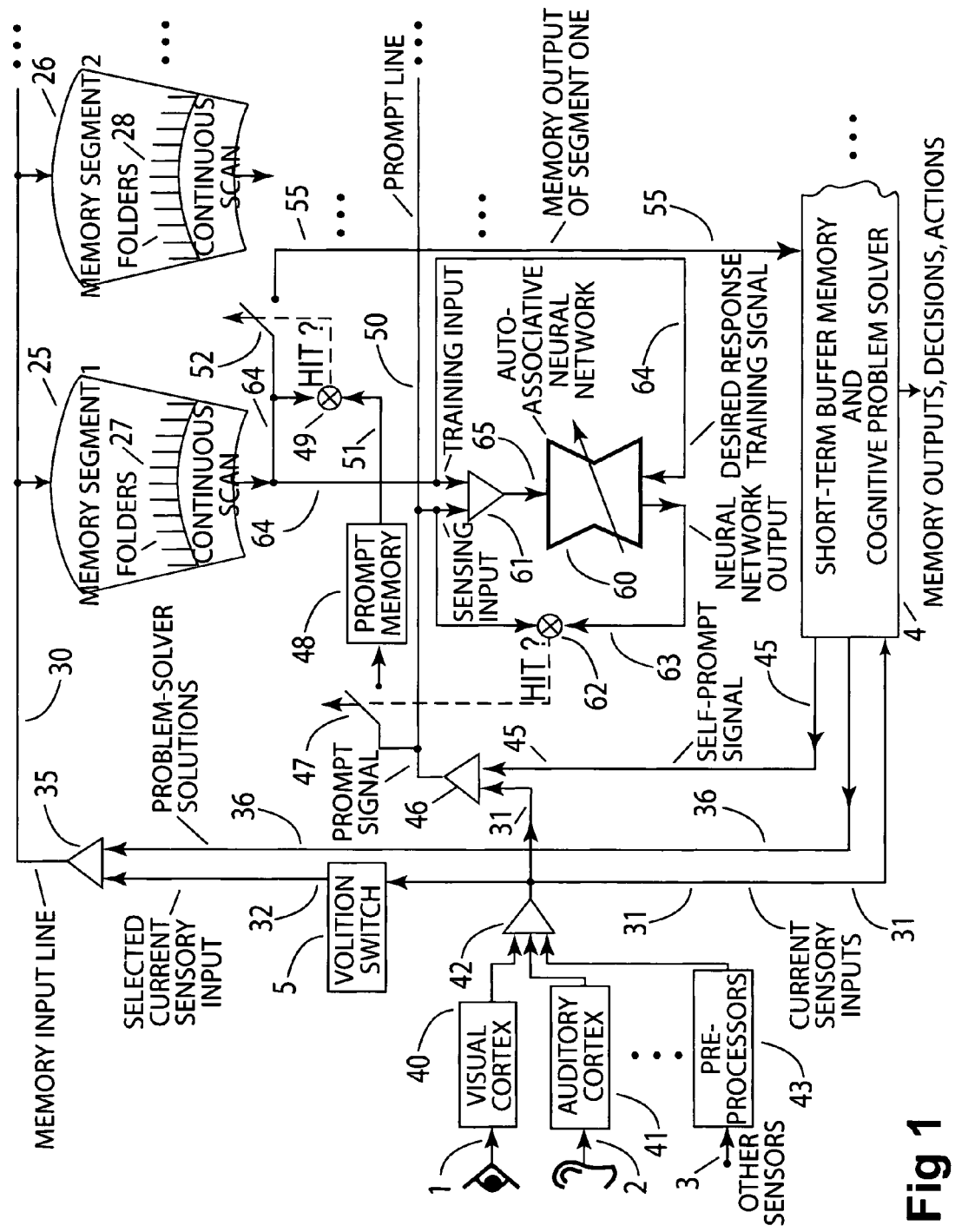
FIG. 1 shows an embodiment of the cognitive memory of this invention, depicting sensory inputs to the cognitive memory, and one complete memory segment of the cognitive memory.

Aspects of the invention are now described relative to the figures. Certain topical headers and subheaders are provided as a convenient aid to the reader; however, it will be understood that in general, different aspects of embodiments of the invention may be described throughout the specification, in the drawings, and in the claims and that he headers and subheaders should not be taken to restrict the invention in any way.

One of the central ideas, though not the only idea, of this invention is that memory and pattern recognition are intertwined. The key to pattern recognition is memory. A human-like memory system is described herein. This memory system has many uses, among them pattern recognition.

FIG. 1 shows architectural elements and structures of the cognitive memory system that behaves to some extent like human memory. It has practical engineering value and would be useful in solving military, governmental and commercial problems. This memory system is intended to model human memory function, and its workings will be described in human terms. The anatomical locations in the brain where the various architectural elements and components might be contained are mostly unknown; what is important is that the functions of these elements and components be performed.

The design of the cognitive memory system of FIG. 1 is based at least in part on the following hypotheses about human memory:

1. During a lifetime, images, sounds, tactile inputs, thoughts, etc. are stored permanently if they were of interest when the sensory inputs or thoughts were experienced.

Human memory has enough storage capacity for a long lifetime. Old recordings are not deleted for lack of storage space.

2. Sensory inputs received concurrently are stored together as pattern vectors in a single "file folder" or "memory folder." When the contents of the memory folder are retrieved, sights, sounds, tactile feel, smell, etc., are obtained all at the same time. Sensor fusion is a memory phenomenon. Sensory signals received simultaneously are not themselves fused; rather they are simply recorded alongside each other in the same memory folder and are later retrieved together.

3. Thoughts, conclusions, and problem solutions are also stored in cognitive memory folders, just like sensory input signals.

4. The same information stored in a memory folder may, for reliability, be stored redundantly in a number of separate memory folders.

5. There may be many memory folders storing different information about the same subject, recorded at different points in time. Consider a memory with a Bernard Widrow folder containing many different images of his face taken during a one hour visit, with various lighting conditions, scale, perspective, rotation, translation, with zoom-in images of his eyes, nose and other facial details. The memory folder also contains the sounds of the conversation. After many visits, there will be many independent memory folders containing memories of Bernard Widrow. During one of the conversations, the name of his wife was mentioned. During retrieval, the contents of that particular memory folder would need to be read in order to recall the name of his wife.

6. Retrieval of stored information results from reading the contents of a memory folder when triggered by a prompt from a set of current sensory inputs, or by a thought process. Recalling the name of Widrow's wife during a subsequent visit would require a prompt—such as seeing his face in many different positions and from many different perspectives—to find a Widrow face pattern that is correlated with or related to one of the patterns in the memory folder in which his wife's name was originally mentioned.

7. Current sensory inputs would have very little meaning and would be puzzling if they did not trigger the reading of the contents of memory folders containing related information. Current sensory inputs would trigger or prompt the delivery of the contents of memory folders containing experience that is related to the present input environment. For example, listening to and understanding the speech of another person requires access to the memory folders storing the sounds and associated meaning of each word and each combination of words or phrases. The associated meaning of each word is retrieved and made available to the speech processing centers of the brain. Without memory and memory access, one could hear speech but not understand it, similar to hearing a person speak an unknown foreign language.

8. Retrieval of the contents of the sought after memory folder or folders is done by association of the current sensory input or prompt signal with the memory folder contents. One would need to scan through the memory folders to make the association and find the right memory folder or folders. This needs to be done rapidly, using a method that allows the size of the memory to be increased without increasing the retrieval time. A simple linear scan and comparison of all stored patterns in all memory folders would soon require too much time to perform. Some other mechanism must be in place to allow the size of the memory to increase without lengthening the time to store and retrieve information. With this invention, neural networks are used in the association process in order to make retrieval very efficient.

9. When a search is prompted by current sensory inputs and a memory folder containing related information is found, each item of the memory folder contents could serve recursively as a further prompt signal to find additional related memory folders that were not found in the initial search. For example, a visual prompt could cause the recall of an auditory memory, which in turn could prompt the recall of other visual or auditory patterns.

10. A problem-solving process could create new patterns from sensory inputs. These new patterns could be stored in memory and could prompt new searches. These new patterns are analogous to human thoughts.

11. Associations between the prompt pattern and patterns stored in the memory are made by pattern matching, or vector matching. For example, for visual images, pixel comparisons are performed to find matches in memory folders.

12. Features of patterns can be portions of the patterns themselves, for example, zoomed-in portions of an image.

13. The memory is organized in segments. Each segment contains a finite number of memory folders. Each segment contains its own retrieval system for searching its memory folders. When a search is prompted, separate but parallel searches take place in all memory segments simultaneously. Thus, search time does not increase with the number of segments or with the total size of the memory.

Consideration of the above hypotheses has motivated the design of the cognitive memory system of this invention.

The Workings of the Cognitive Memory System

The cognitive memory system of FIG. 1 has the capability of performing in accord with most if not all of the above hypotheses. There are two main functions of the cognitive memory: (1) storage and (2) retrieval.

Storage

Sensory inputs 1-3 are brought into the system in the lower left of the figure. These inputs could be from human-like sensory modalities, such as visual, auditory, tactile, olfactory, etc. or from other sensor types, such as optical, radar, sonar, etc. Each input is a pattern that could be represented in binary form as a sequence of bits. As such, each pattern is a binary vector. These raw input patterns are heretofore referred to as query patterns. Visual inputs would be pre-processed by a "visual cortex" 40 to be, for example, translated, rotated, scaled, intensified, etc. Auditory inputs would be pre-processed by an "auditory cortex" 41 to be, for example, automatically scaled and compressed in amplitude, warped in time, and spectrum analyzed. Other sensory inputs would be appropriately pre-processed according to application by sensor-specific pre-processors 43.

Simultaneously observed sensory inputs serving as query patterns are bundled into a larger composite binary vector by concatenator 42. The output of 42 drives the current sensory input line 31 which delivers signal to a short-term buffer memory that is part of a cognitive problem-solver 4, to be described below; to toggle switch 46; and to a "volition switch" 5.

The volition switch 5 allows only "interesting" inputs into permanent storage. The volition switch 5 could be activated, for example, by motion detection, the brightness or color of a visual input, or for an auditory input, by the loudness of the sound, etc. Otherwise, the volition switch 5 provides no output to the selected current sensory input line 32. When activated, the output of the volition switch 5 is the selected current sensory input, and is carried by line 32 to memory input concatenator 35. The output of concatenator 35 drives the memory input line 30, which is a data bus that supplies inputs to all memory segments 25, 26. The memory input line 30 carries patterns to be permanently stored in the memory folders 27, 28.

The cognitive problem solver 4 generates problem solutions and other patterns. Some of these solutions and patterns need to be stored permanently. These are carried by line 36 to concatenator 35, and thereby to the memory input line 30. Thus, the memory folders 27, 28 in the memory segments 25, 26 contain both sensory input patterns and patterns generated by the problem solver 4.

Patterns arriving on the memory input line 30 are fed to all memory segments 25, 26. Patterns are stored wherever an empty memory folder exists. Arriving patterns may also be stored redundantly in multiple memory folders 27, 28, in multiple memory segments 25, 26, for enhanced reliability.

FIG. 1 depicts portions of only two memory segments, and only one complete memory segment, but any number of memory segments can be added to accommodate the required amount of memory storage. The first memory segment consists of memory segment one 25, memory folders 27, switch 61, the autoassociative neural network 60, prompt memory 48, comparator 62, switch 47, comparator 49, switch 52, memory output line 55, and all associated interconnections. Other memory segments would be configured identically to the first memory segment, each containing all of these components. Each memory segment will generally contain many memory folders.

Retrieval

At the center of the memory retrieval system is a set of autoassociative neural networks. Each memory segment has its own autoassociative neural network. For example, the autoassociative neural network 60 for the first memory segment 25 is shown in FIG. 1.

The autoassociative neural network 60 is an artificial neural network that is trained to produce output patterns that are identical to the input training patterns. During the training phase, the desired output responses are taken to be identical to the input patterns. This is a form of supervised learning [14]. After training in this way, input patterns that have been trained into the network will be reproduced at the neural network output during the sensing phase, and input patterns that were not trained in will not reproduce themselves at the neural network output. A trained-in pattern will produce a low error when the input and output of the neural network are compared by comparator 62. High error results during sensing with patterns that were not previously trained in. When a trained-in pattern is presented to the autoassociative neural network, the error at comparator 62 is low and there is a "hit," meaning that this pattern has been seen before.

One implementation of the autoassociative neural network would be a conventional multi-layer perceptron [31, 14] trained by the backpropagation algorithm [43]. Other forms of autoassociative neural networks are possible, such as those disclosed in [20].

The autoassociative neural network 60 is not used for pattern recognition per se; instead, it is used only to indicate which of its input prompt patterns have been seen before and have been trained into the first memory segment 25. The training patterns for autoassociative neural network 60 come from patterns stored in the memory folders 27 of the first memory segment 25. During the training phase of the neural network, the contents of memory folders 27 are scanned and presented to the neural network input toggle switch 61, which passes the training patterns to the neural network input line 65. At the same time, the same stored training patterns are presented via line 64 as desired output patterns for training the neural network 60. The autoassociative neural network is trained until the difference between the desired output and the actual output for each training pattern is small. Trained in this way, the neural network 60 will correctly reproduce at its output the input patterns that have been trained in, and will not reproduce input patterns that were not trained in.

The memory retrieval process starts when a query pattern is presented to the cognitive memory for identification. The query pattern may be a sensory input pattern arriving on lines 1, 2 or 3, or may be a pattern that the cognitive problem solver 4 pre-processes to create a prompt pattern. The prompt pattern could come from current sensory inputs on line 31, or from the self-prompt signal on line 45, as determined by toggle switch 46. The prompt signal on line 50 is presented to neural network input toggle switch 61, which during the sensing phase of the neural network connects line 50 to the autoassociative neural network input line 65.

The resulting neural network output pattern on line 63 is compared by comparator 62 with the prompt signal from line 50 to compute a measure of error between the two signals. The mean square error (MSE) is a typical error measure used in comparing the prompt input with the neural network output. Other error measures also possible. To calculate MSE, first an error vector is formed as the difference between the prompt input and the neural network output pattern vectors. MSE is then calculated by summing the squares of the components of the error vector, and dividing by the number of components in the vector. Comparing the MSE with a pre-determined threshold determines with high probability if the prompting input has been trained in and has been seen before (i.e. is a pattern contained somewhere in at least one of the memory folders 27 of the first memory segment 25). If the MSE is below the threshold, there is a "hit". If no hit occurs, there will be no memory output. A discussion of the selection of threshold value is given below.

If no hit occurs, the pre-processing of the query pattern done by pre-processors 40, 41, 43 can be modified to generate a new prompt pattern. The new prompt pattern is tested by sensing through the trained autoassociative neural network 60 in the same manner described above. If again there is no hit, the process is repeated until all possible permutations or adjustments of the query pattern have been tried. If there is still no hit, there will be no response from the cognitive memory system.

If there is a hit detected by comparator 62, the prompt memory buffer switch 47 is closed and the successful prompt pattern is stored in prompt memory buffer 48. The successful prompt signal is carried by line 51 to comparator 49. The entire contents of the memory folders 27 of the first memory segment 25 are then continuously scanned and outputted on line 64, which carries these patterns to comparator 49. As each stored pattern in the first memory segment 25 is outputted in scanned sequence on line 64 and compared with the successful prompt signal, comparator 49 calculates the vector error. When the MSE is below a pre-determined threshold, there is a hit, and switch 52 closes. The entire contents of the "hit" memory folder, the memory folder containing the hit pattern, are then outputted through line 55 to the cognitive problem solver 4. The output on line 55 is the memory output in response to the prompt signal. The cognitive problem solver 4 is the user or the "customer" for the recalled memory patterns.

The memory outputs of the each memory segment are inputs to the cognitive problem solver 4, as shown in FIG. 1. The contents of each memory folder would typically consist of many individual patterns that could be visual, auditory etc. The various patterns retrieved from the memory folder could themselves be used as prompt signals. This form of self-prompt signal is delivered on line 45 to toggle switch 46. When the switch 46 is set for self-prompting, the self-prompt signal from line 45 is presented to prompt line 50. Under this mode of operation, it would be possible for an auditory pattern from one memory folder to prompt the retrieval of another memory folder containing related auditory and visual patterns. Thus, auditory patterns can lead to the read-out of visual patterns, and vice versa. The same effects can be realized with sensory inputs other than visual and auditory.

The purpose of the autoassociative neural network 60, when implemented with parallel hardware, is to allow rapid evaluation of various pre-processed forms of the query patterns. For visual inputs, pre-processing would include translation, rotation, scaling, intensity change, contrast change etc. In FIG. 1, this would be done by the visual cortex 40. For other inputs, other analogous forms of pre-processing would be done. The goal is to find a form, if possible, that would correspond exactly to a pattern stored in one of the memory folders 27, 28 of one of the memory segments 25, 26. If there is a hit in a particular autoassociative neural network, then one has found the exact prompt pattern to be sought from among the patterns in the memory folders corresponding to the memory segment for the neural network with the hit. This approach is much faster and more precise than if the various forms of the pre-processed patterns were compared directly with every pattern in each memory folder of the memory segment. Without the neural network, the number of combinations to be tried would become large and prohibitive as the number of stored patterns in the memory folders grows.

The cognitive memory system of FIG. 1 can be made into a very large memory if desired. One simply adds memory segments. Since each segment has its own independent retrieval system, the search time does not increase as the number of segments increases. The output of each memory segment is fed to the cognitive problem solver 4, and the prompt signal line 50 is a common bus that simultaneously reaches all memory segments. The memory input line 30 is also a common bus to feed inputs to all memory segments for storage.

The cognitive problem solver 4 is the "customer" for the memory output signals. It utilizes the derived memory outputs in problem solving. A simple form of reasoning can be done by the problem solver 4, which could be based on the classical work of Arthur Samuel [32, 33]. His checker-playing program embodies a reasoning process that plays by the rules, plays tentative moves ahead, and makes optimized decisions in order to win the game of checkers.

Game playing is a good model for a general reasoning process. Samuel's checker-player dating back to the 1950's and 1960's is still recognized as one of the finest pieces of work done in the field of artificial intelligence [32, 33].

Computed outputs from the cognitive problem solver 4 can be stored and later retrieved from the memory segments. Inputs to be stored by the memory come from both the current sensory inputs and outputs from the cognitive problem solver 4. The prompt pattern can come from current sensory inputs via line 31 or from self-prompt patterns via line 45 that result when the contents of a memory folder are delivered to the problem solver and some of the contents are determined to be of interest as query patterns for further searches. Just as query patterns that are sensory inputs are pre-processed to generate prompt patterns, query patterns that are self-prompt patterns would also be subjected to the same type of pre-processing.

A Simplified Embodiment of the Cognitive Memory

Figure 2:
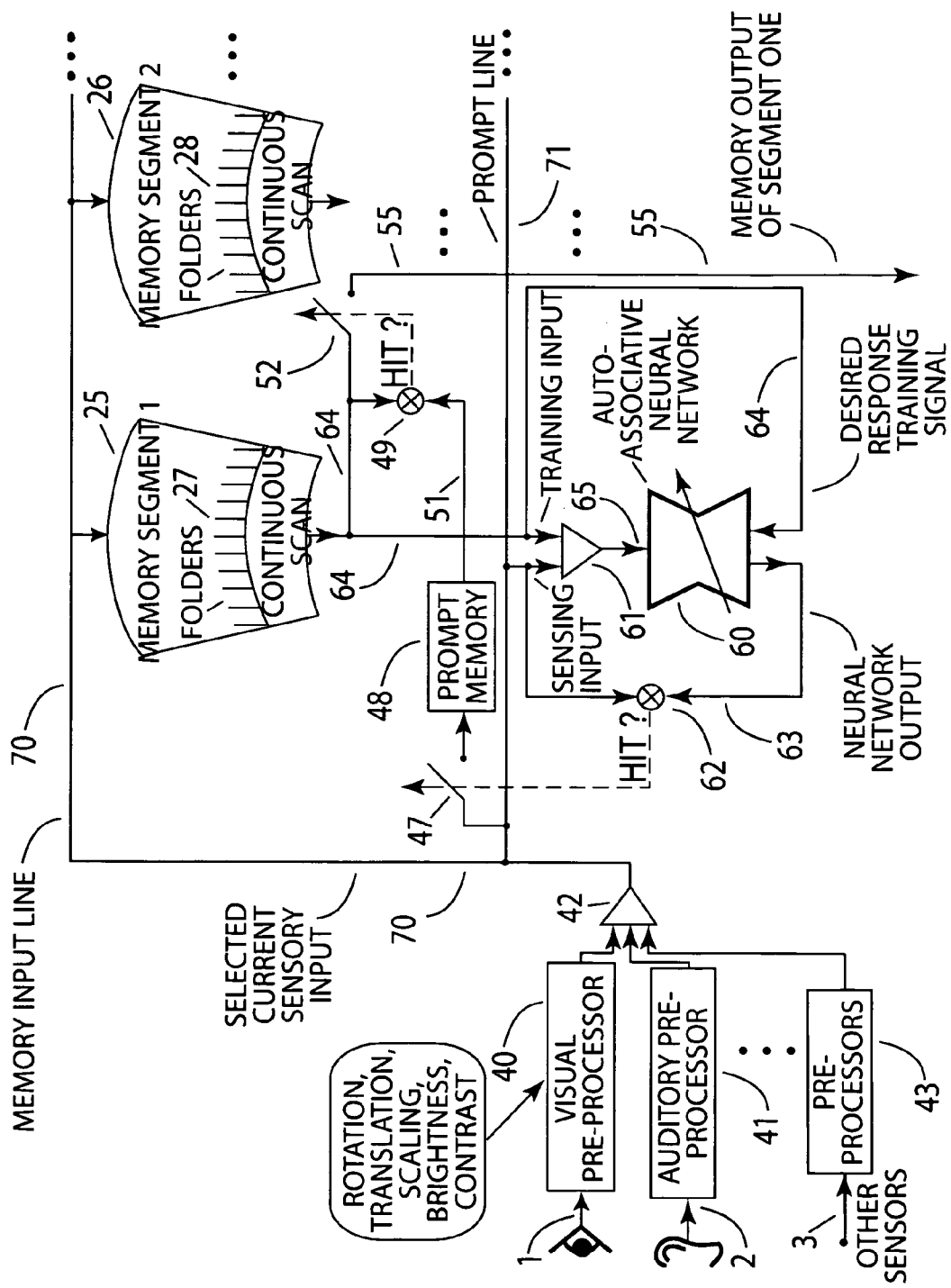
FIG. 2 shows another embodiment of the cognitive memory of this invention, depicting sensory inputs to the cognitive memory and one complete memory segment of the cognitive memory.

The cognitive memory shown in FIG. 2 is a simplified version of the system in FIG. 1. This embodiment has been used successfully for a set of applications, some of which are described below. In FIG. 2, the memory input line 70 delivers input vectors for permanent storage, looking for empty memory folders in the first memory segment 25, in the second memory segment 26, etc. Some of the memory folders are large, some small, depending on the amount of storage space needed for the given memory input. Everything sensed, seen, heard, smelled, or felt, etc. is recorded in a memory folder.

Each memory folder could contain visual, auditory, tactile, etc. patterns that were recorded simultaneously. Each memory segment has many memory folders. During training, the memory folders of each memory segment are continuously scanned, extracting every pattern present and using these patterns to train the connected autoassociative neural network. The patterns are recycled and trained over and over again, so that the neural network would be able to reliably identify patterns that have been trained in, and would be able to separate them from patterns that were not seen before.

A prompt pattern from the prompt line 71 can initiate a search among all of the memory segments simultaneously. The prompt pattern is the sensory input signal in the cognitive memory of FIG. 2. The prompt pattern goes to the inputs of all the autoassociative neural networks of all the memory segments. The neural networks deliver output vectors that are compared with the prompt pattern. If the difference is small, i.e. the correlation is high, there is a hit, which means that the prompt pattern has been seen before and has been previously trained into the neural network that reported a hit. Therefore, the associated memory segment has a memory folder that contains this pattern vector and other related information. Once there is a hit, a search for this memory folder takes place. This is a search through the memory folders of the memory segment looking for a memory folder containing a pattern that matches the prompt pattern. Once this memory folder has been found, its contents are delivered to the memory output line.

Responses from an autoassociative neural network can be computed very quickly (particularly with parallel hardware implementation). The neural network in the cognitive memory system allows quick testing of variations of the query pattern, i.e. rotations, translations, scaling, etc. to find the right prompt pattern for searching the memory folders.

For example, query patterns in the form of visual input signals on line 1 are translated, rotated, scaled etc. by visual pre-processor 40 in trying to find a prompt pattern that will make a hit with the autoassociative neural network. Query patterns that are auditory input signals on line 2 could be filtered, scaled, time-compressed or dilated, or spectrum analyzed, and otherwise adjusted by auditory pre-processor 41 in trying to find a prompt pattern that will make a hit. Other query patterns of other input sensors on line 3 could likewise be pre-processed by pre-processors 43 in attempting to make a hit. If a hit is made, one has just the prompt pattern that will match one of the patterns in one of the memory folders.

If the difference between the prompt pattern and output of the neural network corresponds to an error whose mean square is above a pre-determined threshold, no matter how the sensory inputs are pre-processed, there will be no hit, and there will be no output from the cognitive memory.

The neural networks do not undergo training when a prompt signal is present. The prompt signal senses the response of the neural networks. These networks are not trained while they are being sensed.

Each memory segment has its own independent storage and retrieval system. The structure associated with each memory segment is repeated identically from segment to segment. A single instance of this structure is represented in FIG. 2 by that of the first memory segment. Memory input line 70 is a bus providing identical inputs to all memory segments 25, 26, and the prompt line 71 is a bus presenting prompt inputs to the retrieval systems of all of the memory segments.

In the first memory segment 25, a prompt vector from the prompt line 71 can initiate a search. During a search, toggle switch 61 connects the prompt line 71 to the autoassociative neural network input line 65 for sensing. The neural network output on line 63 is compared with the prompt signal on line 71 by comparator 62. If the difference between the prompt signal and the neural network output, the error, has a mean square value smaller than a pre-determined threshold, i.e. the correlation is high, there is a hit, which means that the prompt signal has been seen before and has been previously trained into the neural network 60. Therefore, the associated memory segment 25 has a memory folder 27 that contains this pattern vector and other related information.

Once there is a hit, a search for this memory folder takes place. This is a search through all the memory folders of the memory segment 25 looking for the memory folder containing the pattern that matches the prompt pattern. When a hit is detected by comparator 62, switch 47 is closed and the successful prompt is stored in prompt memory buffer 48 and outputted on line 51. Scanning through the memory folders of memory segment 25, contents of the memory folders are outputted on line 64 and comparisons with the contents of the prompt memory 48 on line 51 are made by comparator 49. When comparator 49 discovers a low mean square error, below a pre-determined threshold, switch 52 closes, and the entire contents of the memory folder containing the hit pattern are delivered to the memory output line 55.

In FIG. 2, the autoassociative neural network of each memory segment could be a multi-layer perceptron [31, 14], having two or more layers. The neural elements may be fully connected, but partially connected networks would also work. The training algorithm for the multi-layer perceptron is backpropagation [43], although other training algorithms would also work [31, 47, 14]. The number of neurons in the output layer of the neural network corresponds to the number of components in the input pattern vector.

The errors detected by comparators 62, 49 are mean square errors, i.e. the sum of the squares of the errors of the components of the patterns being compared divided by the number of components. The error thresholds referred to above are set by the system designer based on the particular application. If the error thresholds are set too low, there will be no hits. If the error thresholds are set too high, there will be too many hits, some being incorrect. Experience will allow the designer to make appropriate choices for these thresholds.

For the system of FIG. 2, the memory segments and memory folders are implemented as a computer file system by a conventional computer and operating system.

It is clear that the purpose of the autoassociative neural networks is to quickly identify patterns that have been seen before. This is a capability fundamental to memory and thinking. If a visual, auditory, or other sensory input vector corresponds to a pattern seen before, the contents of the memory folder containing the original pattern are delivered as memory output. This could be the output that is desired by the cognitive memory system "customer," or it could be the input to a cognitive problem solver, as in FIG. 1. Prompting the cognitive memory causes it to output information related to the prompt, regardless of where the information may be stored in the memory.

The neural networks that have primarily been used in the implementation of the cognitive memory of FIG. 2 are of a type known as multilayer perceptrons. This type of network has been used to implement autoassociative neural networks as described above. The training method that works well with multilayer perceptrons is the backpropagation algorithm of Werbos [43]. A simple description of this algorithm is given in the paper by Widrow and Lehr [47], and is illustrated by FIG. 25, page 1433, of that paper. This paper is incorporated herein by reference. A general description of multilayer perceptrons is given by Haykin [14], chapter 4, pages 156-255. This chapter is also incorporated herein by reference. On page 171, Haykin describes both batch and sequential mode training. Either method may be used with the cognitive memory of FIG. 2.

The methodology of the cognitive memory can be summarized by the following steps:

(1) Input data, images, or patterns are stored electronically in a memory system, and are used to train an autoassociative neural network.
(2) Stored data, images or patterns will be retrieved when a query pattern is received.
(3) The query patterns are variously pre-processed to create a set of prompt patterns.
(4) The various prompt patterns are applied as inputs to the trained autoassociative neural network and, if the error in the difference between a prompt pattern input and the resulting autoassociative neural network output pattern is below a pre-set threshold, there is a "hit," and the prompt pattern is considered successful. If there is no hit, nothing will be retrieved.
(5) If there is a "hit," the successful prompt pattern is compared with all the stored input data, images, or patterns to find a best match.
(6) The best match pattern and all ancillary data stored with it will be delivered as the memory output response to the input query.
(7) Optionally, data, images or patterns delivered as the output response may be used as "self-prompting" query patterns to the cognitive memory system to locate other stored data, images or patterns matching the self-prompt patterns.

The cognitive memory of this invention is unique in several ways. Other types of memory systems exist that can be searched for content by a text query. An example would be searching for old email messages stored in a computer or other information appliance by prompting with keywords or people's names, etc. The cognitive memory, on the other hand, is searched for content by a prompting query in the form of a pattern such as, for example, a photographic image or a recorded sound. Other forms of sensory signals such as, for example, radar or sonar signals in the forms of patterns, could also prompt a search. The use of the word photograph is intended to mean any picture, graphic, or image, such as but not limited to images captured by conventional photographic processes, digitally captured images, electronically scanned photographs or films, half-toned images, and images or photographs as printed in books, newspapers or magazines, or in any other printed or electronic form.

Furthermore, where reference is made to a photograph, image, data, associated or ancillary data or the like that is stored in a database or memory or used in conjunction with a query, it is understood that the photograph, image, data, associated or ancillary data or the like, may be a component of the system or memory or alternatively or in addition may be optional and loaded or accessed from an external source. In other words, photographs, images, and data used in conjunction with aspects of the invention may be a part of the invention or may be external elements not part of the invention but used or processed by structures and methods of the invention to yield the desired result.

Patterns that are recorded in a sequence over time or over space that are related to each other are stored in a single memory folder in the cognitive memory. Patterns from multiple sensors, such as sight and sound that are recorded at the same time are stored in the same memory folder. Many memory folders, each with patterns pertaining to separate subjects, are organized in a single memory segment, and are connected to an auto-associative neural network, which is trained with all of the patterns of all the memory folders of the segment. The size of the cognitive memory can be expanded by increasing the number of memory folders per segment and by increasing the number of segments.

Searching the cognitive memory for stored content is a three-step process. The first step generates prompt patterns from an input query pattern. An example would be an exploration of a query photograph. A window that could be square, rectangular, circular, irregular, etc., is moved over the photograph by left-right and up-down translation, rotated relative to original orientation, scaled to be larger or smaller, and the contrast of the photograph and its intensity could be varied. The intensities of the colors of the pixels within the window comprise the components of a vector that is fed as input to the autoassociative neural network. A large number of prompt patterns can be generated from a single photograph.

The second step involves sensing the autoassociative neural network with all of the prompt patterns, taking the difference between the prompt pattern input and the autoassociative neural network output. When sensing a given prompt pattern results in a difference that is lower than a set threshold, there is a "hit," and the prompt pattern must be alike or very similar to one of the training patterns, i.e. one of the patterns in one of the memory folders. The threshold can be adjusted, allowing variation in tightness of fit.

The third step in searching the cognitive memory is to scan every pattern in every memory folder in the segment, taking the pixel-to-pixel differences from the "hit" prompt pattern. The lowest mean square difference identifies the pattern most closely corresponding to the prompt pattern. The contents of its memory folder are then delivered as the memory output to the photographic query input.

Extensive experimentation has indicated that this retrieval process is a superior method in that it is very fast and has the advantages of being highly accurate and scaling in capacity without increases in retrieval time.

The uniqueness of the cognitive memory comes at least in part from:
(a) its ability to be prompted by pattern inputs, such as visual or auditory, rather than by text or keyword inputs,
(b) its ability to store patterns in memory folders that could come from a plurality of sensors over periods of time and space,
(c) its ability to be expanded in numbers of memory folders and segments without increasing access time,
(d) its autoassociative neural network that is trained on all of the patterns of all of the segment memory folders,
(e) its unique three-step data retrieval process making use of the autoassociative neural network,
(f) its design to retrieve the entire contents of the memory folder containing the match to the "hit" prompt pattern derived from the query pattern, not simply the matching pattern alone, and
(g) its ability to use retrieved patterns as further query patterns to initiate subsequent searches to find other related stored content.

The cognitive memory can be used for recognition of photographs if the identification of the photographs is stored along with the photographs in the memory folders. This principle is used in the applications to follow.

Hardware Implementation

Hardware implementation of multilayer perceptrons allows training and sensing to take place many times faster than can be done by software running on a conventional computer. Speed-up in both training and sensing of a factor of 1000 is easily possible. There are many papers in the literature describing hardware implementation of multilayer perceptrons that are connected to computers. Some representative papers are by Nichols [30], Denby, et al. [4] and Gadea, et al. [11]. The paper by Nichols is incorporated herein by reference. They describe systems in which patterns stored in computers are automatically inputted to neural network hardware for both training and sensing. The outputs of the neural networks are fed back to the computers. The designs that they describe would be suitable for the autoassociative neural networks of FIG. 2.

Applications Using the Cognitive Memory

A conventional computer with a conventional memory, when connected to a cognitive memory, makes a powerful combination. This is a new computer architecture that can solve many practical problems. It is too early to exhaustively categorize these problems and impossible to see what they will be at this time. From experience, it seems that the range of problems to make use of the cognitive memory will be very broad indeed. Several applications are described below and the results follow. These applications are:

1. Location and tracking of the position of an aircraft relative to previously obtained aerial photographs. The cognitive memory system described herein has been used to determine the precise location of an aircraft by using a combination of optical images taken during flight of the ground below and a previously obtained wide area aerial photograph of the ground below. Aircraft locations have been determined to within one pixel, within several feet.

2. Satellite surveillance of an airfield, with a cognitive memory used to automatically detect and locate aircraft and determine their type. Results are presented below that show the detection, location, and identification of various aircraft types at an airfield on Diego Garcia Island in the Indian Ocean.

3. Use of a cognitive memory to identify large numbers of Chinese characters.

4. Use of a cognitive memory to locate, recognize and identify human faces.

5. Use of a cognitive memory to search a personal computer or other information appliance, looking for photographs of specific people.

6. Use of a cognitive memory as apart of a photographic search engine, looking for photographs and URL's of specific people.

Aircraft Location Based on Ground Imaging

One application for the cognitive memory is that of location and tracking of aircraft from optical imaging of the ground below.

Figure 3:
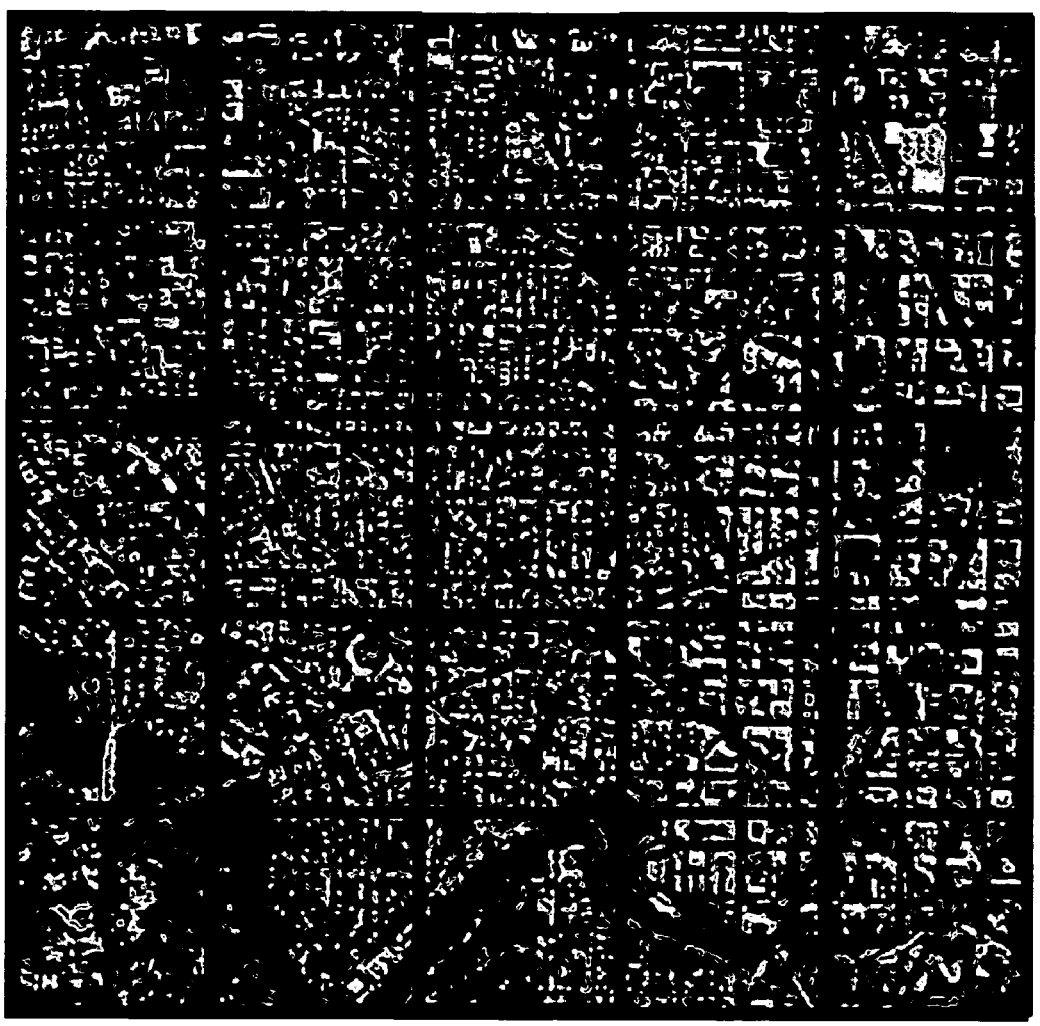
FIG. 3 shows an aerial photograph of a portion of Manhattan Island, N.Y., cut into 25 smaller photographs that were trained into the cognitive memory to allow location of an aircraft by visual imagery alone.

FIG. 3 shows a portion of an aerial photograph of a portion of Manhattan Island in New York. Superposed on the photograph is a grid of squares. Each square is 81×81 pixels. Within each square is a picture of a small portion of Manhattan. Using Matlab software, a 25×25 pixel picture was made from each 81×81 pixel picture. Matlab does this by interpolation and re-sampling. Each 25×25 pixel picture was then recorded in an individual memory folder in memory segment 1 of the cognitive memory of FIG. 2. In each memory folder, the 25×25 pixel picture was recorded along with a piece of additional information, the X-Y location of the pixel in the center of the corresponding 81×81 pixel picture.

In FIG. 3, twenty-five small pictures of 81×81 pixels are shown. The entire Manhattan photograph had 900 small pictures. All 900 pictures were reduced to 25×25 pixels and were recorded in individual memory folders. These 900 pictures were then trained into the autoassociative neural network.

Figure 4:
FIG. 4 shows an aerial photograph of Simi Valley, Calif., cut into smaller photographs that were trained into the same cognitive memory as in FIG. 3, from which the trajectory of the aircraft was again reconstructed by locating the position of the aircraft from images taken during the flight over the area depicted.

In FIG. 4, an aerial photograph of a portion of Simi Valley, Calif. is shown. Superposed is a grid of squares, each square being 81×81 pixels. This picture has 2700×2200 pixels. The number of small pictures shown in the photograph is 160. Covering the rest of Simi Valley, there were a total of 918 small pictures. Using Matlab, a 25×25 pixel version of each 81×81 picture was made by interpolation and re-sampling. The 918 25×25 pixel small pictures were recorded in individual memory folders in memory segment 2. In each memory folder, the position of the center pixel of the 81×81 pixel small picture was also recorded. The 918 pictures were trained into the autoassociative neural network of memory segment 2.

The autoassociative neural networks of memory segments 1 and 2 both had 250 neurons in their first layer. Since the input patterns had 25×25 pixels, each neuron had 25×25=625 weights. For the first layer, there were 625× 250=156 250 weights. The second layer had 420 neurons, with 250×420=105,000 weights. The third layer had 625 outputs to correspond with the 625 inputs, so the third layer had 625 neurons, each having 420 weights. Therefore, the third layer had 420×625=262 500 weights. The total number of neurons in the network was 1295, and the total number of weights was 523 750. Implemented on a Sun workstation, the training time for the Manhattan patterns was 0.56 hours, and the training time for the Simi Valley patterns also was 0.56 hours. The backpropagation algorithm was used to train the autoassociative networks.

In FIG. 5 (a), the original aerial photograph of Simi Valley is shown. Some time after the original aerial photograph was taken, an airplane traveled over the region carrying a telescope. FIG. 5 (b) is a blown-up portion of FIG. 5 (a). There is an outline of an airplane symbolizing the direction and path of flight. By looking at the ground through the telescope and comparing the image to the original aerial photograph image, it is possible to locate the position of the flying airplane relative to the aerial photograph and to determine its heading direction. This has been done using the cognitive memory system.

The telescopic image within the circle in FIG. 5 (b) has a center that represents the exact location of the airplane when shooting the image of the ground through the telescope. The square within the telescopic circle bounds an image, which is referred to as the "mind's eye." This image was fed as a prompt pattern to the autoassociative neural network. The size of this square corresponds exactly to that of the grid square of FIG. 4.

Whenever a telescopic picture is shot, the telescopic image is fed into an onboard computer. The mind's eye can be moved over the telescopic image with software control. This is one example of a pre-processing function of the "visual cortex" in FIG. 2. The mind's eye can be translated left-right, up-down, and rotated relative to the telescopic image. The objective is to find a hit, i.e. to get coincidence between the image in the mind's eye and one of the 918 small pictures of Simi Valley. These pictures have been trained into the autoassociative neural network, and when the mind's eye is adjusted with the right position and angle to get an image just like one in the original small picture, then there is a hit.

Once there is a hit, the mind's eye image is "frozen" and stored in the prompt memory, and a search by scanning through the memory folders is made to find a matching image. When the correct memory folder is found, the entire contents of the memory folder are retrieved including—in this case—the X-Y pixel coordinates of the center of the small picture. The exact position of the airplane at the moment of shooting the telescopic picture is then determined from the amount of left-right, up-down translation that was needed to make the hit. The heading of the airplane relative to the original aerial photograph can be determined from the amount of rotation that was needed to make the hit.

The same procedure was performed using the aerial photograph of Manhattan. The airplane flight over Manhattan was a straight-line path and telescopic photographs were shot uniformly in distance. For each photograph, a hit was obtained by rotating and translating the mind's eye until a match was found. Using the coordinates of each small picture that was hit, and correcting for the number of pixels of translation and the number of degrees of rotation required for each hit, the location of the airplane for each telescopic shot was calculated and plotted with crosses on the original aerial photograph, shown in FIG. 6.

The heading of the airplane at the time of each shot is indicated by arrows. The arrows were determined independently. They point along a straight line that turns out to be the correct airplane path. The crosses are at the exact locations of the airplane at the shot times. The result is that the position and the heading of an airplane relative to a previously taken aerial photograph can be determined down to the very pixel in X and Y, and the heading determined to within about one degree. From the aerial photograph in FIG. 3, one can see that a city block is about 20×20 pixels. Position along each coordinate can therefore be located to within a distance of one twentieth of a city block with this aerial photograph.

If the size of the mind's eye square did not match those of the original grid in FIG. 3, then scaling would be necessary in addition to translation and rotation, in order to make a hit. Zooming in and out in addition to translating and rotating would be necessary in order to make a hit, increasing the number of prompts presented to the neural network. The autoassociative neural network would need to be able to respond rapidly in sense mode to a prompt input.

Figure 6:
FIG. 6 shows the trajectory of the aircraft over Manhattan as determined by the cognitive memory, where crosses represent aircraft location and arrows indicate orientation of the aircraft, revealing a straight path trajectory, which corresponds to the actual path taken by the aircraft.

All of the hits were determined independently for the airplane track shown in FIG. 6. These hits were perfect in this case. The crosses were uniformly spaced and the arrows pointed along a straight line.

Figure 7:
FIG. 7 shows the trajectory of aircraft over Simi Valley, Calif., as determined by the cognitive memory, where crosses represent aircraft location and arrows indicate orientation of the aircraft, revealing a circular path trajectory, which corresponds to the actual path taken by the aircraft.
Figure 8:
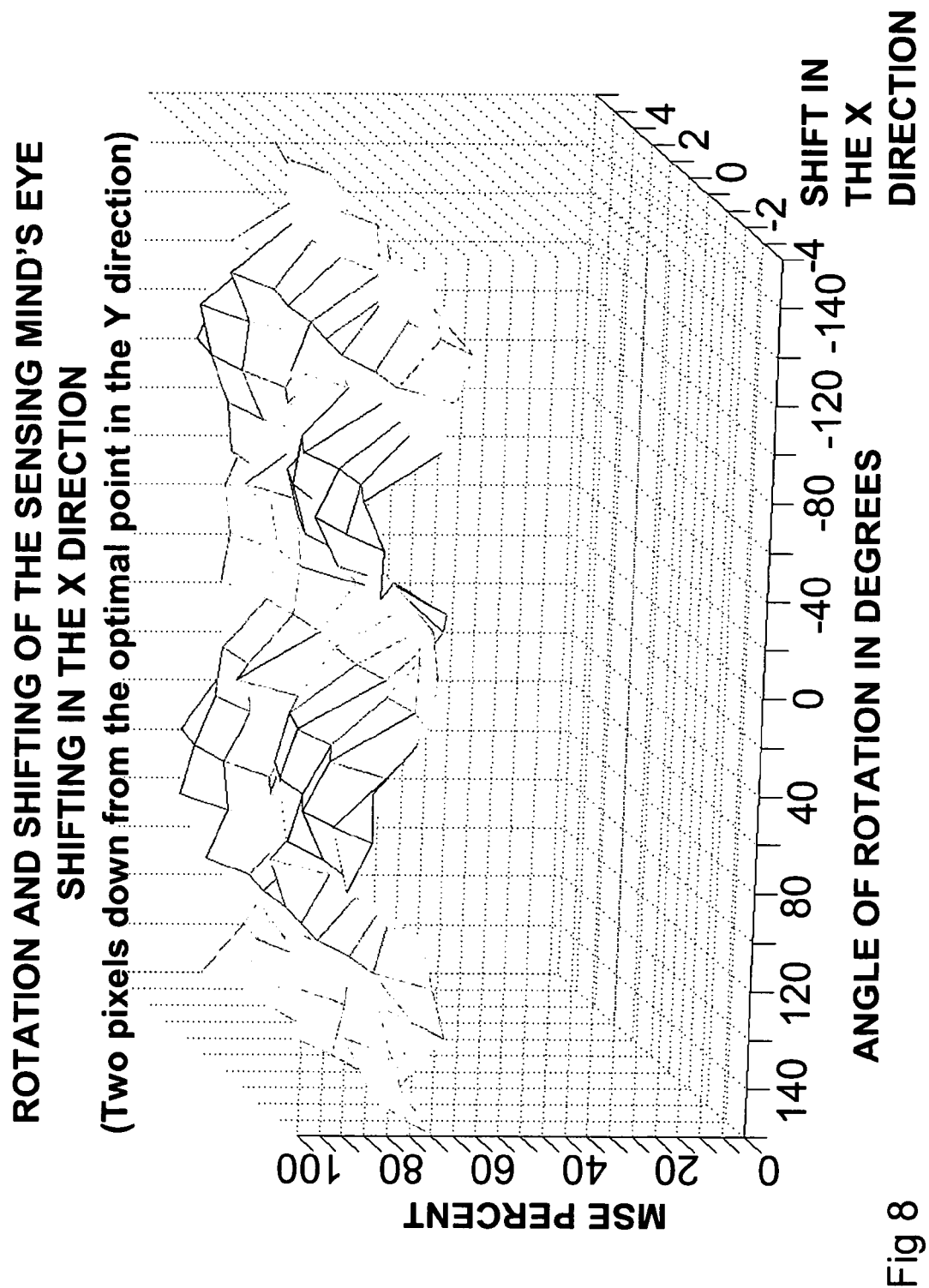
FIG. 8 shows, for images over Simi Valley, a plot of MSE (mean square error) vs. angle of rotation and shift in the X-direction, with the Y-position fixed at 2 pixels down from optimum.
Figure 9:
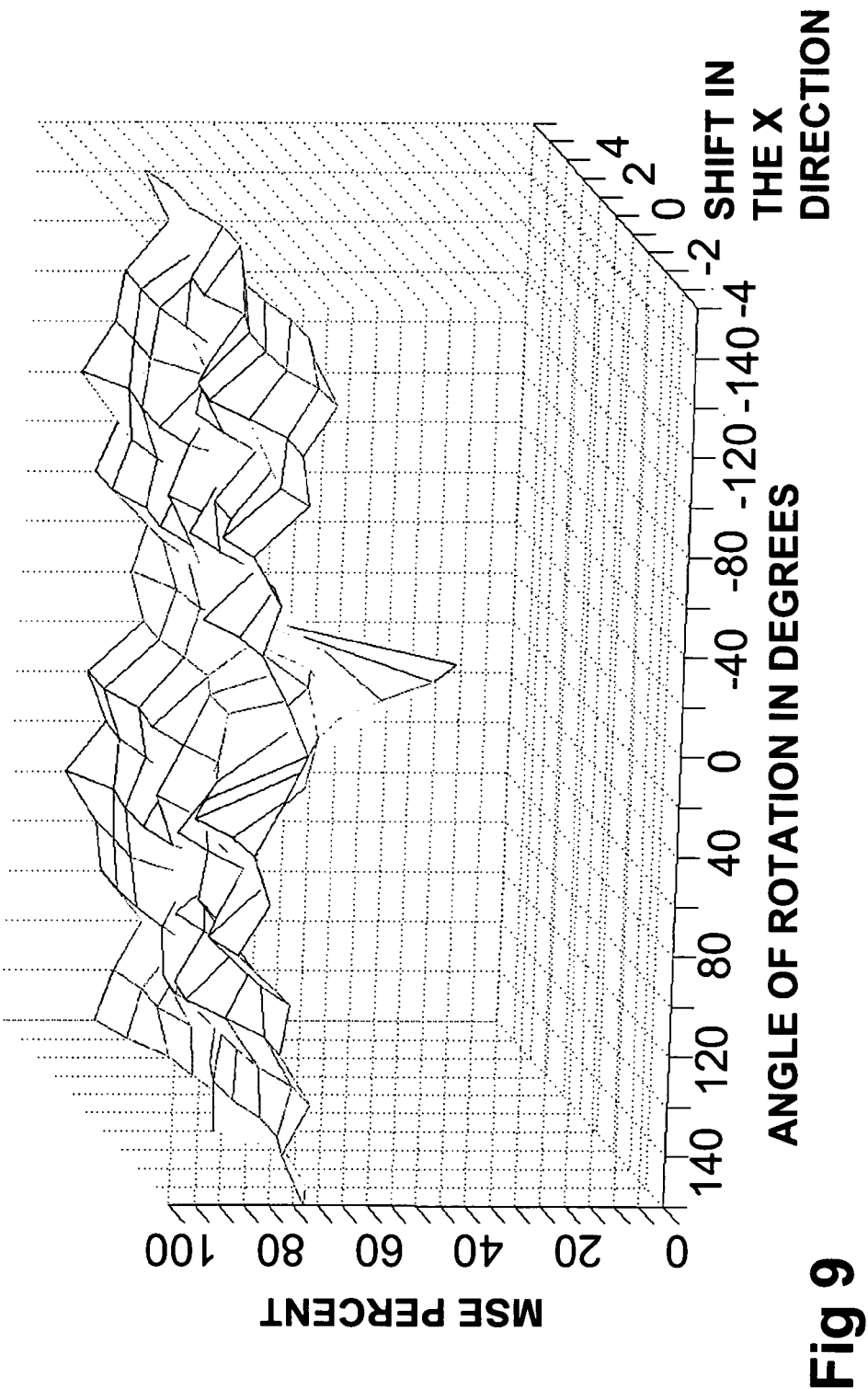
FIG. 9 shows, for images over Simi Valley, a plot of MSE vs. angle of rotation and shift in the X-direction, with the Y-position fixed at 1 pixel down from optimum.

FIG. 7 shows the track of an airplane flying in a circle over Simi Valley. The same method was used to determine the position and heading of the airplane at the time of each hit. Again, the positions are indicated by crosses, and the airplane headings are indicated by arrows. These arrows turned out to be tangent to the circular path and uniformly spaced along the arc. Each location and heading was precisely the true position and heading at the shot times.

By observing the sizes of houses, industrial buildings, roads, cul-de-sacs, and highways in FIG. 4, the spacing from pixel to pixel can be estimated to be approximately ten feet. Location accuracy to within a pixel corresponds to accuracy of about 10 feet. This level of accuracy is similar to that of GPS. With higher resolution aerial photographs and on-board cameras, even greater accuracy could be achieved by the cognitive memory.

GPS provides location of the aircraft relative to absolute latitude and longitude on the Earth's surface. The cognitive memory provides location of the aircraft relative to a previously taken aerial photograph. By using the cognitive memory, targets could be located on the aerial photograph, and an airplane could find the targets with pinpoint accuracy by telescoping the ground. Moveable as well as stationary targets could be found wherever they are. This cannot be done with GPS in the aircraft.

Figure 10:
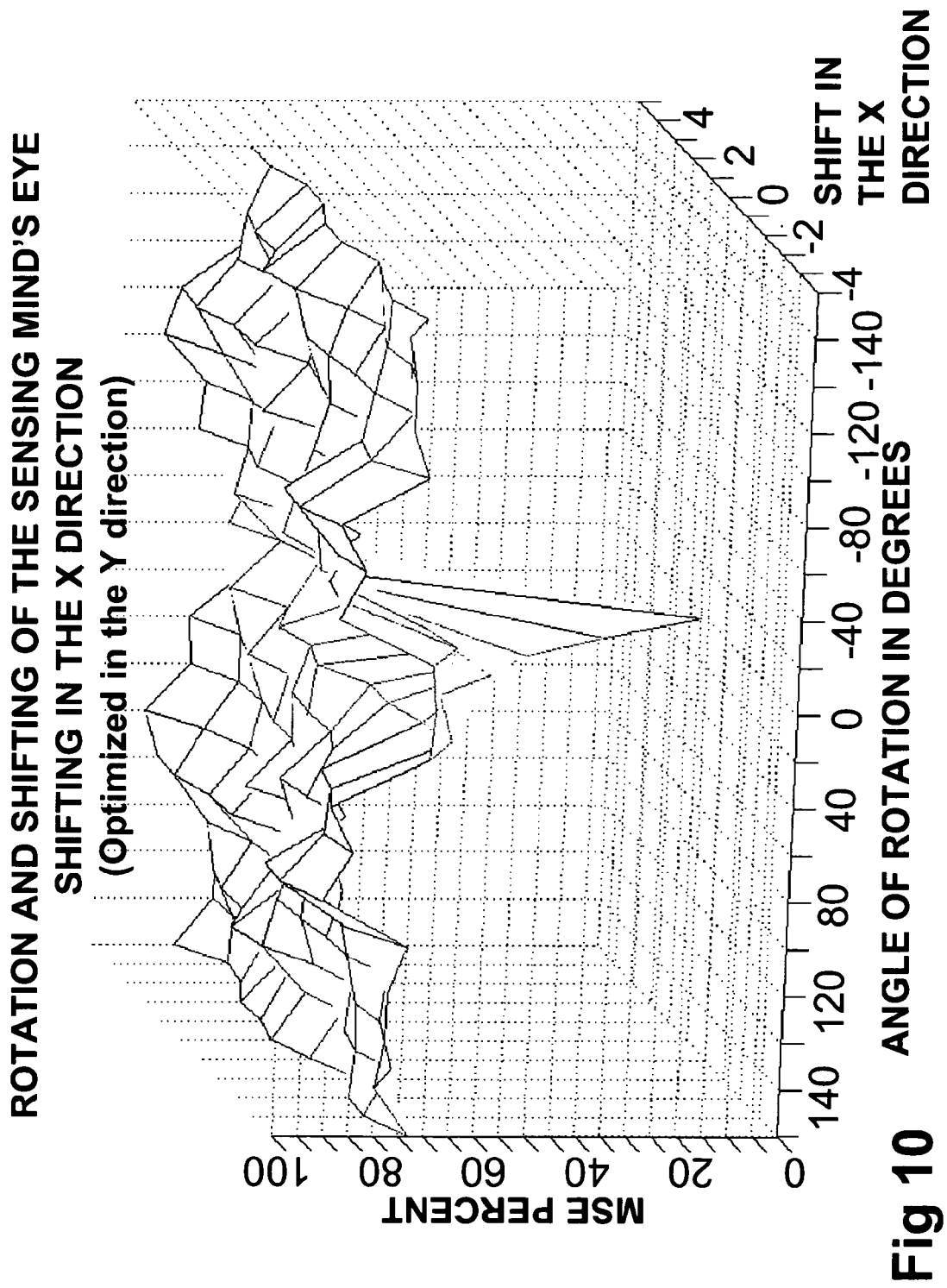
FIG. 10 shows, for images over Simi Valley, a plot of MSE vs. angle of rotation and shift in the X-direction, with the Y-position fixed at the optimum.
Figure 11:
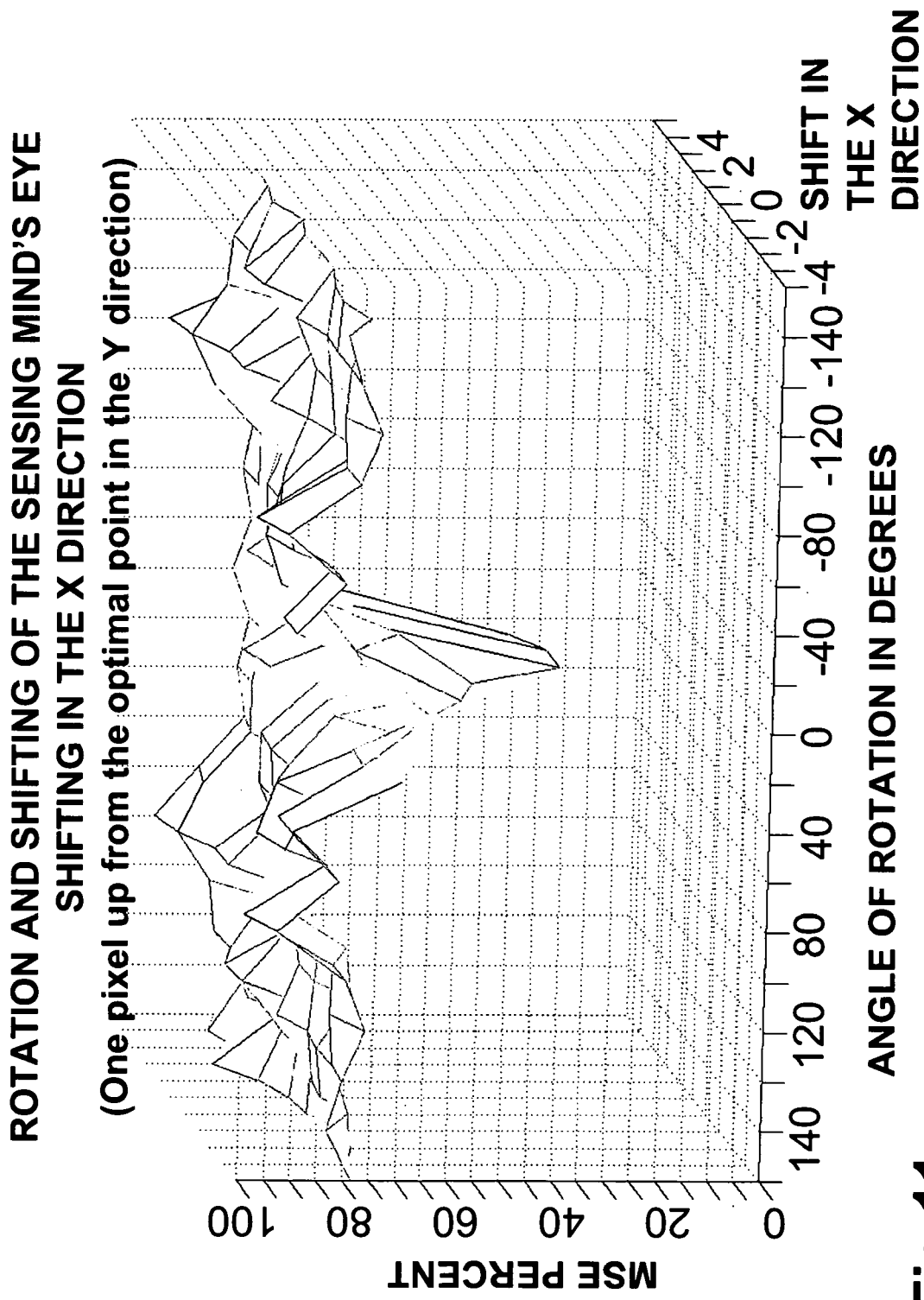
FIG. 11 shows, for images over Simi Valley, a plot of MSE vs. angle of rotation and shift in the X-direction, with the Y-position fixed at 1 pixel up from optimum.
Figure 12:
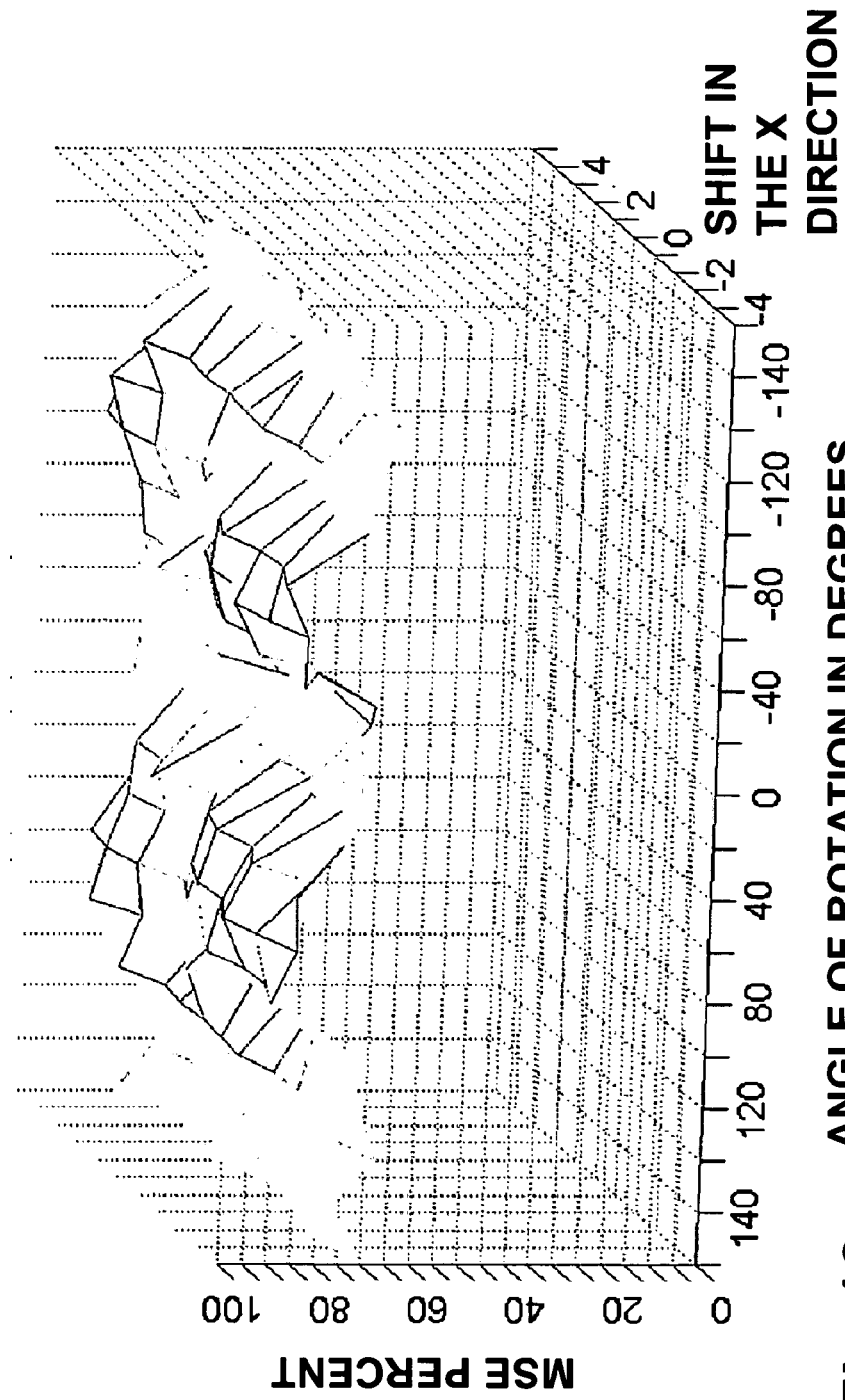
FIG. 12 shows, for images over Simi Valley, a plot of MSE vs. angle of rotation and shift in the X-direction, with the Y-position fixed at 2 pixels up from optimum.

FIGS. 8-13 pertain to one of the hits along the Simi Valley circular path. They show how position can be located at the exact pixel. Scanning the mind's eye is being done with left-right, up-down translation one pixel at a time, and scanning in angle is being done with 10-degree increments around all 360 degrees and subsequently with 1-degree increments over a small angular range when getting close to optimal. The plots in FIG. 8-13 show percent mean square error (MSE) as the mind's eye position is adjusted. Mean square error is the sum of squares of the pixel differences between the input and output patterns of the autoassociative neural network. A percent MSE below a set threshold indicates a hit. FIG. 10 shows percent MSE versus mind's eye rotation and translation along the X-direction with the Y-position optimized. There is a deep sharp dip in MSE. This indicates a hit. With the Y-position set to one pixel less than optimum in FIG. 9, there is still a dip when angle and X-position are varied. The dip is not as deep, and does not indicate a hit, but does indicate proximity to a hit. With the Y-position two pixels less than optimum in FIG. 8, there is still a small dip, but not very pronounced. FIGS. 11 and 12 show this effect for Y-positions one and two pixels greater than optimum.

Figure 13:
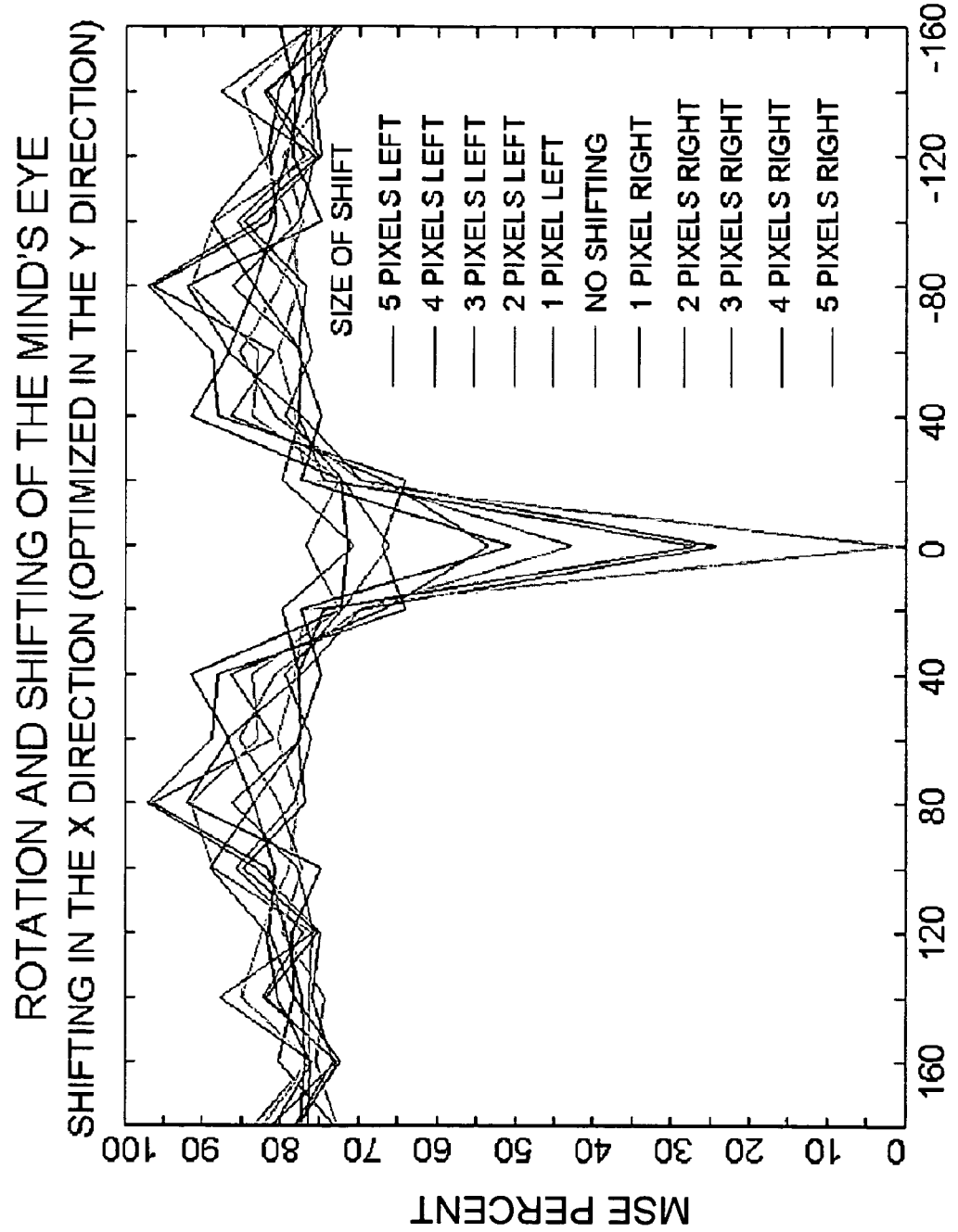
FIG. 13 shows a plot of percent MSE vs. angle rotation for various shifts in X-direction for mind's eye images taken over Simi Valley, with Y-position fixed at optimum, wherein different curves represent the MSE vs. rotation angle from optimum angle for different shifts in X-position from optimum.

The computer plot of FIG. 13 shows the dip effect in a different way. With the Y-position optimized, curves are plotted for percent MSE versus rotation angle for various X-positions. The deepest dip, indicating a hit, corresponds to the X-position optimized. The other curves correspond to the X-position one to five pixels away from optimum, in both directions. From these curves one can see that it is possible to pinpoint position at the exact pixel, and to sense direction within one degree.

Satellite Surveillance of Diego Garcia Island

Diego Garcia is a British-owned island in the Indian Ocean. On this island is a U.S. Air Force base used primarily for B52 and B2 bombers and KC135 tanker planes. A satellite photograph of Diego Garcia was obtained from a web site, and it shows aircraft parked in a tarmac area adjacent to the principal runaway of the island. The cognitive memory system of FIG. 2 was used to locate and identify the parked aircraft. Being able to do this would allow constant automatic satellite surveillance of Diego Garcia, and of any other airfield in the world.

Figure 14:
FIG. 14 shows a satellite photograph taken of Diego Garcia Island, including the runway on which aircraft are to be subsequently located and identified by the cognitive memory.
Figure 15:
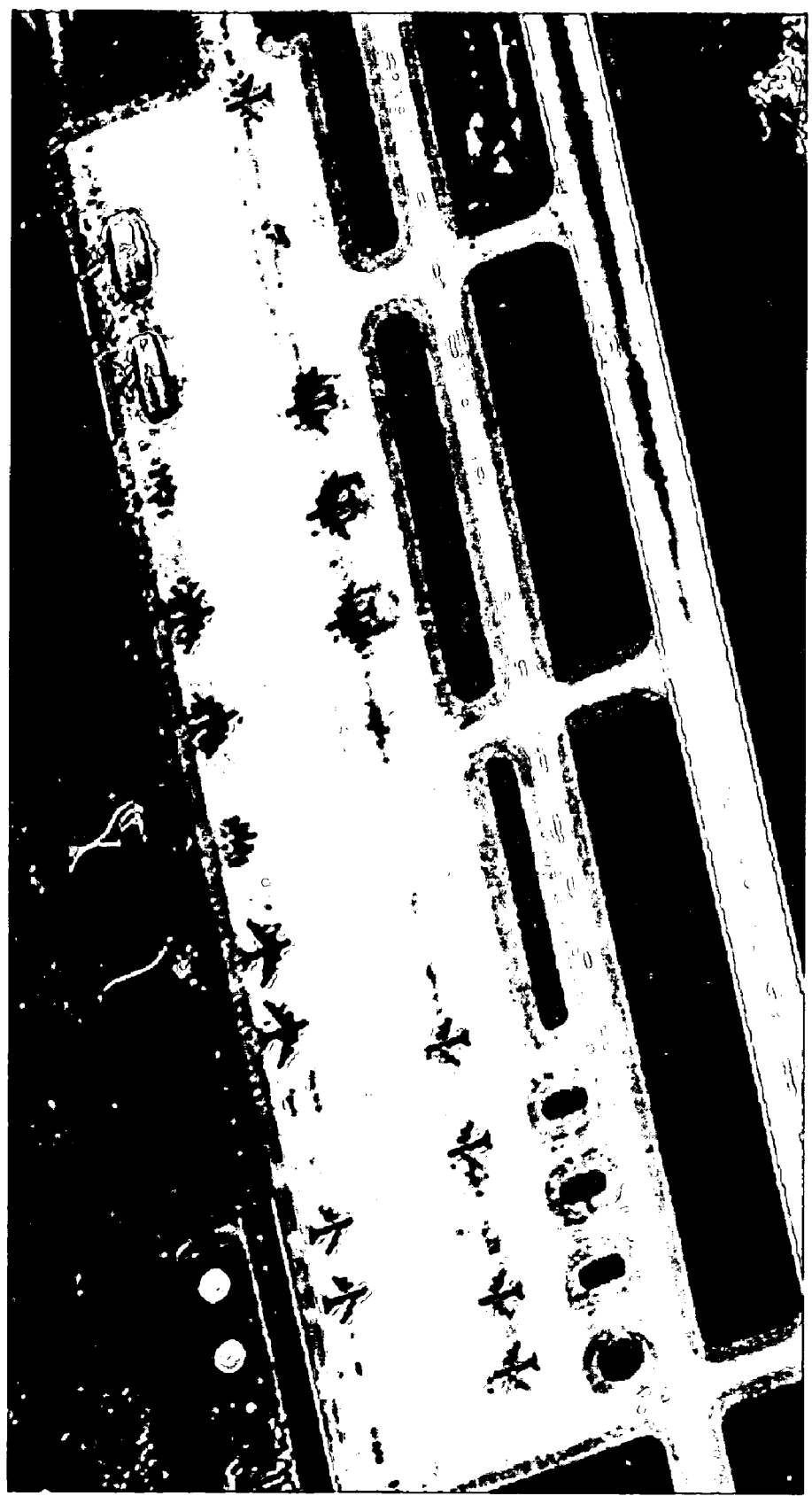
FIG. 15 shows a zoomed-in portion of FIG. 14, including all aircraft to be located and identified by the cognitive memory.

FIG. 14 is a satellite photograph of a major portion of Diego Garcia Island. Zooming in, the aircraft parked near the main runway are clearly visible in FIG. 15. The smaller 4-engine aircraft are KC135 tankers. The larger aircraft, each with 4 engine pods, are B52's. The B52 actually has 8 engines, 2 engines per pod. That much detail cannot be seen in the photographs. Looking at the upper row of aircraft, counting from left to right, there are two KC135's, then a space, then two B52's, then what appears to be a big grease spot on the tarmac but is a B2 stealth bomber, then two more B52's, then another big grease spot that is another B2, and finally two buildings that are B2 shelters. Looking at the lower row of aircraft, from left to right, there are two KC135's, then a space, then two more KC135's, then a big space, then three B52's, then a big space, and finally a KC135.

Figure 16:
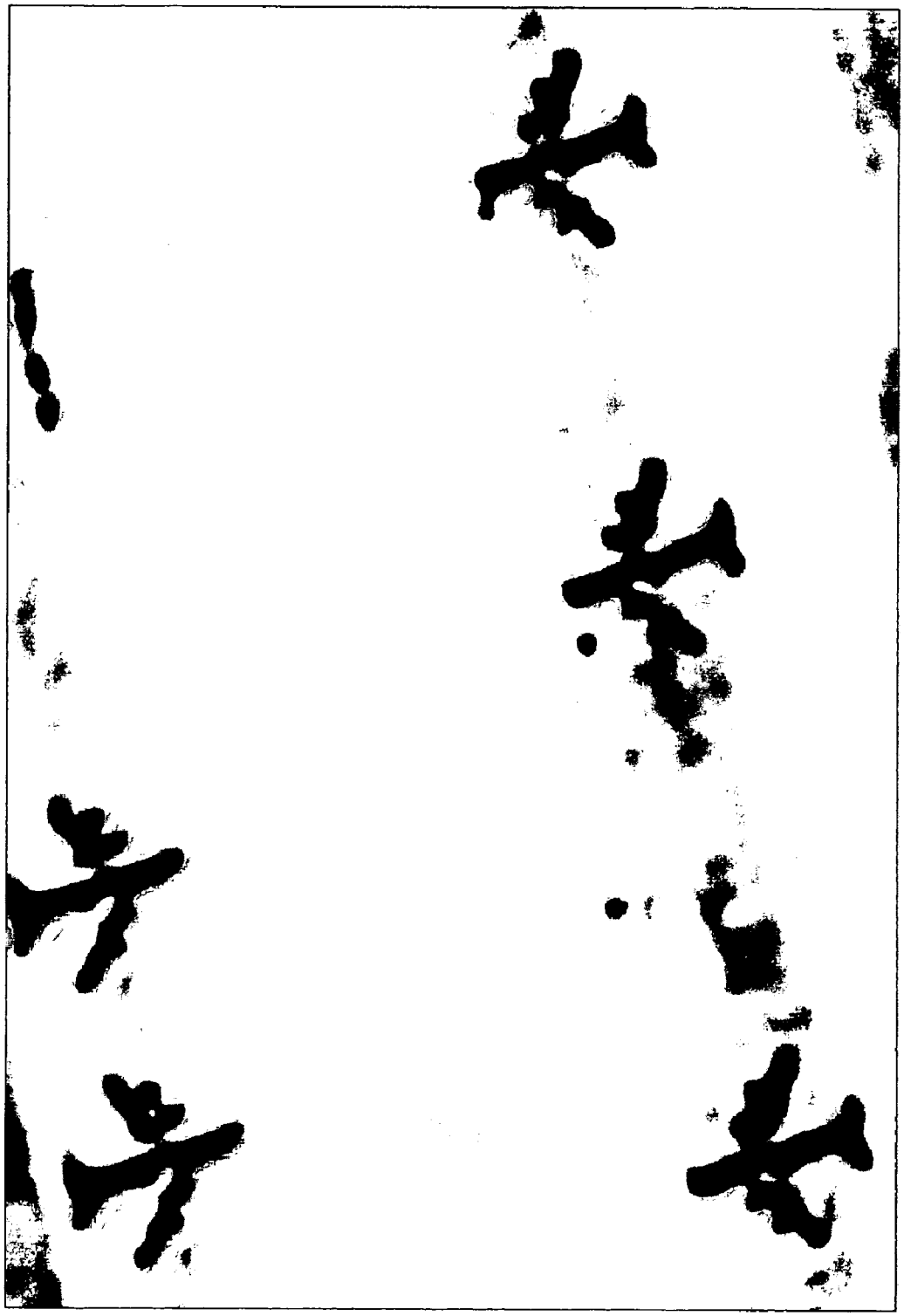
FIG. 16 shows a zoomed-in portion of FIG. 15, depicting five KC135s, two on the upper row, three on the lower row, where one image from the top two and one image from the bottom three were stored and trained into the cognitive memory.
Figure 17:
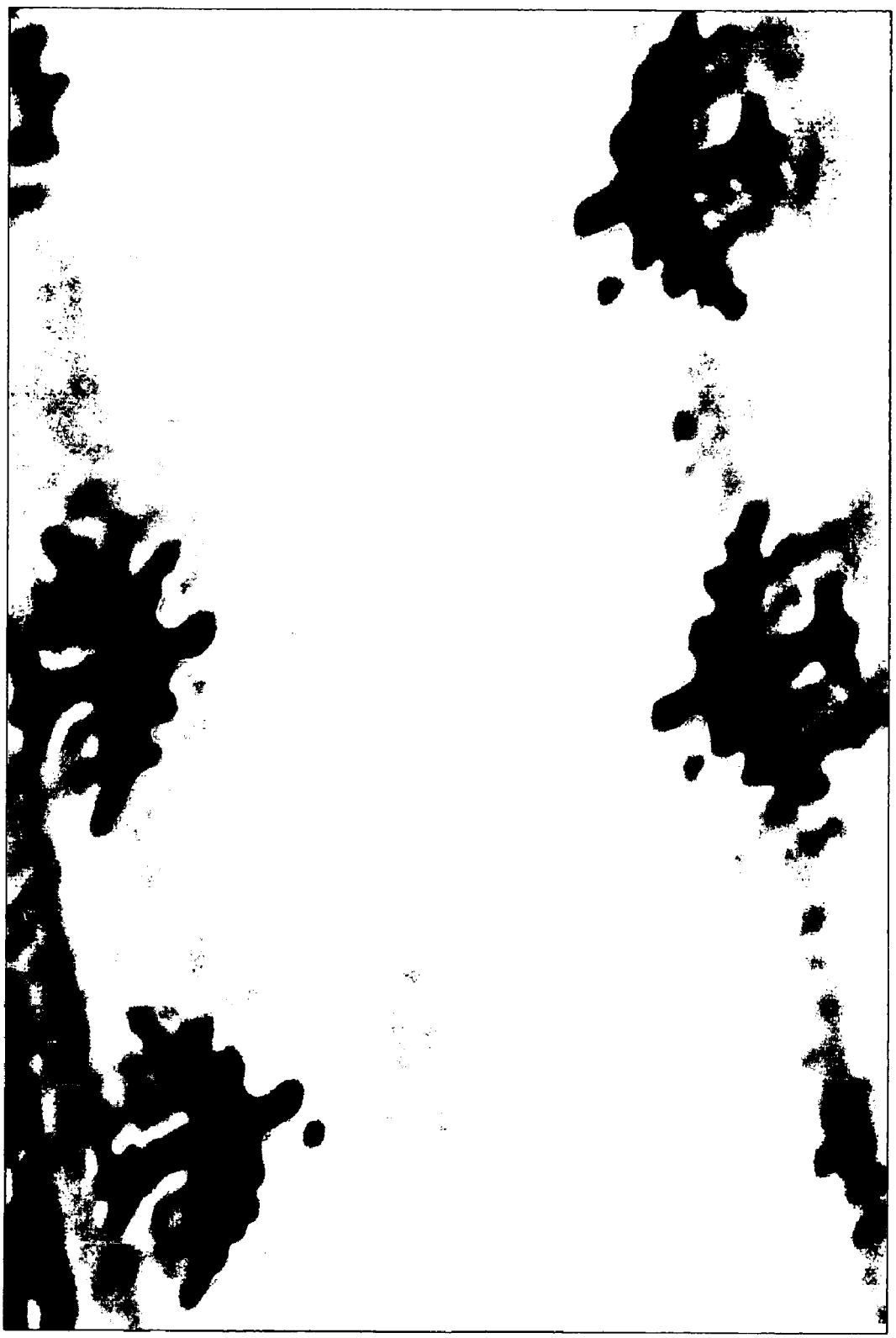
FIG. 17 shows another zoomed-in portion of FIG. 15, depicting four B52s, two on the upper row, two on the lower row, where one image from the top two and one image from the bottom two were stored and trained into the cognitive memory.

A zoomed-in picture of five KC135's is seen in FIG. 16. Two are from the upper row, and three are from the lower row. The upper row and lower row airplanes were parked in opposite directions, and the shadows and perspectives are opposite for these planes. The image of an upper row KC135 is not exactly a rotated version of the image of a lower row KC135. They are somewhat different images. The same effects can be seen regarding shadow and perspective for the B52's. In FIG. 17 four zoomed-in images of B52's are also visible. Dark shadows from the wings and fuselages are visible in the image.

Two of the B52 images from FIG. 17 were selected, one from the upper row and one from the lower row. These were treated as two separate images because of the differences in perspective and shadow. More images were created by translating these images left-right and up-down, so that their centers were moved over a (5 pixel×5 pixel) grid. The result was 25×2=50 different B52 patterns. All 50 of these patterns were recorded in a single memory folder in memory segment 1. In addition, the memory folder had the identification of the aircraft, e.g., B52. All of the airplane images in the memory folder were trained into the autoassociative neural network. Separate memory folders were used to hold images of KC135 and B2 aircraft, respectively. All of these images were trained into the same autoassociative neural network, the neural network of memory segment 1.

Images from the satellite picture of FIG. 14 taken within the mind's eye (a square area somewhat bigger than the B52 image) acted as prompts. The mind's eye square was programmed to scan (as in television scanning) the entire satellite photograph to look for hits. In each scanned position, the mind's eye was rotated in 5-degree increments, looking for a hit, looking to minimize the mean square error of the autoassociative neural network. When a hit took place, the memory segment was searched for correspondence with the mind's eye image that caused the hit, the memory folder was found, and the identification of the aircraft was downloaded from the memory folder. The X-Y location of the aircraft was determined from the X-Y coordinates of the center position of the mind's eye square when the hit took place.

A hit corresponded to the mean square error (MSE) of the autoassociative neural network being very low. As the mind's eye scanned and came upon the image of a B52, it scanned about this image up and down, left and right, making many hits because the B52 patterns were trained with 25 different positions. For each position of the mind's eye, many rotations with 5-degree increments were tried to find the best fit. Getting many hits and identifying them as B52, the computer screen showed "B52 Bomber." When the mind's eye scanned over a KC135, various positions and rotations gave a very low MSE. Then the computer screen indicated "KC135 Tanker." The detection error threshold was pre-set, but could be relaxed or tightened, as described above.

Figure 18:
FIG. 18 shows another zoomed-in portion of FIG. 15, depicting two B52s and one "grease spot," which is a B2 bomber, the rectangle drawn around which represents the "mind's eye" image stored and trained into the cognitive memory and used to identify the second B2 bomber in FIG. 15.

FIG. 18 shows the aforementioned "grease spot," which is a B2 bomber. The image within the "mind's eye" rectangle was stored in the cognitive memory and later recognized as a B2. After recording a hit with this B2 bomber, the memory folder storing B2 images ignored the B52s, but correctly identified the second B2 bomber. The image quality of the second B2 was much poorer than that of the first B2, which was the image used to train the system. In spite of this, the second B2 was detected, located and identified. There is a lot of tolerance in matching the prompt pattern to the corresponding trained pattern.

The structure of the autoassociative neural network was identical to that of the network in the cognitive memory used to track aircraft positions over Manhattan and Simi Valley, the same number of layers, neurons per layer, and weights per neuron.

The cognitive memory could have been trained to locate and identify many other types of objects on the island in addition to the aircraft, scanning over the entire aerial photograph. Once the cognitive memory has been trained to seek out and identify the types of objects of interest, scanning and detections can be made at very high speed with parallel hardware implementation.

Reading Chinese or Other Symbolic Characters

The cognitive memory system was used to recognize Chinese characters. A database of 20 000 Chinese characters was available. 10 000 of these were trained into the autoassociative neural network. When the trained network was tested, the trained patterns were all correctly identified as having been trained-in. Of the non-trained patterns, 97% were correctly identified as not having been trained in. Of the non-trained patterns, 3% gave false-alarm indications that they were trained in. One of the problems is that there are close similarities between certain Chinese characters.

Further tests were performed with a group of 1000 randomly selected Chinese characters. They were trained into a cognitive memory. FIG. 19 (a) shows one of the trained-in characters. FIG. 19 (b) shows the output of the autoassociative neural network. Ideally, the input pattern should be perfectly reproduced at the neural network output. In this case, the output was close to perfect, with an MSE of 0.25%. Certainly, the Chinese character of FIG. 19 (a) was recognized and identified.

Figure 20:
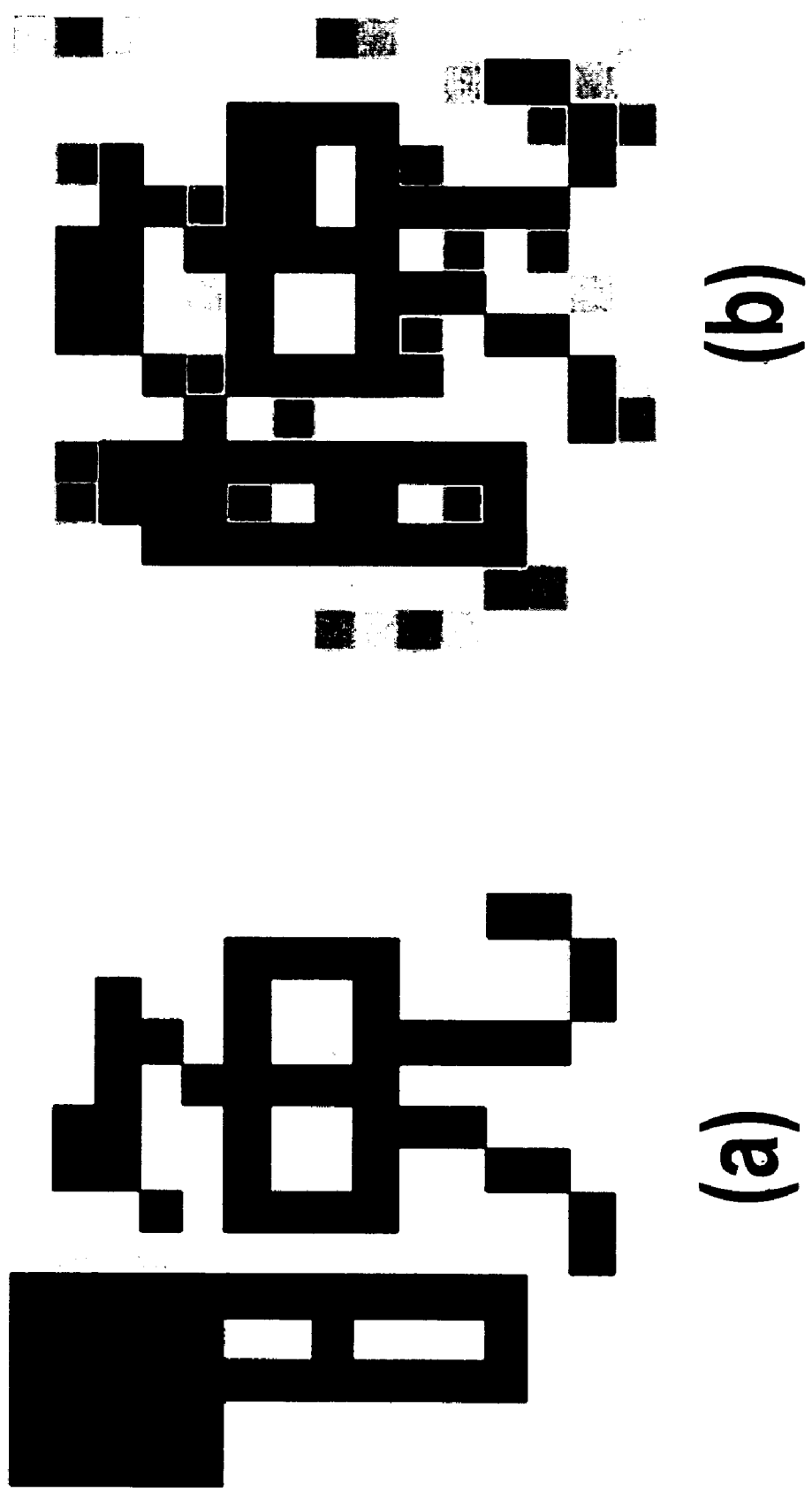
FIG. 20(a) shows a partially obscured version of the input pattern of FIG. 19 (a) applied to the same autoassociative neural network.
FIG. 20(b) shows the output pattern from the autoassociative neural network corresponding to the input pattern presented in FIG. 20 (a), with an MSE of 26.82%.

The Chinese character of FIG. 19 (a) was then partially obscured, as shown in FIG. 20 (a). This obscured pattern was then inputted to the already-trained neural network. The output, shown in FIG. 20 (b), does not perfectly match the original input of FIG. 19 (a). This is to be expected. There is an MSE of 26.82%. In spite of the error, the pattern of FIG. 20 (b) contains much of the original information. One could guess which character this is. The distorted character could probably be recognized, but one would need to accept a high MSE when calling this a hit.

Figure 21:
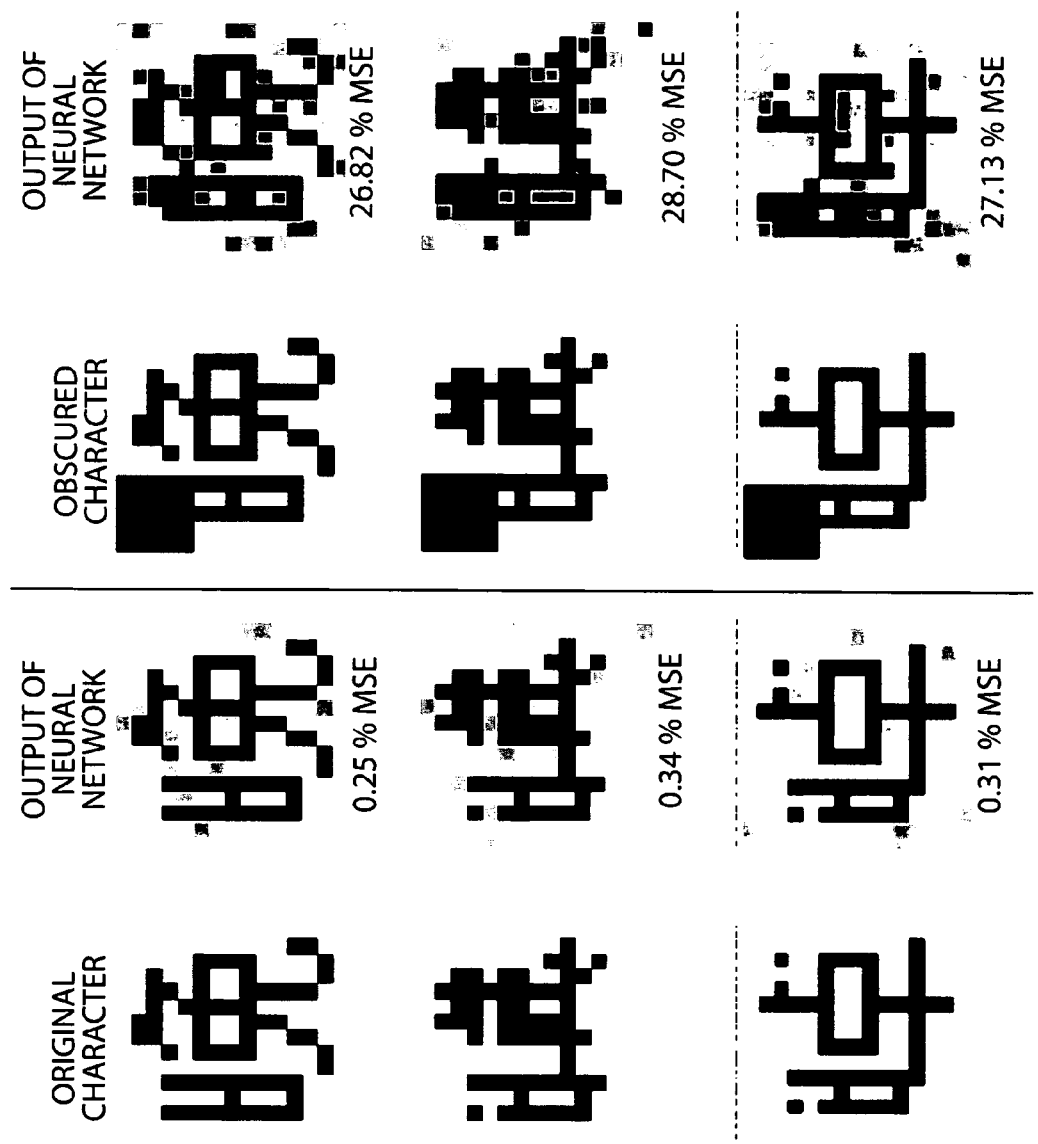
FIG. 21 shows a series of three original Chinese characters and three partially obscured versions, along with their corresponding output patterns and resulting percent MSE's from the autoassociative neural network of the cognitive memory trained to recognize Chinese characters.
Figure 22:
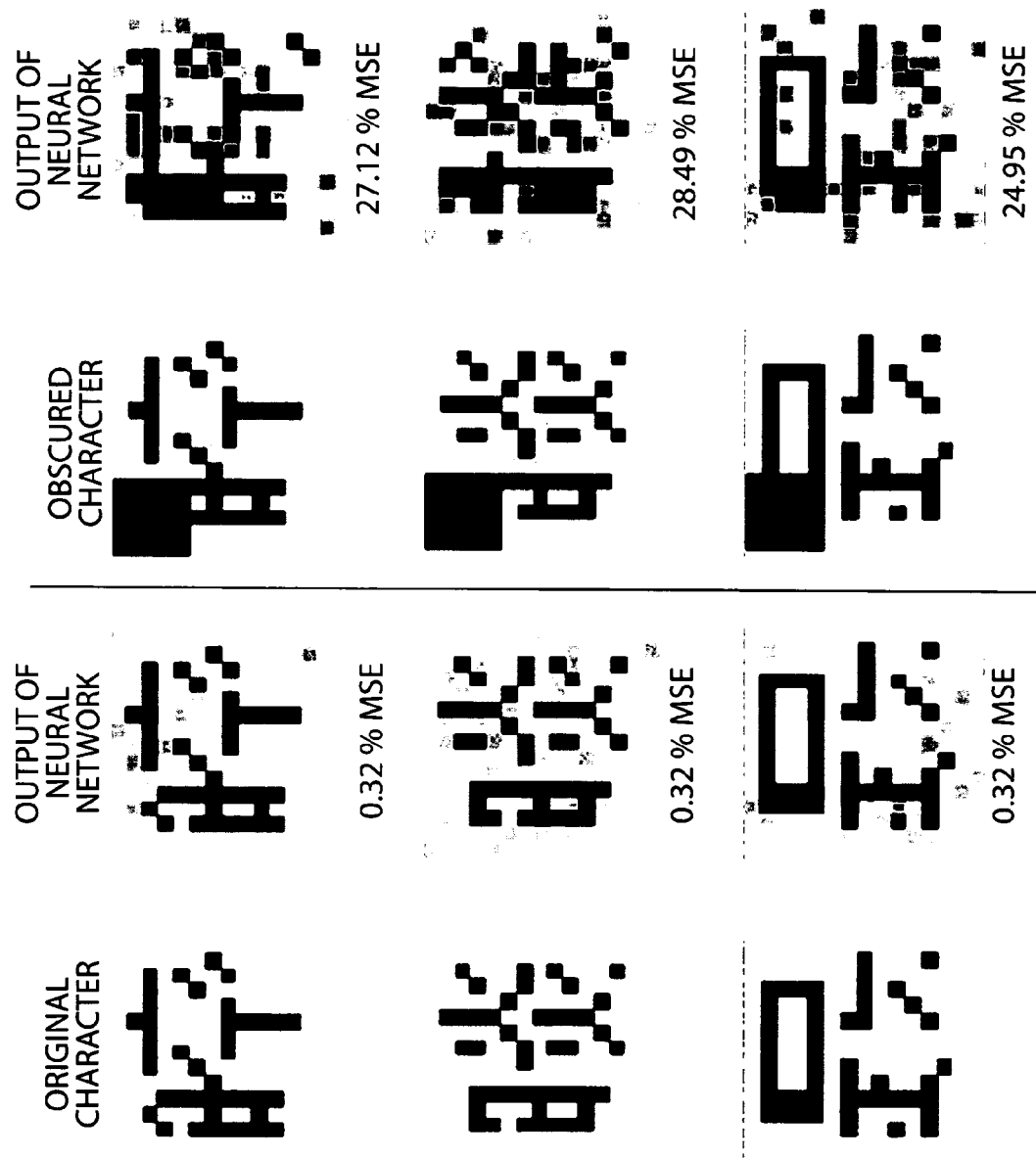
FIG. 22 shows a series of three more original Chinese characters and three more partially obscured versions, along with their corresponding output patterns and resulting percent MSE's from the autoassociative neural network of the cognitive memory trained to recognize Chinese characters.

All of the trained Chinese characters gave almost perfect responses at the autoassociative neural network output. The partially obscured patterns gave surprisingly good outputs from the neural network, as can be seen from the examples of FIGS. 21 and 22.

The implications of this test are that it would be possible to read Chinese printing even if the printing were not perfect. If a cognitive memory were used to find aircraft, tanks, etc. in aerial or satellite photographs and these objects were partially obscured, correct identification of these objects may be possible. This is a very difficult task for all pattern recognition systems.

These same principles and techniques may be applied to other symbolic or pictographic characters, such as Vietnamese characters, Sanskrit characters, characters or symbols of any written language, hieroglyphics or pictographic symbols or representations, or the like.

Face Recognition

Recognition of human faces can be accomplished by making use of the cognitive memory of FIG. 2. Referring to FIG. 23 (a), three photographs of Bernard Widrow can be seen. These were used for training. FIG. 23 (b) is a test photograph in which Bernard Widrow, Victor Eliashberg, and Juan Carlos Aragon can be seen together. The problem is to automatically scan the test photograph, locate and identify the face of Widrow, and reject background objects and the faces of Aragon and Eliashberg. Widrow's face had been trained in; the others had not been trained in.

Referring to the three training photographs of FIG. 23 (a), each photograph is seen with a square window—the "mind's eye"—superposed. These square windows are manually located on the facial images. They are made to have various sizes, three different scalings, for each of the photographs. The placements and the sizes are not critical. Most of the windows were set to capture the two eyes and the nose. Each window was rotated clockwise and counterclockwise over seven different angles of rotation, spaced two degrees apart. The image within each window was adjusted in brightness for two different levels. Thus the number of training patterns obtained from within the windows was three times seven times two, or 42 patterns. Each pattern was digitized to have 50×50 pixels. This was made possible by interpolating the original photograph and re-sampling for each of the windows. Since there were three different training photographs, the total number of training patterns was 126. All of these training patterns were stored in a single memory folder 27 of the first memory segment 25, and were labeled "Widrow."

The 126 training patterns were trained into the autoassociative neural network 60 by making use of the backpropagation algorithm. Training was done to make the error, the differences between the input pattern vector and the output pattern vector very small. The mean square error (MSE) is the sum of the squares of the components of the error vector divided by the number of components. Typically, the largest mean square error among all of the training patterns was 0.25%. The percent mean square error is defined as the ratio of the actual mean square error to the maximum possible mean square error.

The numbers of pixels for each training pattern was 50×50=2500 pixels. This number of pixels is exemplary and other larger or smaller number of pixels may be used. Furthermore, the training pattern or window need not be square but may have a different number of pixels in each dimension, such as in each row and column. The autoassociative neural network was designed to have 1800 neurons in its first layer. Each of these neurons had 2500 weights. The network was designed to have 1200 neurons in its second layer, each with 1800 weights. The network had 2500 neurons in its third and output layer, with 1200 weights each. The number of inputs was 2500, and the number of outputs was 2500. The total number of neurons was 5500, and the total number of weights was 9 660 000. The choices of number of layers, number of neurons, and number of weights was not critical. Wide variations in these parameters gave equivalent results. This neural network was the high-resolution network.

A low-resolution autoassociative network was an independent structure and was independently trained. Low-resolution patterns having 20×20 pixels were obtained from the three training photographs of FIG. 23 (a) in a manner similar to that used to obtain the high-resolution patterns. Again, the size and shape of the low-resolution pattern in this example is exemplary and may be larger or smaller. The low-resolution autoassociative network had 400 neurons in its first layer, each with 400 weights. There were 250 neurons in the second layer with 400 weights each. The third and output layer had 400 neurons with 250 weights each. The total number of neurons was 1050, and the total number of weights was 360 000. Once again, wide variations in these parameters gave equivalent results. The low-resolution and high-resolution networks were similar in structure and training methods, but were used for different purposes. Once these networks were trained, they were used to meet the pattern-recognition objectives.

Figure 24:
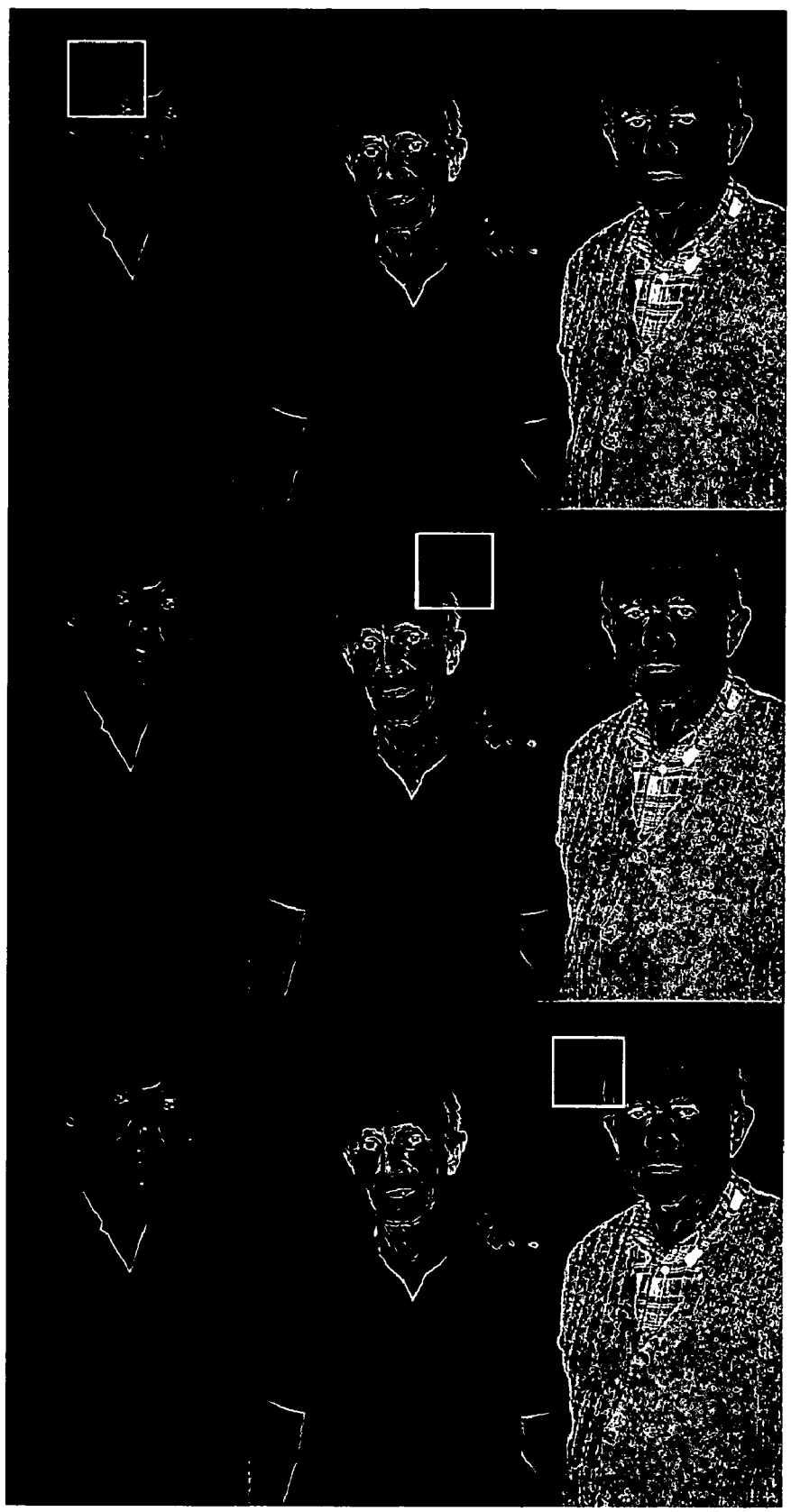
FIG. 24 shows a sequence of three locations of the sensing window (the mind's eye) as the cognitive memory scanned the test photograph of FIG. 23 for faces with a low-resolution neural network.

The low-resolution network was used to locate the various faces in the test photograph of FIG. 23 (b). In FIG. 24, a window is scanned over the photograph like a TV scan, left to right, then lower, then left to right again, then lower, then left to right again, etc. In each position, the pattern in the window is applied to the low-resolution network. The window was rotated in two-degree increments, eight different window sizes, and sixteen different brightnesses. When the best combination of these variables was found (minimum mean square error—MSE) for each window position, the MSE was compared with a pre-set threshold. When the window was centered on one of the faces, the best combination of rotation, scaling, and brightness resulted in a very low mean square error, and the autoassociative network thereby gave a hit indication, and a face had been located. Refer to FIG. 25.

Once a face was detected, the system switched over to the high-resolution network. The initial center of the high-resolution window was taken from the center of the low-resolution window corresponding to the low-resolution hit. The same low-resolution network was equally effective in detecting all three faces in the test photograph. This is the advantage of the low-resolution approach, to find the faces before performing high-resolution sensing. The 20×20 patterns allow the detection of a face, but not a determination of whose face it is.

It will be appreciated in light of the description provided herein that although high-resolution and low-resolution networks and or images or photographs are described, that one or any plurality of networks and/or images or photographs may be employed. So for example, in addition to a high-resolution network and low-resolution network and/or images or photographs, one or more intermediate networks (such as for example a mid-resolution network having a resolution somewhere between the resolution of the high-resolution and low-resolution networks) may be used. These mid-resolution or other intermediate resolution networks may be used in a manner analogous to that described for the low-resolution and high-resolution networks. For example, the mid-resolution network may also be used to locate the various faces in the photograph.

Furthermore, although embodiments of the invention may primarily utilize a low-resolution version of a high-resolution image, it will be appreciated that other embodiments may instead or additionally utilize a low-resolution or mid-resolution or a plurality of intermediate resolution images based on the high-resolution image or on one of the other higher-resolution intermediate images.

The relationship between the resolution or image detail available in the low-resolution, high-resolution, and one or a plurality of intermediate resolution need not be fixed and may be problem or scenario specific. In one embodiment the ratio of resolution difference between the high-resolution and the low-resolution may be between 1.1:1 and 100:1, whereas in another embodiment the resolution ratio may be between 2:1 and 20:1, while in yet another embodiment the resolution ratio may be between 2:1 and 10:1, and in still another embodiment the resolution ratio may be between 2:1 and 5:1. Ratios of resolution, spatial frequency content, detail or other such measures of the information content of the images or photographs may be any ratio within these ranges and are not constrained to be these specific values. In each case where one or more intermediate resolutions is provided, that or those intermediate resolution(s) will lie between the resolution of the low-resolution and high-resolution. In some instances the resolution may be at or near the average resolution of the high-resolution and low-resolution while in other instances the intermediate resolution may be nearer the low-resolution or high-resolution. Where a plurality of intermediate resolutions are employed, they may be distributed in any way between the low-resolution and high-resolutions. Typically the number of different resolutions and the resolution itself will be chosen to provide efficiency and good performance.

In FIG. 25 (b), one can observe some of the search process with the high-resolution network. Windows were constructed of 10 different sizes over 15 different left-right, up-down positions, over 7 different rotation angles spaced two degrees apart, with 40 different brightness levels and 16 different contrast levels. The brightness and contrast parameters are similar to those of a conventional TV set. In FIG. 25, the face did not cause a hit with the high-resolution neural network. The face was not recognized.

In FIG. 26, another face was detected by the low-resolution network. Scanning over the face with the high-resolution network, varying left-right, up-down position, rotation, scaling, brightness, and contrast as before, a hit occurred. This gave a hit pattern corresponding to one of the training patterns. All training patterns were stored in memory folder 27. The memory folder was then searched to find this training pattern by comparing the hit pattern on a pixel-by-pixel basis with each of the patterns in memory folder 27. The error was minimized in comparison with one of the patterns in the memory folder. This pattern was labeled "Dr. Widrow." Therefore, the face was identified as belonging to Widrow.

In FIG. 27, another face was detected, and with high-resolution examination, there was no hit. Therefore, the face was not recognized.

When scanning a photograph to find and recognize a face or another object of interest, this could be done with three-stages: low-resolution photo and autoassociative neural network, medium-resolution photo and autoassociative neural network, and high-resolution photo and autoassociative neural network. This could also or alternatively be done with one stage, two stages, or three or more stages. For example, if computational burden or efficiency is not a primary concern a single stage process may be implemented using only a single resolution sufficient to perform the scanning and recognition. This might be the equivalent to the high-resolution and autoassociative neural network approach. Where efficiencies and reduction of computational burden may be desired, then a multi-resolution approach may be undertaken, such as an approach using one or more lower-resolutions and autoassociative neural networks.

A relaxation method was used to obtain the best combination of parameters: translation, rotation, scale, brightness, and contrast. It will be appreciated that other methods or scenarios may benefit from other image or photographic processing techniques such as spatial filtering, edge detection, brightness and contrast adjustments, perspective transformation, warping, distortion correction, image to image registration, gray-level histogram modification or equalization, or any other image processing techniques known in the art. For example, image processing techniques such as are provided by Adobe Photoshop™ CS2 image processing software may be utilized with aspects of the invention. In addition, to create prompt patterns from query input patterns or photographs, one could process the query input patterns and/or the photographs or images, such as for example by rotating, translating, scaling, varying or adjusting brightness, varying or adjusting contrast, varying or adjusting color characteristics, varying or adjusting color saturation or removing color, vary perspective, distorting or removing distortion, distending, compressing, squeezing, shearing, warping, or other processes that alter the tonality or geometry of the patterns or photographs, when attempting to find a "hit" with the autoassociative neural network.

Figure 32:
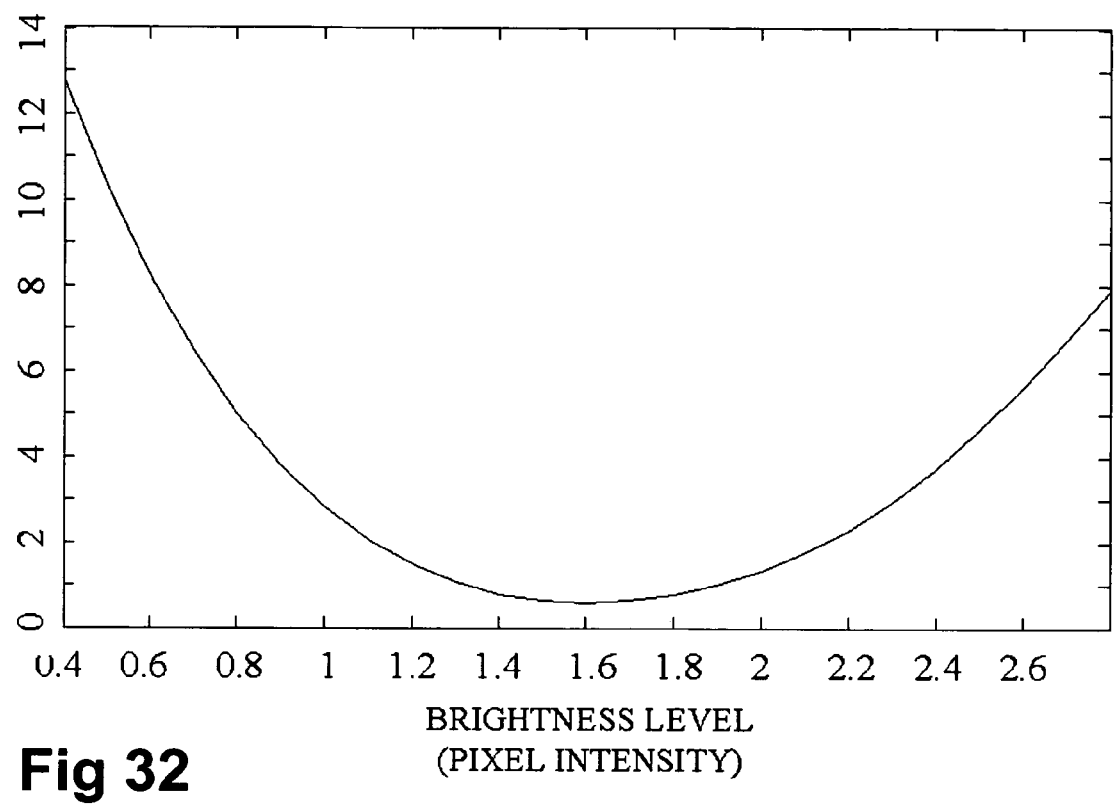
FIG. 32 shows a plot of the effects on percent MSE due to variation in image brightness, as the brightness is adjusted up and down from optimal brightness level while the cognitive memory scanned Bernard Widrow's face in the test photograph of FIG. 23 with the high-resolution neural network.

With these parameters optimized, FIG. 28 shows how the MSE of the autoassociative neural network increases as left-right translation is changed from optimal. FIG. 29 shows how the MSE increases as up-down translation is changed from optimal. FIG. 30 shows percent MSE as the window size is zoomed in and out relative to the optimal window size. FIG. 31 shows how rotation affects MSE, and FIG. 32 shows how pixel intensity, or brightness, affects MSE. These curves are quite smooth and easy to search with relaxation methods. That is one of the great advantages in working with an autoassociative layered neural network. Another advantage of working with an autoassociative neural network that distinguishes this approach from the prior art, is that multiple photographs of an individual can be used to generate training patterns, thus improving recognition accuracy over training with a single photograph.

Other pattern recognition problems were solved by using the cognitive memory system of FIG. 2. Multiple photographs of each of 144 persons were available. A single photograph of each of 44 persons was selected for training. Each training photograph was varied by rotation, translation, scaling, brightness and contrast, as with the Widrow training photographs above. Thus, each training photograph was made into 42 training patterns. The 42 training patterns for each person were stored in an individual memory folder and were labeled by the name of the corresponding person. There were 44 memory folders storing the training patterns for the 44 persons. The autoassociative neural network 60 was trained with all of the patterns in all the memory folders, with a total of 1848 patterns.

Figure 33:
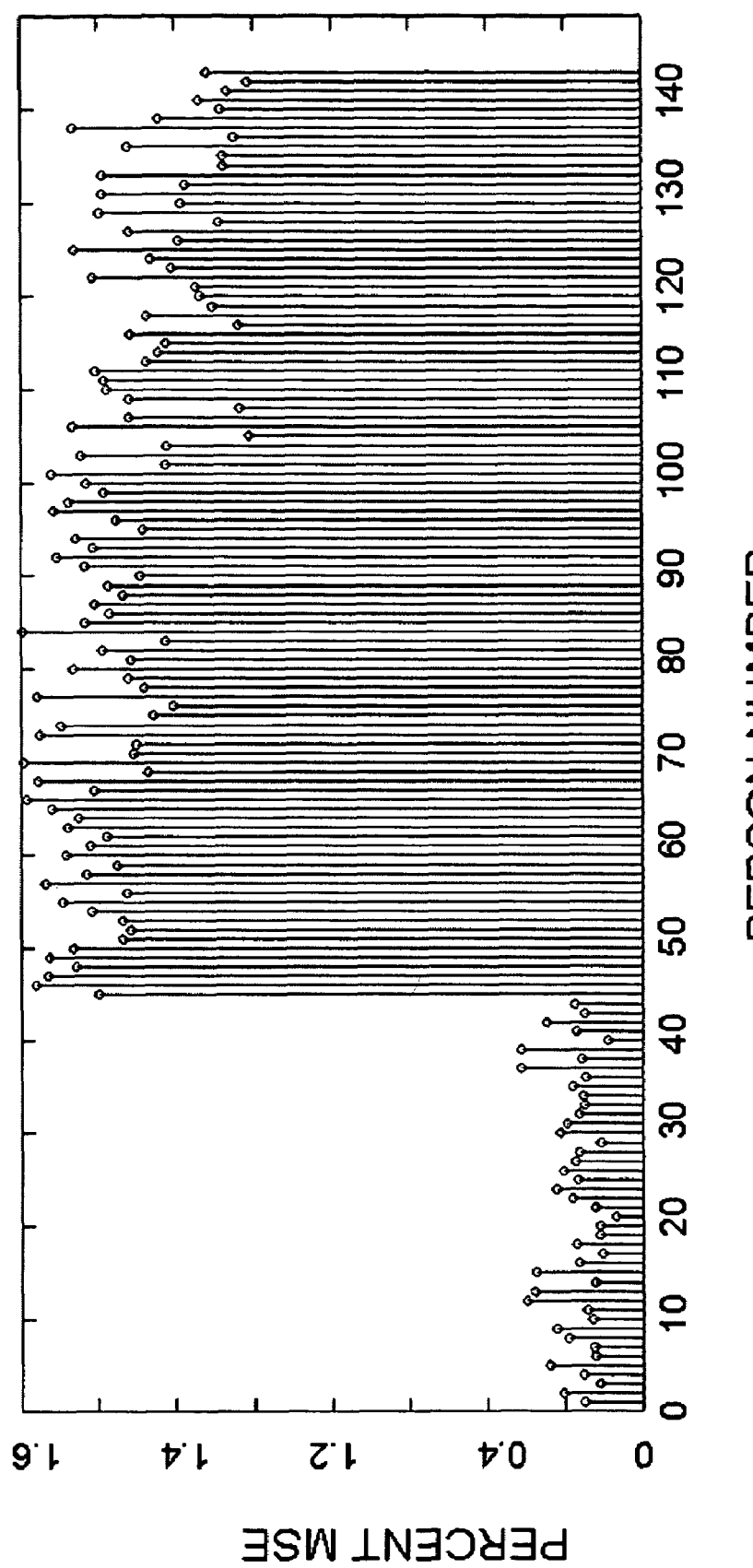
FIG. 33 shows percent MSE for trained-in and non-trained-in faces in the autoassociative neural network that was trained on 44 individuals' faces, showing a high percent MSE for non-trained-in people and a low percent MSE for the 44 trained-in people.

The memory system was prompted with a set of 144 photographs from the 144 individuals. For the 44 people whose photographs were trained in, prompting photographs were selected that were different from the training photographs. Each of the prompting photographs was converted to many prompting patterns by varying rotation, translation, scaling, brightness, and contrast. By optimizing these adjustments, some hits were obtained. By sensing the prompting patterns with the trained autoassociative network, hits were obtained with 44 of the 144 prompting photographs. FIG. 33 shows the distribution of minimum percent MSE obtained for each optimized prompting photograph. Persons 0-43 were trained into the autoassociative neural network; the remaining 100 were not. The lower MSE's were obtained for the 44 trained-in persons. The high MSE's were obtained for the remaining 100 non trained-in persons. The 44 prompting photographs that generated hits corresponded exactly to the persons whose photographs were trained in. The remaining 100 photographs produced no hits. The hit photographs were compared on a pixel-by-pixel basis with the photographs stored in the memory folders. The selected patterns from the memory folders allowed identification of the 44 persons. The 44 prompt photographs of the trained-in persons were perfectly identified, and the remaining 100 prompt photographs were rejected. The 144 test patterns, the unknown prompt patterns, were correctly classified into 45 different categories. The 44 trained-in persons were perfectly identified, and those not trained in were perfectly identified as unknowns.

Another pattern recognition problem was solved by means of the cognitive memory of FIG. 2. The photograph of a single known individual was available for training. Many training patterns were generated from this single photograph by varying rotation, translation, scaling, brightness, and contrast. These patterns were labeled and stored in a memory folder. After training the autoassociative neural network with these stored patterns, hundreds of other prompt patterns were processed by varying rotation, translation, scaling, brightness, and contrast. These prompt patterns did not include the training patterns but did include other patterns of the same trained-in person, and thousands of patterns of not persons trained in. The cognitive memory system was able to identify most of the prompt photographs of the trained-in person and was able to reject all of the photographs of the non trained-in persons. Not all photographs of the trained-in person were identified, because of differences in perspective of the facial images. The tolerance for perspective differences is about +/−15 degrees, as determined by experimentation. To be able to recognize a face from all perspectives, training photographs from more perspectives are required. With this test, different photographs of the trained-in face were able to be distinguished from thousands of photographs of other people. Choosing the right person's face from thousands of other faces is an almost impossible task for other methods of face recognition.

The methodology of a human face recognition process can be summarized by the following steps:
(1) Photographs or other images of a plurality of persons and their respective identities are stored in a face recognition system.
(2) Additional photographs or other images, if needed, may be created from the original photographs or other images of identified persons by any combination of translation, rotation, scaling, brightness adjustment, or contrast adjustment, and stored in the face recognition system with the same respective identities.

(3) The faces in the photographs or other images from steps (1) and (2) are located and trained into one or more autoassociative neural networks, which are part of the face recognition system.

(4) A query photograph, a photograph or image presented to the face recognition system for identification that may contain one or more faces to be identified, is presented to the face recognition system.

(5) All facial images that may be present in the query photograph are located.

(6) All portions of the query photograph containing located facial images, if needed, may be pre-processed by any combination of translation, rotation, scaling, brightness adjustment, or contrast adjustment to create prompt patterns for the autoassociative neural network.

(7) The various prompt patterns are applied as inputs to the trained autoassociative neural network and, if the error in the difference between a prompt pattern input and the resulting autoassociative neural network output pattern is below a pre-set threshold, there is a "hit," and the prompt pattern is considered successful. If there is no hit, no faces are identified.

(8) If there is a hit, the successful prompt pattern is compared with all stored original facial images and all facial images that may have been created from them to find the best match.

(9) The best matching photographs or images and their identities will be delivered as the output of the face recognition process.

Applications for Face Recognition

There are many applications for a system that can recognize human faces. The following applications are representative. They are not all-inclusive. Many other applications are possible based on the present invention.

Surveillance

Surveillance by face recognition is useful at airports, train stations, seaports, international entry points, public places, buildings available to the public, etc. The problem is to detect known undesirables, criminals, terrorists, etc., simply by observing them with cameras as they walk by security checkpoints. The cameras could be hidden or unobtrusive. A sequence of photographs of persons going past a security checkpoint would include images of their faces at many different distances and perspectives. More than one camera could be used to take pictures, providing even more perspectives. If multiple faces appear within the field of view of a camera, they can be located with a low resolution system as described above, and separately analyzed with a high-resolution system as described above.

Figure 34:
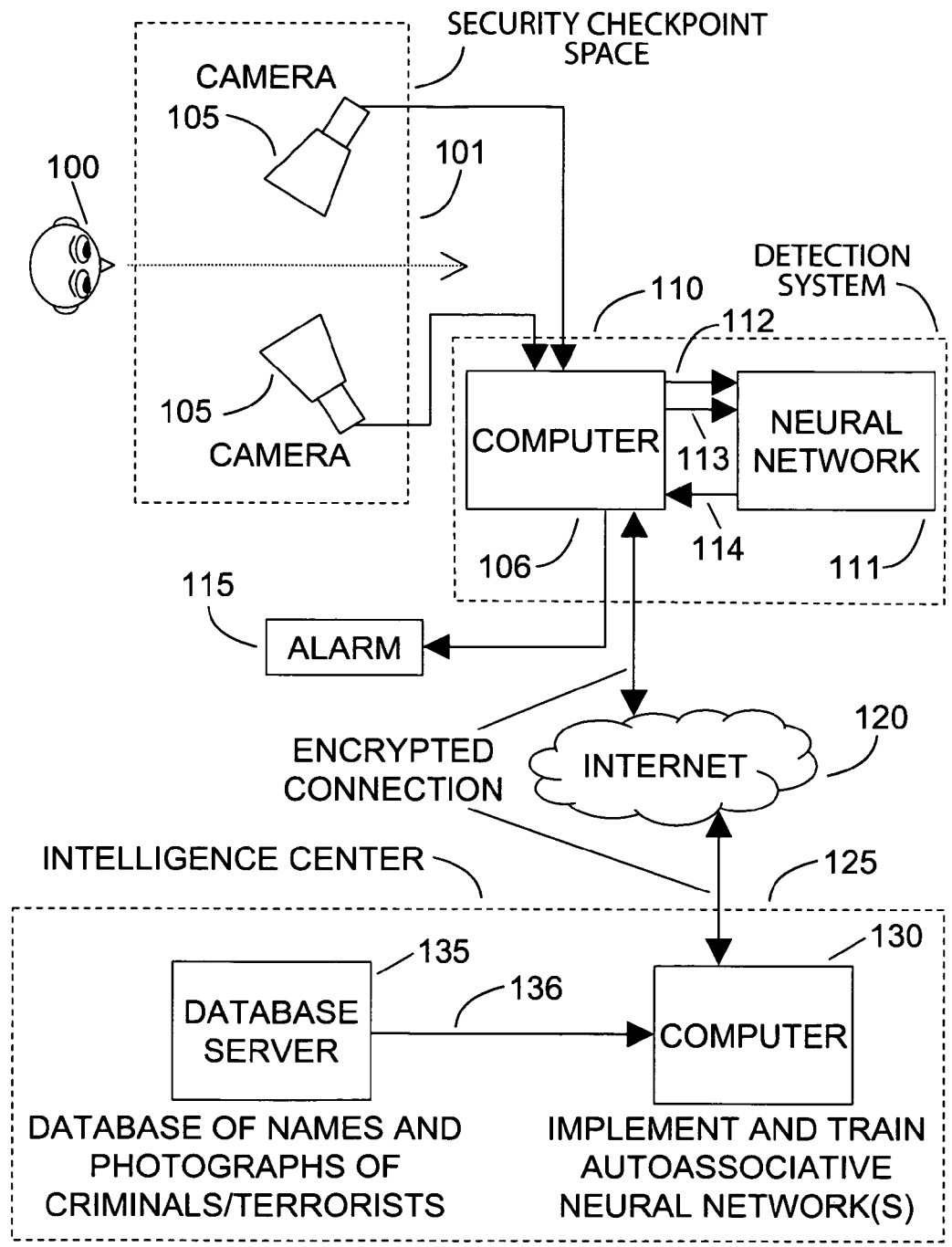
FIG. 34 shows a surveillance system based on face recognition, at a security checkpoint using the cognitive memory of this invention.

Referring to FIG. 34, a person 100 walks through a security checkpoint 101 and is photographed by camera 105. The camera signal or signals are fed to computer 106 for analysis by a detection system 110. This detection system is connected through the Internet 120 to an intelligence center 125. This intelligence center 125 communicates by encrypted connections through the Internet to many detection systems located at remote sites, at airports, seaports, train stations, etc. Note that any computer network in addition to the Internet 120 that connects the detection system 110 to an intelligence center 125 could also be used. For example, a secure direct connection might be used to provide communication between detection systems 110 and the intelligence center 125.

The intelligence center 125, which contains a server computer 135 that stores a database of names, photographs, and other important data regarding criminals, terrorists, and suspects. The photographs and ancillary data of a selected group of undesirables to be tracked are transferred from server 135 via connection 136 to the computer 130. In software, this computer implements an autoassociative neural network. This network is trained with training patterns generated from the photographs transferred from the server 135. The training patterns are generated by windowing the faces in the photographs with windows that are scaled, rotated, and translated, and with variations in brightness and contrast. One or more photographs of each undesirable individual as available from the server 135 should be used to generate training patterns. The computer 130 could implement one or many independent neural networks. It is possible to have an individual neural network trained only on patterns from the face of a single person, or training patterns from several persons could be trained-into the single neural network. There could be as many individual neural networks as there are persons to be tracked, or fewer neural networks could be used if facial patterns from more than one individual are trained in per network. Hundreds of faces can be trained into a single autoassociative neural network, if desired.

The training process is performed at a central location, generating weights for the neural network or networks. The weights and the original training patterns and the associated data such as names of the persons and other useful information about the persons are transmitted by Internet 120 to the remote detection system(s) 110.

The detection system 110 implements a cognitive memory system as shown in FIG. 2. The facial images of each person transmitted by the intelligence center are stored in an individual memory folder. There will be as many memory folders as there are people to be tracked. If computer 130 is programmed to implement a single neural network, then the cognitive memory will have a single segment with many memory folders. If computer 130 is programmed to implement many neural networks, there will be many memory segments with fewer memory folders per segment. The autoassociative neural network structure and weights implemented by computer 130, consisting of one or many networks, will be copied exactly in the cognitive memory implemented by the detection system 110.

The training of the neural network(s) in the intelligence center 125 is done off-line and can be done relatively slowly by computer 130. No training will take place in the detection system 110. The neural network(s) will be used only for sensing. Because of the rate at which pictures from camera(s) 105 could come into the detection system, the neural network may need to be implemented by external parallel hardware 111 for high-speed sensing. The incoming photographs from camera 105 act as query patterns. These query patterns are pre-processed by scanning with windows that are translated, rotated, scaled, and with variations in brightness and contrast. A hit will result when a matching prompt pattern from a query pattern including a person to be tracked appears before the cameras 105. The hit will cause a memory folder to discharge its contents giving the name of the person and other information about this person that could be of use to local authorities. The alarm 115 would be triggered to indicate a hit. The alarm could be auditory or some from of visual display. The hit could also be transmitted back to the intelligence center 125 through the Internet connection. This system could provide worldwide surveillance keeping track of as many undesirables as necessary. To track a large number of people, more than one autoassociative network would be implemented at computer 130.

In the detection system 110, the neural network 111 receives weight values from computer 106 (originally obtained from computer 130 via the Internet 120) by connection 112. The neural network 111 receives patterns for sensing by connection 113. The neural network output patterns are transmitted to the computer 106 by connection 114. During sensing, the computer compares the input and output patterns to determine if a hit has taken place. The neural network 111 will implement one or more neural networks in accord with the neural network implementation performed by computer 130.

The surveillance system of FIG. 34 has many unique and advantageous features that are gained from making use of the cognitive memory of FIG. 2. The cognitive memory concept is integrated into the architecture of the system of FIG. 34. Training takes place at the intelligence center 125, and the weights of the autoassociative neural network and the training patterns derived from one or more photographs of the undesirable people to be tracked are propagated through the Internet 120 to all detection systems worldwide. Adding the faces of new undesirables to the training set is easily done, and after re-training, the autoassociative neural network's weights and the added facial photographs can once again be distributed worldwide. Whenever an undesirable is detected at one of the detection system sites, many photographs with different lighting and different facial perspectives become available as the subject walks past the cameras 105. These updated photographs can be transmitted to the intelligence center 125 for training into the system, thus making it easier to detect the individual in the future. Basing the recognition process on the cognitive memory of FIG. 2, the surveillance system has the capability of detecting and identifying the group of faces to be tracked while ignoring the thousands of other innocent faces that pass the checkpoint every day.

Workplace Security Checkpoint System

In the workplace, a security checkpoint system will enable recognition of authorized persons and detection of unauthorized persons. The system of FIG. 35 will perform this function. It is very similar to the detection system of FIG. 34.

The detection system 160 implements the cognitive memory of FIG. 2. The memory folders contain photographs of authorized employees. Multiple patterns derived from photographs of each employee will be stored in a single memory folder, along with the employee's name. There will be as many memory folders as authorized employees.

The neural network 157 is trained with the patterns stored in the memory folders. This is in contrast with the neural network 111 in FIG. 34 that obtained its weights from computer 130.

A person 150 would be photographed by camera(s) 155, and these photographs will serve as query patterns. If the face of the person is recognized by the system, then the person will be authorized. The time and place could be recorded in a database. If the person is not recognized, this will trigger the alarm 162.

Figure 35:
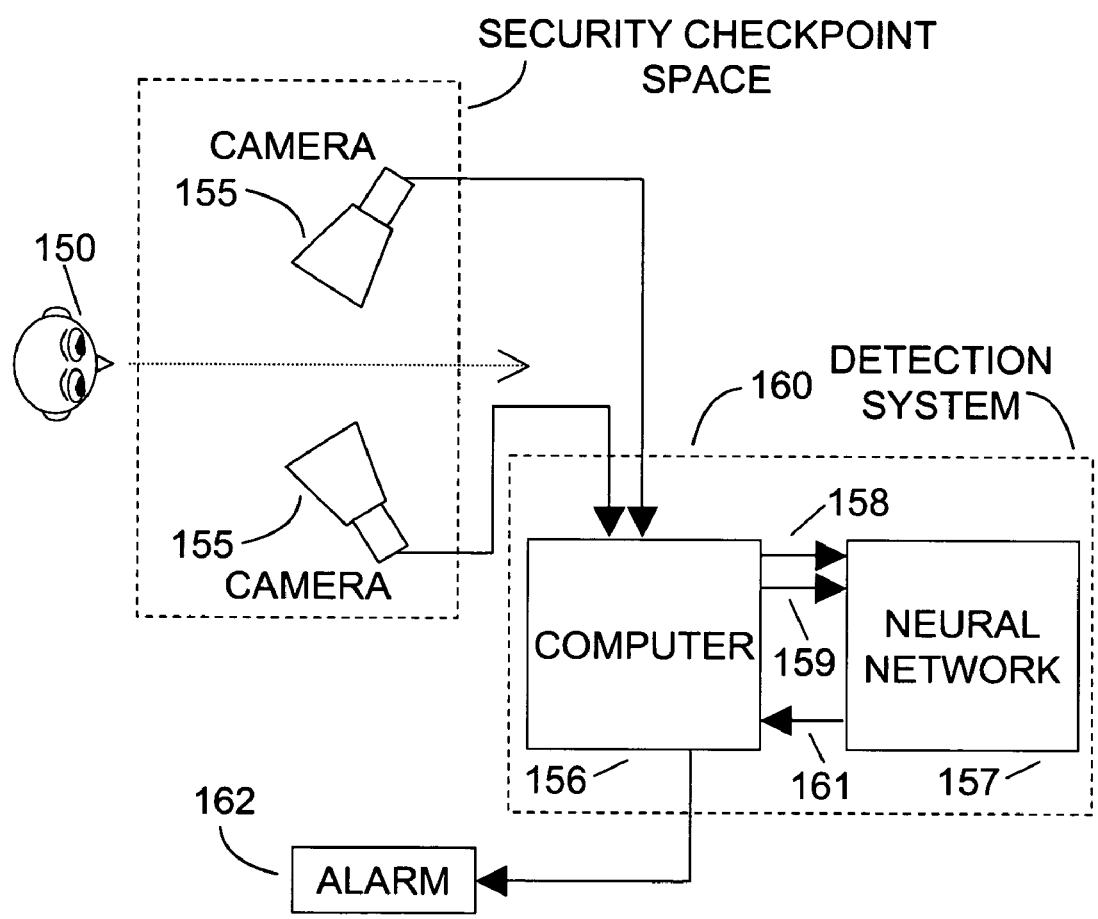
FIG. 35 shows a security checkpoint system based on face recognition using the cognitive memory of this invention.

In using the cognitive memory of FIG. 2, the security checkpoint system of FIG. 35 will be unique. It will have the capability to distinguish an unauthorized face from, in some cases, the thousands of authorized people's faces. This is a difficult or impossible task for existing pattern-recognition techniques.

A Photographic Search Engine for a Computer or Other Information Appliance

Photographs are easily stored in computers. They can be downloaded from the Internet, from digital cameras, from digital scanners of analog photographs, etc. It is possible to have hundreds of thousands of photographs stored in a personal computer or other information appliance. The problem for the user is to be able to find a desired photograph, having no idea where this photograph may be stored. Below is described a new design and methodology for searching for photographs stored on an information appliance, such as a desktop computer, laptop computer, handheld computer, personal digital assistant, digital media device, or mobile telephone.

If, for example, several hundred photographs of Paris were taken on a tour of Paris, they could be retrieved if they were placed in a directory named Paris, 2005. When seeking the contents of this directory, the user would ask for Paris, 2005. But if these photographs were simply recorded in the computer or other information appliance without any notation or labeling, they would be mixed with thousand of other photographs and difficult to retrieve.

It is common for users to store photographs without labeling. A photograph of a group of ten people would require some effort to locate and identify each person and list their names. If this were done, the photograph could be placed in a directory labeled with the list of names. Then retrieval would be easy, based on one or more of the names. But most people do not label each photograph when they are loading them into the computer or other information appliance. A search engine for photographs could retrieve unlabelled photographs containing people, places, and things of interest. A conventional search is based on keywords.

On the other hand, a search engine for photographs can make a search based on a query photograph. For example, a given photograph of a person could be used to initiate a search for all photographs in the computer where that person appears. Photographs of two people could be used to initiate a search for all photographs containing both people, etc.

Figure 36:
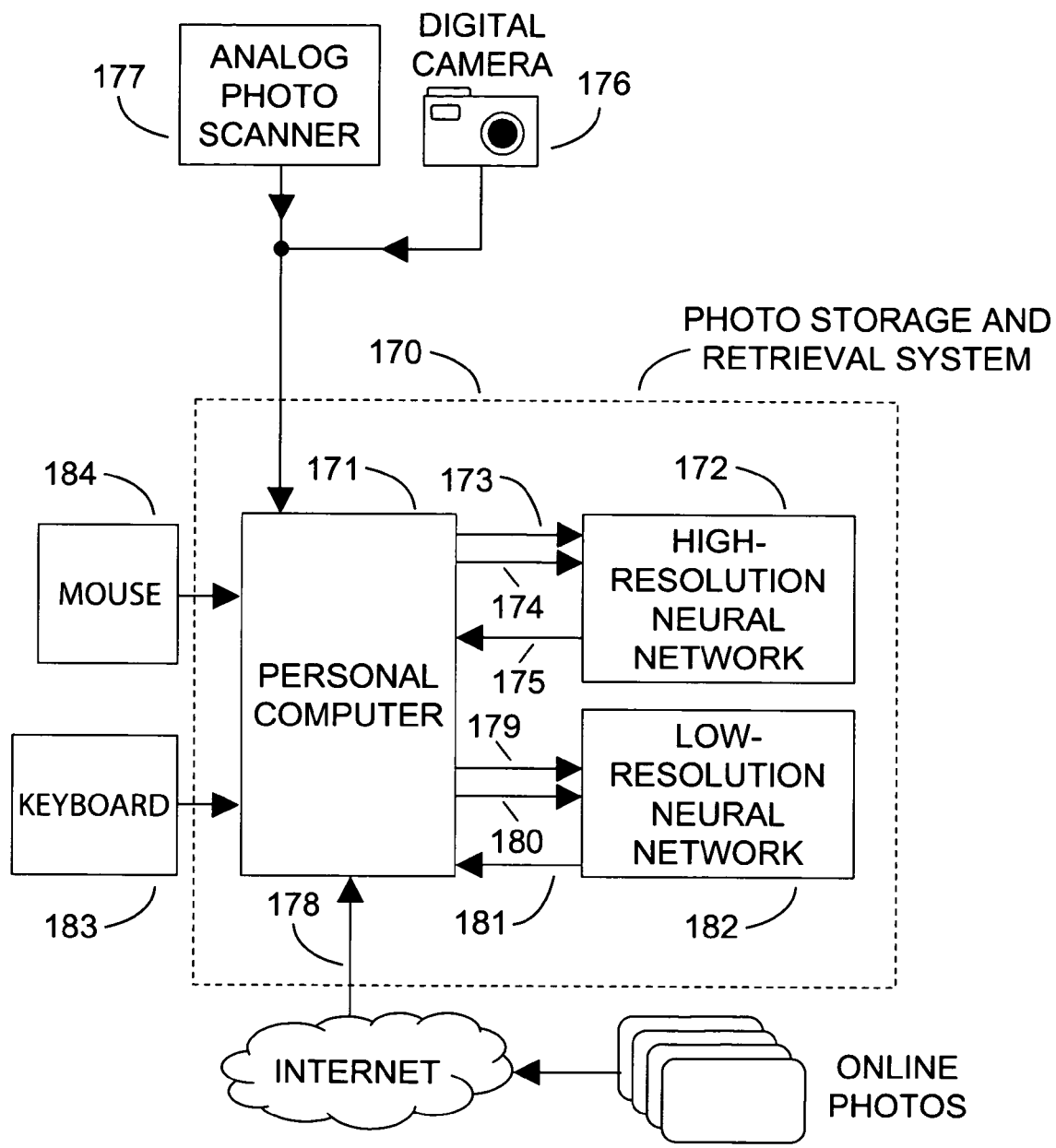
FIG. 36 shows a system for storing, searching, and retrieving photographs on a personal computer using the cognitive memory of this invention.

Referring to FIG. 36, a personal computer or other information appliance 171 is shown with inputs from a digital camera 176, a photograph scanner 177, and an Internet connection 178. By these means, photographs can be downloaded into the computer 171. These photographs can be stored on the computer's hard drive. Photographs that can be used for search initiation can also be downloaded by these means. The personal computer or other information appliance 171 is shown connected to a hardware neural network 172. Prompt patterns will be sent from 171 to the neural network by connection 173. Weight values will be sent from the 171 to the neural network by connection 174. The neural network output patterns will be sent back to the computer or other information appliance by connection 175. The entire photograph storage and retrieval system 170 implements the cognitive memory of FIG. 2.

The computer or other information appliance 171 may have a large number of photographs, perhaps hundreds of thousands, in bulk storage, without labeling. To initiate a search, a query photograph must be available. This is the photograph of a person that the user wishes to search for among the photographs in bulk storage. From the query photograph, many training patterns of the person's face can be generated by rotation, scaling, translation, and variation in brightness and contrast. These patterns are stored in a memory folder 27 of the first memory segment 25. These patterns are trained into an autoassociative neural network 60. This network and its training are implemented in software, in computer 171. The weights of the high-resolution neural network that result from the training are now transmitted to the hardware neural network 172 by connection 174. Each photograph in bulk storage can now be very rapidly searched for the person in the query photograph.

Each photograph is drawn from bulk storage to provide query patterns for the cognitive memory. If prompting causes a hit, then the hit photograph contains the query person.

Before each photograph can be analyzed in detail, the faces must be located within the photograph. This is accomplished by window scanning prompt patterns with a low-resolution system, as was done in FIG. 24. The low-resolution facial prompt patterns would be, for example, 20×20 pixels. In contrast, the high-resolution process would be, for example, 50×50 pixels. The low-resolution system uses neural network 182. The weights for the low-resolution neural network are downloaded from computer 171 through connection 180. The training to obtain these weights is performed off-line by computer 171. The facial patterns used to train the low-resolution network were obtained from photographs from an arbitrary selection of individuals. This low-resolution sensing will find people's faces without identifying the people.

A search of the entire photograph by the low-resolution system will locate all of the faces present. For each face, the coordinates of the center of the hit window are recorded, noted along the horizontal and vertical axes in pixel counts. The photograph will be labeled in terms of the X-Y positions of all the faces present. Once this is done, high-resolution analysis can be started for each of the noted facial positions. The process is illustrated in FIGS. 25-27. If there is a hit, the photograph will be returned to bulk storage but now labeled with the coordinates and the name of the person in the query photograph. The hit photograph will then be delivered to the computer user. If there is no hit, the photograph is returned to bulk storage. The process continues with the next photograph from bulk storage, etc.

Most information appliances capable of sending and receiving e-mails have software address books containing contact information for people in communication with the user. This contact information would include the name of the person, phone numbers, e-mail addresses etc. It could also contain a photograph of the person. This photograph can be used to generate patterns to train a high-resolution neural network. This can be done by the user's computer or other information appliance 171, and the resulting weights can be stored together with the photograph and other contact information in the address book.

If the query person is in the address book, then the neural network weights for this person can be loaded into the high-resolution neural network 172 and used to analyze the photographs in bulk storage. The speed obtained by the hardware neural network 172 is required to do the search quickly. The weights of the high-resolution neural network 172 can be determined for each individual and recorded in the address book while the computer is idle or not being used for another task. Also during idle time, the computer or other information appliance 171 could go through one photograph at a time in bulk storage, using the low-resolution system 182 to locate the faces, and using the high-resolution system 172 to identify the faces as a named person in the address book or as an unknown person. The photograph can be labeled with names of the identified people, and the locations of the known and unknown faces. The photographs in bulk storage will, over time, have labels and will be able to be recalled simply by naming the query person or persons.

Thus this system can be used to label photographs that were not initially labeled, but were simply recorded in bulk storage.

The user will be able to retrieve photographs containing images of persons in the address book, asking for them by name. The computer or other information appliance 171 can simply retrieve all photographs labeled with that person's name. New pictures of a person who may not be in the address book can also be used to initiate a query. Retrieval will take longer since a neural network will need to be trained for this person. A first search will be made to see if this person is already in the address book or not, the search through bulk storage for relevant photographs will need to take place. High-resolution analysis will be done with the faces that have previously been detected, but identified as unknown. Where there is a hit, the photograph will be labeled and delivered to the user. It should be noted that photographs with identified people that are in the information appliance but not in the address book can also be used just like those in the address book.

Interesting analysis can be done with the facial images of people identified as unknown in the photographs in bulk storage. A second "address book" could be made from all of these images. The photographs in bulk storage could be numbered. The second address book would not have names attached to the unknown images, but would have the facial image number and the photograph number attached. An unknown facial image in one of the photographs can be connected to unknown images in other photographs. This would be "connecting the dots," finding all photographs with the same unknown person.

When the computer or information appliance is idle, a second address book of unknown facial images can be formed. Each entry in this book will be a query photograph. The search procedure is exactly the same as it was for the photographs of the first address book. The search will certainly find the photograph from which the unknown query photograph was taken. But the search will also find other photographs containing images of the same person, giving the numbers of the pictures in bulk storage and the coordinates of the person's image in those photographs. This process could be very useful for surveillance applications, and could be used with the surveillance system of FIG. 34.

Another type of search for both documents and photographs stored in the computer or information appliance can be made in response to a query that has both text and the photograph. With text having keywords, the search algorithm can call for all documents that contain the keywords and have photographs that in turn correspond to the prompt photograph. The photographic search can be done with the methods of FIG. 36. The result of the search is a document containing a photograph of interest.

Yet another type of search, this time for photographs, can be made with a query containing a photograph and text having keywords. The text can be used to initiate a search through all directories labeled with the keywords, and through all directories containing documents containing the keywords. The contents of all these directories can then be searched to find photographs that correspond to the query photograph. The results of the search will be photographs corresponding to the query photograph and relating to the keywords. An example might be "Paris" as a keyword, and a photograph of the Eiffel Tower as the prompt photograph. The system would deliver photographs of the Eiffel Tower that are in various directories and that correlate with the prompt photograph.

An extension of the photographic search could include searching for video files. If the individual frames of a video clip are treated as still photographs, all of the above processes can also be applied to search for files containing video, in response to a query containing a query photograph, or text and a query photograph.

The search engine of FIG. 36, used for searching a personal computer is unique. There is no prior art capable of making the types of searches as described above, which are based on queries comprising text, photographs and the combination thereof, and can return photographs, documents and video files. This search engine is very fast and very accurate since it is based on the cognitive memory of FIG. 2.

Four methodologies for searching for photographs or images on a computer or other information appliance are presented below.

The first methodology, for locating, identifying and attaching labels to persons or objects of interest within photographs or other images that are stored on a computer or other information appliance, such as a desktop computer, laptop computer, handheld computer, personal digital assistant, mobile telephone, digital camera, or portable media device, is summarized by the following steps:

(1) Photographs or images are stored, by a user or a process, in the computer or other information appliance.

(2) Off-line, persons' faces and other objects of interest are located in the stored photographs or images. If these faces and objects of interest are not identified, then the photographs or images are referred to as unidentified.

(3) If needed, additional versions of the unidentified photographs and images of persons' faces or other objects of interest may be created by any combination of translation, rotation, scaling, brightness adjustment, or contrast adjustment. Original and created patterns corresponding to a single person or object of interest are grouped together in storage.

(4) Photographs or other images of persons or objects of interest that have been identified, are stored along with their identifications and are available to the search process. These photographs or images are referred to as identified.

(5) Additional identified photographs or images may be created, if needed, from the original identified photographs and images by any combination of translation, rotation, scaling, brightness adjustment, or contrast adjustment.

(6) One or more autoassociative neural networks, which are material to the search process, are trained on all identified photographs or identified images, original and created.

(7) To determine if any of the unidentified photographs or images, original or created, contain the same face or object of interest as one of the identified photographs or images, each original and created image of a located face or object of interest in the unidentified photographs or images is presented as an input to the autoassociative neural networks.

(8) The various unidentified photographs and images are applied as inputs to the trained autoassociative neural network or networks and, if the error in the difference between the input and the resulting output of an autoassociative neural network is below a pre-set threshold, there is a "hit," and the unidentified pattern is considered successful. If there is no hit, the pattern remains unidentified.

(9) If there is a hit, the successful unidentified pattern is compared with all identified patterns to find the best match.

(10) The identity of the best match pattern is assigned to the original unidentified photograph or image, from which the successful pattern was created.

(11) All of the located faces and objects of interest from the original unidentified photographs and images are labeled with their respective identities, or labeled as "unknown" if they were not identified.

(12) In response to a request to retrieve all photographs or images of one of the identified faces or objects, the search process will return all photographs and images labeled with that particular identity.

The second methodology, for searching for photographs or images stored in a computer or other information appliance that match an input query photograph containing a known or unknown face or object, can be summarized as follows:

(1) All of the above steps have been completed, and the results are available.

(2) A user or a process presents a query photograph to the search process.

(3) Additional photographs or images may be created, if needed, from the original query photograph by any combination of translation, rotation, scaling, brightness adjustment, or contrast adjustment.

(4) An autoassociative neural network is trained on the original query photograph and all photographs and images created from the original query photograph.

(5) To determine if any of the photographs or images of the located faces or objects of interest contain the same person's face or object of interest as the query photograph, each original and created image of a located face or object of interest is presented as an input to the trained autoassociative neural network.

(6) If there is a hit for a particular located face or object of interest, the photograph or image containing that located face or object of interest is returned as a result of the query.

The third methodology, which can be used in case the query photograph contains more than one person or object of interest, or if multiple query photographs are provided, is identical to the second methodology with the following modifications. Each person or object detected in each query photograph is trained into a separate autoassociative neural network, or all into the same autoassociative neural network. All photographs and images are presented to each autoassociative neural network. If there is a hit for a particular located face or object of interest on any of the trained autoassociative neural networks, the photograph or image containing that located face or object of interest is returned as a result of the query.

The fourth methodology, which can be used for searching in response to a query consisting of both text and a photograph, is identical to the second methodology with the following modifications. The initial search for photographs is performed in accord with the query text. The patterns that result from the initial search are then searched in accord with the query photograph using the above search methodology. The final result will be photographs or images corresponding to the text and containing the same subject matter as the query photograph.

Photographic or Image Search Engine for the World Wide Web or Other Computer Network Photographs can be stored on web pages of a website. The number of web pages and web sites containing photographs is enormous. Finding specific photographs on these pages that correspond to a query photograph is a challenging problem. Techniques similar to those used above for searching a personal computer or other information appliance can be used to solve this problem.

Search engines of Google™, Yahoo!™, Microsoft Network (MSN) and others are all capable of delivering a list of relevant websites (URL's) when they receive a text query consisting of one or more keywords describing a topic of interest. A photographic search engine on the other hand will deliver a list of relevant URL's when it receives a photograph of interest, i.e., a query photograph. The listed web sites would contain photographs of the same person seen in the query photograph. The text information from these websites would contain the names of the persons and other relevant information.

When sending a text query to a conventional search engine such as that of Google™, Yahoo!™, MSN, etc., the response is obtained in anywhere from a fraction of a second to a few seconds. The response could be a list of thousands of URL's. There is no way that such a list could have been found from searching the entire World Wide Web in such a short time. Many topics of interest had already been catalogued by the search engine. The search was effectively done well before the receipt of the query. The query is matched as closely as possible to one or more of the catalogued lists.

When the query from a remote computer user is received by the search engine, a list of results is delivered to the user. If the text of the query consists of more than one word, then lists corresponding to each word are searched for coincidences, and a composite list is prepared for the user consisting only of the coincidences. If the actual query does not correspond to a catalogued topic of interest, no information will be returned to the computer user.

The photographic search engine works in an analogous way. But there are many differences. This can be seen by referring to FIG. 37-39 and to the following description.

In describing the operation of the photographic search engine, it is convenient to discuss the basic principles as applied to an exemplary system having a specific size and capacity. This system will be designed for finding URL's based on queries that are photographs that contain people's faces.

The system will be designed to identify and distinguish photographs of the faces of one million individual persons. Queries will be answered at the average rate of 100 per second. The longest wait for a query response will be approximately 2 seconds, as long as the rate of queries received is 100 per second or less. Following the principles to be described below, it should be clear to anyone skilled in the art that similar systems could be designed to have greater or lesser capacity, and to have greater or lesser speed.

The photographic search engine is based on the cognitive memory of FIG. 2. For the present example, there will be 10 000 memory segments. Each segment will have a computer connected to 50 identical hardware neural networks. One of these neural networks will be configured for training. The other 49 will have weights that are copied from the trained weights. Each segment will have 100 memory folders, and each memory folder will have patterns corresponding to the face of a single individual. The patterns in each memory folder will be derived from a single photograph of the individual. With 10 000 segments, each having 100 memory folders, each memory folder storing one face, the total capacity of the search engine is 1 000 000 faces.

The patterns in each memory folder are derived from one photograph by rotation, translation, scaling, and variation in brightness and contrast. All of the patterns in each memory folder will be labeled with the URL of the website from which the original photograph came, and will eventually also be labeled with URL's of other websites containing photographs of the individual. These websites also contain text that gives further information about the individual. Once the memory folders are filled with patterns, the system can process queries. Each query serves as a prompt to pull information from the memory folders.

The objective is to use the query photograph to choose the right memory folder out of a million and to deliver its contents to the user who sent the query. If the query photograph does not match one of the one million faces stored by the search engine, then no memory folder is returned.

The photographic search engine works in a way that is similar to the working of human memory. Inputting a photograph or a scene that makes a hit will prompt a flood of information from the relevant websites. For the human, seeing a photograph or a scene that "rings a bell" will also prompt a flood of information.

The following is a description of how the photographic search engine works. There are two major modes of operation. One is "crawling" in order to find photographs from websites, store them in the memory folders, and train the autoassociative neural networks. The other mode is responding to queries and delivering the results.

Figure 37:
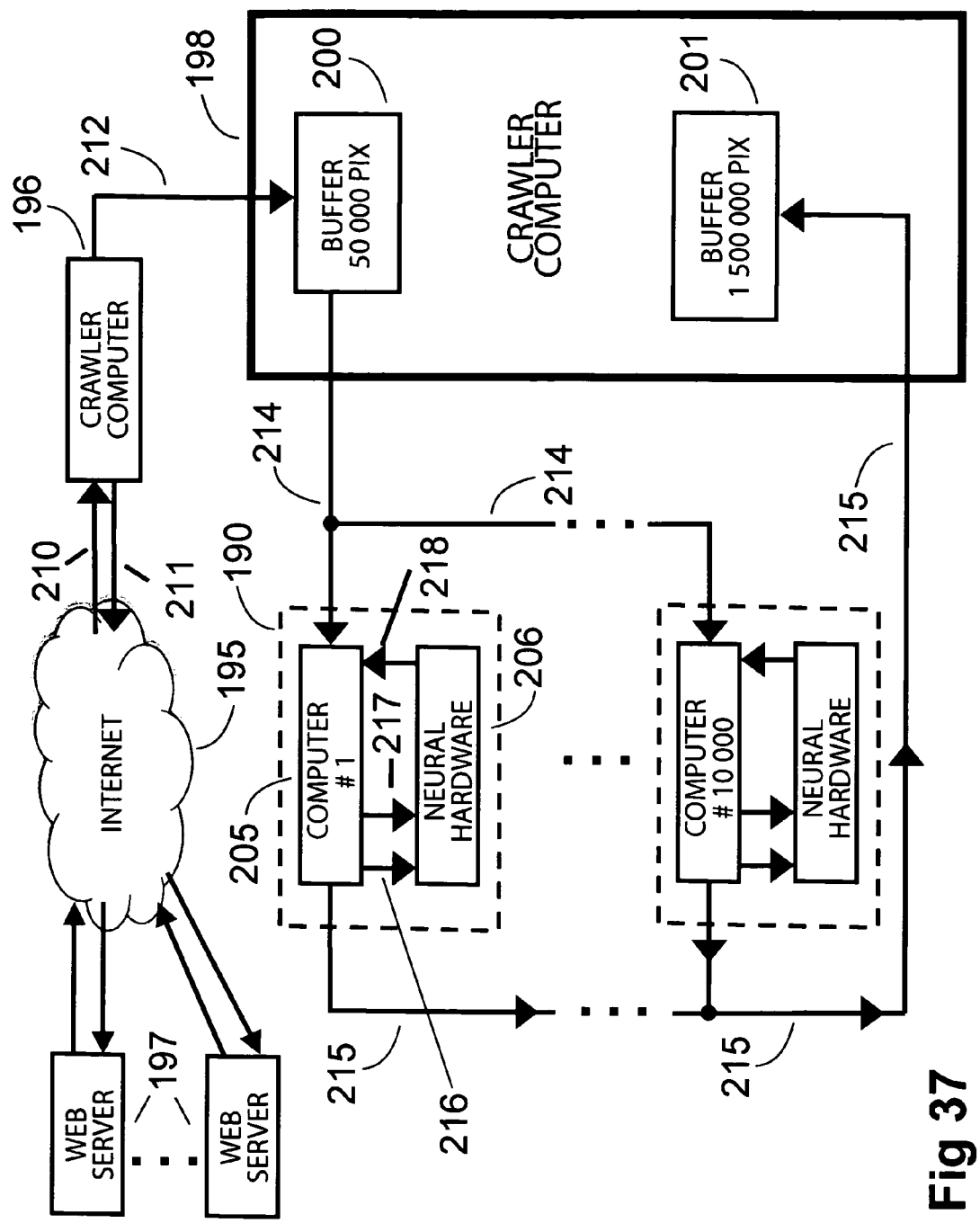
FIG. 37 shows the components and interconnections of the photographic search engine involved in crawling, low-resolution processing of photographs downloaded from websites, and extracting facial images for subsequent high-resolution processing and storage as depicted in FIG. 38.

In FIG. 37, during crawling, a "crawler" computer 196 visits websites that contain photographs. Approximately one out of 250 websites contain one or more photographs. The crawler computer 196 downloads photographs from the Internet 195 through connection 210. The downloaded photographs are stored on the crawler computer 196.

Computer 205 has three connections to its neural hardware 206. These connections are 216, used to load low-resolution neural network weights to the neural hardware 206; 217, used to present patterns to the low-resolution neural network on the neural hardware 206; 218, used to deliver the neural network output patterns back to the computer 205. Each pairing of the 10 000 computers and their neural hardware has this same structure.

The first step is to locate faces in the downloaded photographs using low-resolution sensing. Photographs are drawn from the crawler computer 196 in blocks of 50 000 into buffer memory 200, implemented by the controller computer 198. Each computer and its 50 identical neural networks can analyze at low-resolution 50 photographs at a time.

The photographs from buffer 200 are transmitted via bus 214 to all of the computers and their neural networks. Once this is done, another 50 000 photographs are loaded into buffer 200. They stay there until all 10 000 computers have finished their processing and become ready to accept a new batch of photographs.

The processing is low-resolution image analysis done by each computer and neural network as described by FIGS. 25-27, and the associated text description above. The result is location of the faces in each photograph. The low-resolution neural networks are the same for all 10 000 memory segments, having identical structure and identical weights. They were pre-trained on several faces and fixed, with no further training needed.

From the rotation, scaling, translation, intensity and contrast when a low-resolution hit is made detecting the face, the original photograph is normalized by counter-rotation, counter-scaling, etc., and a portion is excised corresponding to the "mind's eye" window area optimized for the low-resolution hit and expanded by 10%-20%. If the photograph has more than one face, each face is correspondingly processed and excised from the original photograph. The excised faces are transmitted via bus 215 to buffer memory 201, implemented by the controller computer 198. Each excised face is labeled with the URL of the website that contained the original photograph.

Once this cycle is complete, it is repeated, and another 50 000 photographs are loaded into the 10 000 computers and neural networks. This is repeated 20 times, so that 1 000 000 photographs have been processed. If each photograph had only one face, buffer 201 would need to be able to store 1 000 000 excised faces. But some of the photographs contain more than one face. The capacity of buffer 201 needs to be at least as great as one million multiplied by the average number of faces per photograph. A buffer holding 1 500 000 excised faces would be adequate. The faces and their URL's now stored in buffer 201 are ready for high-resolution analysis.

Figure 38:
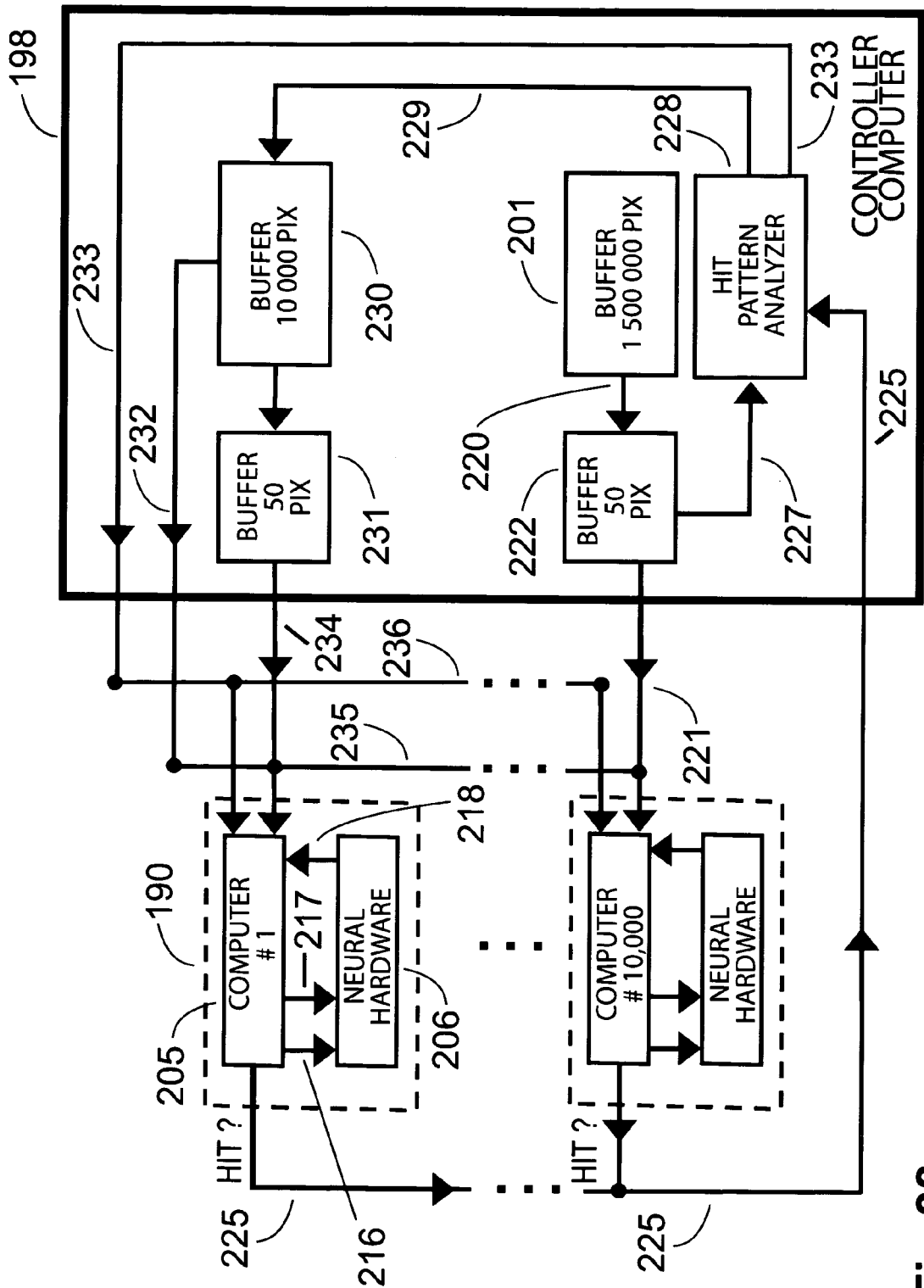
FIG. 38 shows the components and interconnections of the photographic search engine involved in high-resolution processing, storage, and training of the facial images generated by the process depicted in FIG. 37.

FIG. 38 shows the parts of the photographic search engine and their interconnections that are involved with high-resolution analysis. The facial photographs and URL's stored in buffer 201 are fed to buffer 222, fifty at a time. The fifty are randomly selected, then removed from buffer 201. Each batch of fifty photographs and their URL's are transferred to the computers and neural networks over bus 221. A batch size of fifty photographs is chosen because, in this example, each memory segment has 50 neural networks, and can thus process fifty high-resolution analyses in parallel.

The same neural network can perform low-resolution as well as high resolution processing. The weights and neural network architecture for low-resolution work are stored in the computers and transferred to the neural hardware when it is time to do low-resolution analysis. When it is time to do high-resolution analysis, the computer 205 commands the neural hardware 206 to set its neural network weights to zero, and the neural network architecture for high-resolution work is transferred to the neural hardware 206. The weights adapt by the backpropagation algorithm from there. Training patterns are stored in the computers 205 and transferred to the neural hardware 206 via connection 217. The control of the neural network architecture for high-resolution analysis is determined by the computers. The computers generate patterns from the photographs by translation, rotation, etc., and send patterns to the neural hardware. Each set of neural hardware is designed to have 50 identical neural networks. Training is done with the first neural network of the 50, and the weights are copied into the other 49 neural networks after each adaptation cycle.

From buffer 222, the controller computer 198 feeds 50 facial photographs and their URL's via connection 221 to bus 235 to all 10 000 computers, allowing 50 photographs at a time to be checked at high resolution for hits. If any of the memory segments reports a hit, this means that the neural networks of the reporting segment have already been trained on the person in the photograph, and photographs of the same person need not be further trained in. Any hits are then reported to the hit pattern analyzer 228 via bus 225. A single segment could have one or more hits, and one or more segments could have hits. The URL of each hit prompt pattern is stored in the corresponding person's memory folder by the computer that reported the hit. The corresponding memory folder is found via pixel-by-pixel comparison between the hit pattern and each of the training patterns stored in each of the 100 memory folders of the segment.

As buffer 222 sends patterns to all the computers in order to check for hits, this buffer through line 227 feeds the same patterns to the hit pattern analyzer 228. Computer 205 sends the patterns to neural hardware 206 via connection 217, and neural hardware 206 returns the outputs of the neural network to computer 205 via connection 218. Where there are hits, the hit pattern analyzer 228 deletes the hit patterns from the 50, and transmits the remainder via line 229 to buffer 230, which collects the new face patterns that will be used to train the autoassociative neural hardware. The photographs in buffer 230 correspond to persons whose photographs have not been previously trained into any of the 10 000 memory segments. This is a pool of facial photographs and their URL's that are available for training into the memory segments. This process continues until buffer 230 has 10 000 facial photographs and is full. The process is then stopped and the training begins.

Buffer 230, implemented by the controller computer 198, is now loaded with 10 000 facial photographs and their respective URL's. These photographs are loaded from buffer 230 into the segments via line 232 to the pattern input bus 235, one photograph for each segment. Buffer 230 is not emptied yet, still containing the entire set of 10 000 facial photographs.

Each facial photograph and its URL are placed in a new empty memory folder within its respective segment. Each computer in each segment creates a set of patterns from the new facial photograph by rotation, translation, scaling, etc. These training patterns are sent by computer 205 to neural hardware 206 via connection 217. These training patterns are labeled with their corresponding URL's. They are combined with training patterns already stored in the same segment and are all trained together as a training pattern set.

Training could be done until the MSE is down to a pre-determined level by all of the computers and autoassociative neural networks. A simpler alternative would be to allow all of the computers and their neural networks to train over a finite number of cycles that experience indicates would be adequate in order to obtain low MSE values in all the segments. After training, each computer retains all of its training patterns and their URL's. It also retains the URL's of its hit photographs that were detected and deleted by the hit pattern analyzer 228 in accord with the process of FIG. 38.

The 10 000 training photographs still stored in buffer 230 may have had "overlaps," i.e. cases of one person being in more than one photograph. In order to eliminate overlaps, further checking will need to be done. The photographs from buffer 230 can be loaded 50 at a time into buffer 231 and presented via line 234 to the pattern input bus 235 for checking with all 10 000 computers and their associated neural hardware systems. Since each of the photographs from buffer 230 has already been trained into one and only one segment, there should be a single hit for each photograph if there were no overlaps within the 10 000 photographs. In the case of overlaps, some of the photographs will elicit more than one hit. The memory folders in all the segments where hits were noted should retain the URL's of all the hit photographs. The segments will convey such hits via bus 225 to the hit pattern analyzer 228, which will detect the overlap.

In each case of overlap, the hit pattern analyzer 228 will choose one of the photographs to keep, and the others are to be deleted. Since all segments have already been trained on the kept photographs, the delete procedure is followed to "un-train" the deleted patterns from their respective neural networks and to delete these patterns from their memory folders. The URL's of the deleted photographs are already attached to the kept photograph and its URL.

The hit pattern analyzer 228 will instruct via line 233 to fix overlaps bus 236 to the appropriate segment computers to delete overlap photographs. In response, the segment computers containing overlaps will clear the contents of the memory folders containing overlap photographs. When an overlap photograph is deleted from a segment, the associated neural networks need to be un-trained on training patterns derived from that photograph.

In training a neural network on a new training pattern, the new pattern is introduced to the block of patterns that have already been trained in. Training is an iterative process. If after training on a block of patterns, a pattern from the block is deleted, and when the neural network is trained again and again on the next training cycles, the response to the deleted pattern will be forgotten. By deleting overlaps, the full capacity of the entire system will be able to be realized.

The pattern checks using photographs from buffer 231 are performed 50 at a time. When all 10 000 photographs in buffer 230 have been checked for overlaps and the deletion procedure for overlaps has been followed, buffer 230 is erased, and the process is repeated again, filling buffer 230 with training photographs of new faces, as described above. When buffer 230 is filled, the training and checking process is performed as before. This process continues until buffer 201 is emptied.

The result of the crawling and training procedure represented by FIGS. 37 and 38 is the following: there will be 10 000 segments whose computers and neural networks will have been trained with training patterns from approximately 100 persons each, for a total of approximately 1 000 000 people. The training patterns for each person will be stored in a separate memory folder along with the URL of the training patterns. In addition, the memory folder will store all URL's of other photographs found to contain the same person. The weights of the trained neural network will be stored in the segment computer.

Figure 39:
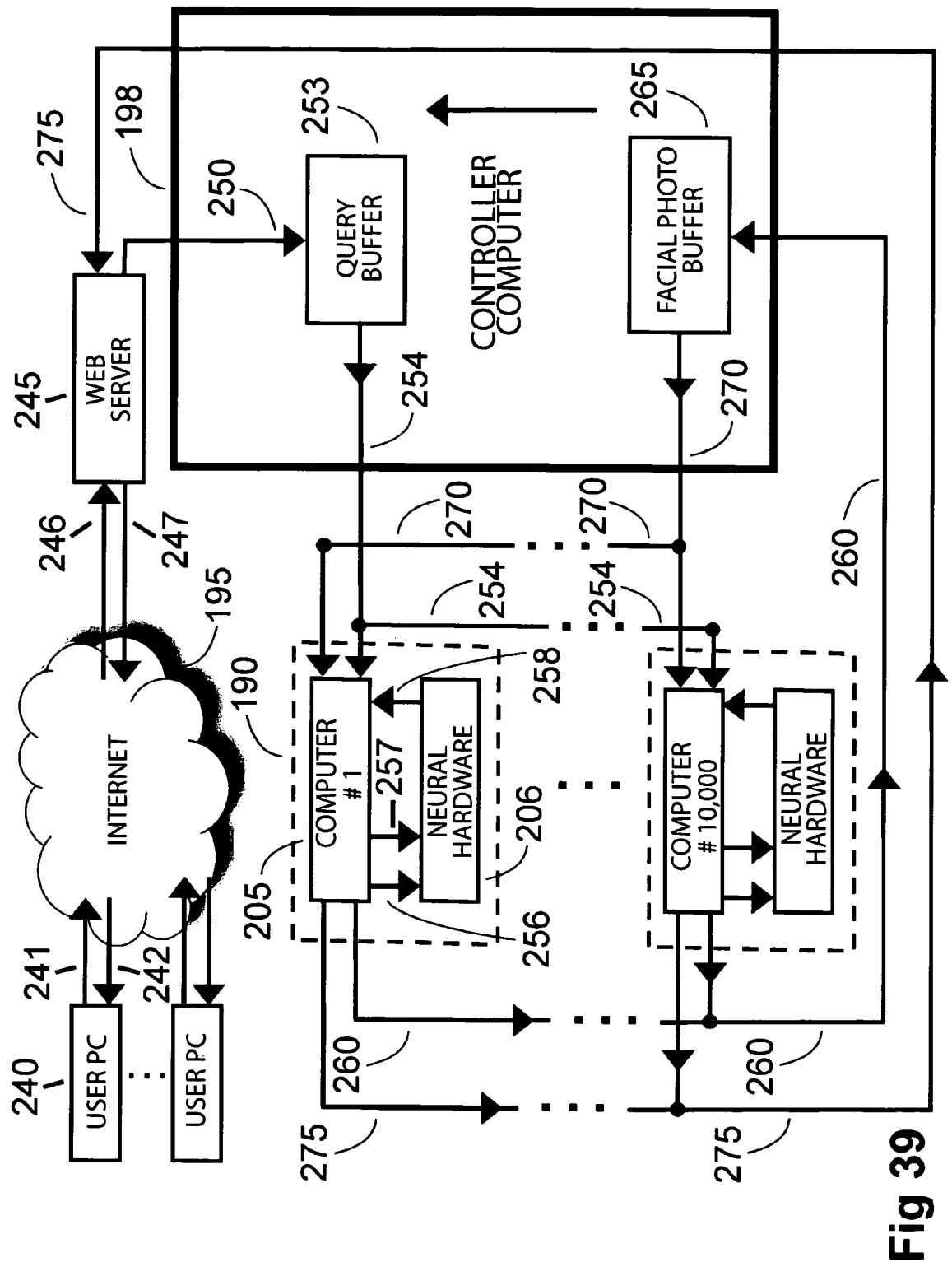
FIG. 39 shows the components and interconnections of the photographic search engine involved in servicing queries from Internet users.

Now the system is ready to accept queries from users. FIG. 39 shows interconnections and components of the photographic search engine that are involved with receiving and answering queries. Users or external processes can initiate a search by transmitting a query from any information appliance, such as a desktop computer, laptop computer, handheld computer, personal digital assistant, digital media device or mobile telephone. The user's computer or other information appliance 240 sends a query (a photograph) to the Internet 195 via connection 241. The Internet 195 delivers this query and the user's ID (the user's IP address) to the web server 245. The web server 245, in turn, creates a unique query number and transmits this information to the controller computer 198 via connection 250. The queries are received by buffer 253 implemented by the controller computer 198.

The web server 245 is capable of storing a large number of photographs and their respective query numbers. The web server 245 transmits photographs and query numbers over two-second intervals. When not transmitting, it stores the queries until the next two-second transmission interval. Buffer 253 must be large enough to store the patterns arriving from the web server over a two-second interval. The maximum number of patterns to be stored by buffer 253 depends on the flow rate of the queries. The maximum number of queries that can be processed and responded to by the photographic search engine is approximately 100 per second.

Once buffer 253 is loaded with two seconds' worth of query requests, for example with 200 query patterns and their query numbers, pictures are transmitted over bus 254 to the computers of all segments. One picture is sent to each segment. The pictures receive low-resolution processing. The result is that all faces in all of the pictures are identified by the methods described above. The facial photographs are excised from the original photographs, labeled with respective user ID's, outputted and delivered via bus 260 to the controller computer 198 where they are stored in buffer 265 awaiting high-resolution processing.

FIG. 39 also shows the system components and interconnections needed for high-resolution analysis. The facial photographs and their query numbers are transmitted 50 photographs at a time to the 10 000 segments via bus 270. High-resolution analysis takes place essentially simultaneously with all 50 photographs over all of the segments. High-resolution analysis has been described above. The results of this analysis are reported by the computers of the 10 000 segments via bus 275 to the controller computer 198. The segment computers output to bus 275 facial photographs that correspond to hits. Each facial photograph is labeled with the query number and a list of URL's of websites containing other photographs of the person in the facial photograph. The same query number could be attached to more than one facial photograph, as would be the case when the original query photograph contained more than one face.

When all 50 faces have had high-resolution analysis, the results are reported to the web server 245 via bus 275, and this server 245 in turn transmits the reply to the Internet 195 via connection 247. The various users who have sent in queries are able to receive the desired data from the Internet 195, since each facial photograph was labeled with a query number, which was then identified with the user's IP address by the web server 245. The desired data for each photograph is the set of URL's that contains pictures of the person in the query photograph. When all 50 faces have had high-resolution analysis, the next 50 faces are drawn from buffer 265 and sent to segments for analysis. When buffer 265 is empty, the web server 245 then delivers another two-second batch of query photographs to the controller computer 198, and the process goes on.

This system is designed and scaled to process approximately 100 queries per second, or 8 640 000 queries per day. These numbers are based on high-resolution neural networks containing three layers, having a total of 5500 neurons and 9 660 000 weights. The sensing time per pattern is 0.18 seconds. The number of faces of individual people that can be addressed is approximately 1 000 000. To increase the number of queries per second by a factor of 10, for example, one could increase the number of identical neural networks in each segment by a factor of 10. To increase the number of individual faces that could be addressed by a factor of 10, for example, one could replicate the existing photographic search engine by tenfold. Each search engine's crawler would be given a list of websites that would not overlap the websites of the other engine's crawlers. Each query would be sent to all of the search engines simultaneously, and the hits would be reported back to the users via the Internet.

Figure 40:
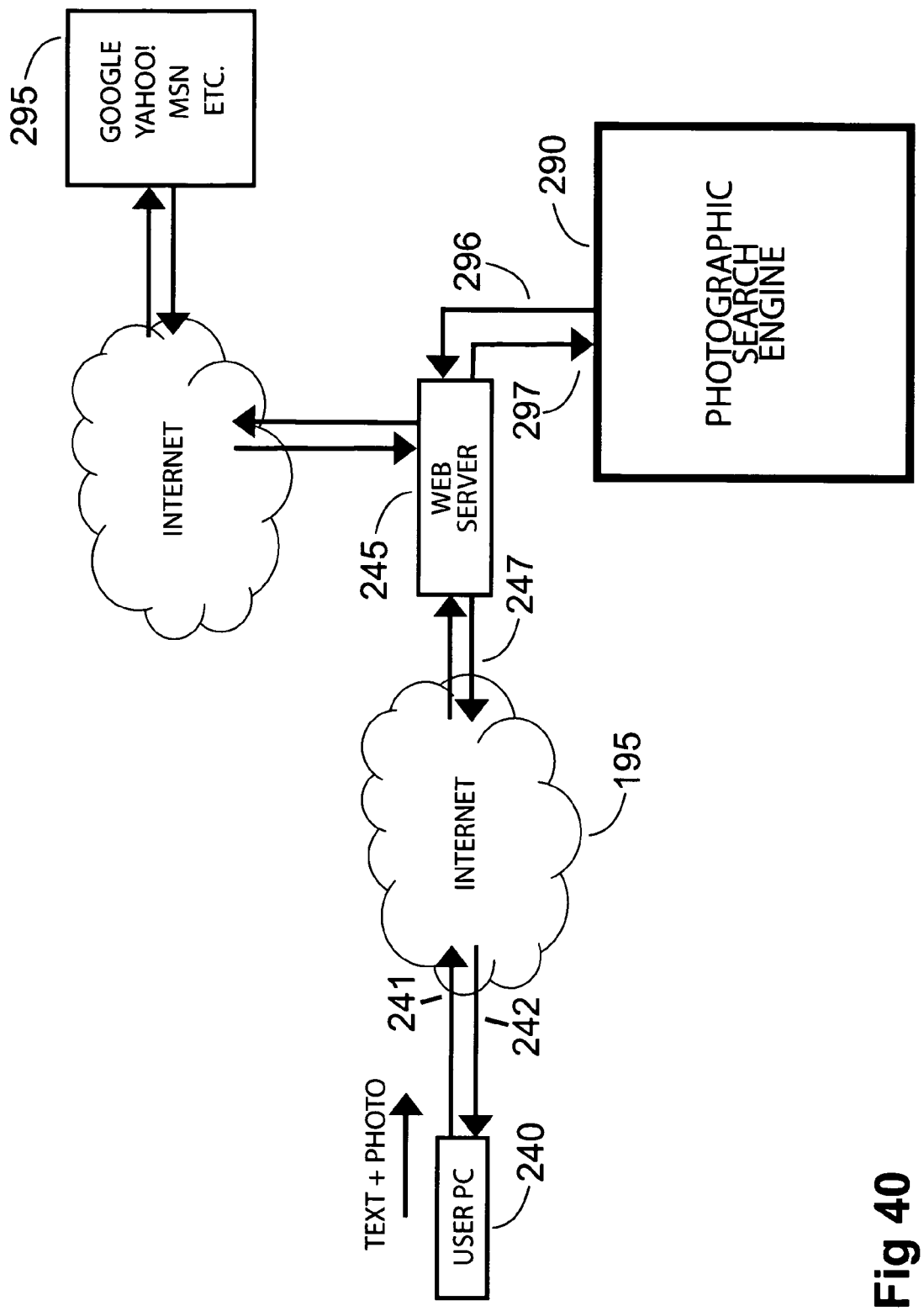
FIG. 40 shows the photographic search engine of FIGS. 37-39 servicing a search using a combined text and photograph query.

As demonstrated in FIG. 40, the photographic search engine can be generalized to work with query requests that are combination of photographs and keyword text. Instead of searching all photographs on the web, one could select for crawling only the photographs of web sites that correspond to the keyword text. Suppose that a user had a picture of George W. Bush together with several other unknown people. Let this be the query photograph. The problem is to discover names and other information about the unknown people in the query photograph. The user's personal computer 240 transmits the query, consisting of text and the photograph via the Internet to the web server 245, which is then delivered to the photographic search engine 290 via line 296. The photographic search engine 290 could first use an available search engine, such as Google, Yahoo!, MSN, etc. 295, to find all pictures of George W. Bush that can be downloaded from the web. These pictures could then be used to train the photographic search engine 290. Once the segments of the photographic search engine are trained, the query photograph can then be applied to it to find websites for George W. Bush plus each or all of the unknown persons in the query photograph. The search results obtained are returned by the photographic search engine 290 to the web server 245, which then forwards them to the user's personal computer 240 via the Internet. The found websites will generally contain information about the others pictured with George W. Bush. Using text and a photograph, one will be able to obtain information quicker about the unknown people with George W. Bush than by directly searching the entire web for these people.

The neural networks in the segments of the photographic search engine may be trained not only on people's faces, but in addition on buildings of great cities. Searches can then be made to identify buildings. For example, on a recent trip to Rome, 1000 photographs were taken, of which 12 were photographs of the facade of a small church taken from different perspectives. The problem is to identify this church. Rome has 400 churches. Each of the 12 photographs can be used for queries. A query would read "Rome" "Churches" and one of the photographs. The system would use Google, or Yahoo!, etc. to download all photographs of churches in Rome. There are about 4000 photographs of Roman churches that would be downloaded. Crawling over the websites that contain these 4000 photographs, the photographic search engine can be trained. The 12 query photographs can then be applied, one at a time, to the photographic search engine. If one or more of these queries results in a hit, the web site or websites will be known and searching them would reveal the name of the unknown church and various pieces of information about it.

If queries of this type occur frequently, pictures of Roman churches and of churches in other cities of the world could be trained into the photographic search engine. Pictures of other civic buildings, bridges, statues, etc., could also be trained in.

The photographic search engine, as described above, can be used in a unique way to greatly expand its capacity, capability, and usefulness. After this system is trained with the 4000 photographs of the Roman churches, the weights and training patterns can be downloaded and stored in a conventional computer memory and labeled "Roman churches." Then the same search engine can be trained on photographs of all of the churches in Paris. The weights and training patterns can then be downloaded and stored in a computer memory labeled "Parisian churches." The search engine can be trained on photographs of all of the churches in the United States. The weights and training patterns can then be downloaded and stored in a computer memory and labeled "U.S. churches." The photographic search engine can be trained with photographs or drawings of all species of bird from the Audubon Society. The resulting weights and training patterns can be downloaded and stored in a computer memory labeled "birds." Then the search engine can be trained with the photographs of all known species of flowers. The weights and training patterns can be downloaded and stored in computer memory labeled "flowers." And so forth.

Suppose that one had noticed a beautiful flower and wished to identify it. A picture was taken with a digital camera and the user submits a query using the photograph and indicating that he or she wishes to search for a flower. In response, the set of weights and training patterns labeled "flowers" is downloaded into the computers of all the segments of the photographic search engine and from there loaded into the neural networks. The photographic search engine would then be configured to search a database of images of flowers.

The photograph in question is the query, and the response will be received in a second or two. It would not be necessary to re-train the photographic search engine on flowers since this has already been done off-line. The same thing could then be done with an image of a Parisian church. The "Parisian church" weights and training patterns would be downloaded to the photographic search engine and loaded into the neural hardware. The photographic search engine would then be configured to search a database of Parisian churches.

It is clear from the example that very large numbers of weight sets and training patterns derived from off-line training could be stored by conventional computer memory, and with a query consisting of text such as "bird" and a photograph of a particular bird, a search could be made in seconds, without further training, yielding URL's for that species of bird. This technique would make it possible to conduct searches over an enormous range of subject matter in seconds, all with the same hardware installation.

A distinguishing feature of the photographic search engine of this patent is that it performs low-resolution analysis over the query photograph before performing the actual search, which extracts the faces from the query photograph for searching each face individually. This same type of analysis is performed during crawling as well, which allows searches with queries containing any of the faces in the crawled photographs. If a crawled photograph has multiple faces, any one of them can be used to find a hit.

The type of search engine described here is distinct from prior art. Existing search engines that search for photographs are based on text-only queries, and provide results based on matching keywords in the website text or metadata that surround the images, not on the images themselves. This type of search is "blind," in the sense that it does not use any information derived from the image itself. As a result, this type of search often makes mistakes, returning photographs unrelated to the user's intended query. In contrast, the photographic search engine of this patent searches for URL's and photographs based on using photographs or photographs and keywords as the query, and actually performs comparisons between the query photograph and the images stored in the photographic search engine. In addition, the photographic search engine of this patent is fast and accurate, being based on the cognitive memory of FIG. 2.

Medical Applications-Detection of Tumors or Other Anomalies

There are many possible applications for the cognitive memory system of FIG. 2 in medical practice, one of which is the detection of tumors (or other anomalies) from CAT scans, MRI images, other image generating systems, or the like. Experienced radiologists and physicians can read these images and make diagnoses. They can do this after seeing many images in textbooks, in journal articles, and from their own years of experience with patient data.

With a large database of patient cases and textbook cases, the system of FIG. 2 can be trained. In a given segment, each memory folder can be identified with a particular tumor type.

Given 1000 cases of breast cancer, for example, there would be 1000 memory folders in the breast cancer segment. Each memory folder would contain the patient name, a sequence of images (x-ray, MRI, etc.) taken over time, biopsy data, data on how the tumor was first detected, data on the method of treatment, the outcome of treatment, and other notes of attending physicians.

All of the images from all memory folders would be trained into the autoassociative neural network. Once this network is trained, it can be used to analyze new images from new patients. A new patient image would be a prompt. It would be rotated, translated, scaled, etc., to see if a hit would be possible. If there are one or more hits, then each hit pattern can be compared with patterns in the memory folders on a pixel-by-pixel basis. The memory folders with the closest matches can then be delivered to the attending physician. The information in these memory folders, such as the nature of treatments given and results, will give insight to the physician regarding treatment for the present patient. Thus the cognitive memory will assist the physician by pulling from the database cases that are similar to the present one, and the physician can get an idea from these cases about effectiveness of past treatments.

Analysis of medical images by means of the cognitive memory of FIG. 2 is a powerful idea that promises to have significant effects on medical practice. Entire textbooks, journal papers, and data from years of a physician's medical practice can be stored in the cognitive memory and retrieved by prompting with images taken from the current patient. Treatment of this patient can be based on the total experience stored in the memory, which may be more consistent than the memory of the physician. The data retrieved from the cognitive memory would present treatment methods and outcomes from previous patients whose cases are similar to that of the current patient, based on comparison of the respective medical images. Gaining information from prior case studies stored in the cognitive memory would be very helpful to the physician.

This approach is unlike any currently in practice. Usual pattern recognition techniques are used to classify the tumor, for example, malignant or non-malignant? The methodology of this invention is unique in that the medical image is not classified per se, but is related to medical images of previous patients whose treatments and outcomes are a matter of record.

Retina Scans

Retina scans are photographs of people's retinas taken through the lenses of the eyes. Every person has a unique and time invariant retinal image. Recognizing retinal scans can be done by using the same techniques that were described above for face recognition.

Fingerprint Recognition

The same methods can be used for fingerprint recognition as were described above for face recognition.

Video Image Analysis

Video images can be thought of as series of still images taken close together in time. Objects in these images can be located and recognized by using the methods described above to locate and identify aircraft on Diego Garcia Island, for example. The same object located in one image can be located in another taken at a slightly different time. By noting the translation and rotation from image to image, the velocity and trajectory of one or more objects can be determined.

Biometric Measurements

Face recognition using biometric measurements [22] is a widely used technique. Examples of facial measurements that can be used are, for example, the distance between the eyes, the distance from each eye to the tip of the nose, the distances from each eye to each corner of the mouth, the width of the mouth, etc. These measurements can be normalized by, for example, dividing them all by the distance between the eyes. The normalized measurements comprise a pattern vector that is characteristic of the person's face. This vector can be used for facial recognition with conventional pattern recognition methods [22], and can also be used with the cognitive memory system of FIG. 2 to identify a person's face.

As described above, the cognitive memory system was used for facial recognition by making use of facial photographs. The photographs are vectors, one component for each pixel. The biometric measurement vector, having many fewer components than the picture has pixels, can be substituted for the facial picture vector for the recognition process. Using fewer components has the advantage of requiring less computation. Using more components has the advantage of greater accuracy.

The cognitive memory of FIG. 2 can make use of biometric measurements in several different ways. The first way would use the biometric pattern vector as a substitute for the pattern vector derived from the person's facial photograph. This substitution could be used throughout all the facial recognition processes described above. One problem with this is that many different people could have almost the same biometric measurements.

A second way would use the biometric pattern vector in conjunction with the pattern vector derived from the facial photograph. Whenever a facial photograph is stored in a memory folder in a segment of the cognitive memory, the name of the person would also be stored along with the person's biometric measurements, and along with any other relevant data of interest about the person. When a prompt photograph is presented, biometric measurements can be taken. The prompt photograph can then be inputted to the autoassociative neural network, as described above. When the relevant memory folder is found, the person's biometrics measurements can be compared with the biometric measurements of the prompt photograph for verification.

A third way would also use the biometric pattern vector in conjunction with the image pattern vector derived from the facial photograph. A search through the memory folders to find all patterns whose biometric vectors match within a pre-set tolerance of the biometric vector of the prompt pattern would allow the final search, the pixel-by-pixel comparison, to be narrowed and therefore done more quickly.

The methods taught above for finding a face in a photograph, namely making use of a low resolution autoassociative network with a low resolution version of the original photograph, can be used to locate a left eye, a right eye, a nose, a mouth, etc. This is the same method that was used to locate aircraft on Diego Garcia Island, for example. From the locations of the parts of the face, biometric measurements can be made.

Biometric measurements can be used as a substitute for or a supplement to facial image vectors used for facial recognition, for surveillance, for searching a personal computer for desired photographs, and for searching the World Wide Web for desired photographs.

Facial biometric measurements alone would be effective in distinguishing small numbers of faces, one from another. When distinguishing thousands of faces, or millions of faces, recognition based on the full-facial images will be imperative. The biometric technique could be used with cognitive memory to pre-screen facial images and narrow the search. The pattern recognition techniques of this invention, using full-facial images, would be very advantageous for making the final determination of the identity of a particular face. For thousands of faces or more, there are no other techniques for discrimination that would be faster or more accurate than the methodology of this invention.

Additional Embodiments

Having now described various aspects, features, and embodiments of the invention, attention is now directed to a description of particular embodiments of the invention having selected combinations of optional features. The below described embodiments are intended as additional exemplary embodiments and are not intended to limit the scope of the invention to embodiments having the particular set or combination of features set forth here.

In one aspect, the invention provides an embodiment (1) a cognitive memory system for storing in the form of patterns input data or information, wherein subsequent retrieval of the patterns from the cognitive memory system is accomplished in response to related, but not necessarily identical, input query patterns.

In another aspect, the invention provides an embodiment (2) a cognitive memory system for storing sensory input data and patterns, the data and patterns stored in memory folders, each memory folder capable of storing a plurality of patterns, storing simultaneously inputted patterns from a plurality of sensors, storing other ancillary data, a retrieval system capable of retrieving the contents of each the memory folder when presented with a related prompt pattern, derived from an input query pattern, and a system capable of relating the prompt pattern to one of the patterns stored in the memory folders.

In another aspect, the invention provides an embodiment (3), the cognitive memory system of (2) is further defined so that the contents of each the memory folder could serve as a "self-prompt" query pattern or patterns to initiate further retrieval of contents of additional memory folders of the cognitive memory system of (2).

In another aspect, the invention provides an embodiment (4), the cognitive memory system of (2), wherein the system: (a) is capable of relating the prompt patterns to one or more of the data and patterns stored in the memory folders; and (b) utilizes an autoassociative neural network trained with all patterns stored in all the memory folders of the cognitive memory system, the trained autoassociative neural network being capable of indicating if the prompt pattern matches one of the patterns stored in the memory folders, a match indicated by the autoassociative neural network triggering a component-by-component comparison between the prompt pattern and all of the patterns in the memory folders of the cognitive memory system, wherein a component-by-component match with one pattern in one memory folder results in the entire contents of the memory folder being delivered as the memory output.

In another aspect, the invention provides an embodiment (5), a cognitive memory system capable of receiving input data, images, or patterns, storing the input data, images or patterns wherever storage space is available, and retrieving the input data, images, or patterns upon receipt of a prompt input, comprising: (a) a conventional memory organized into memory folders for storing the input data, images or patterns; (b) a trainable autoassociative neural network connected to the conventional memory to receive the input data, images, or patterns as training patterns; (c) a stored adaptive algorithm for training the autoassociative neural network with the training patterns; (d) pre-processors that modify input query images or patterns in order to generate multiple prompt patterns from a single input query pattern; (e) means for testing each of the multiple prompt patterns, utilizing the autoassociative neural network, to select the successful prompt pattern that matches most closely to a pattern stored in one of the memory folders; (f) means for scanning the memory folders to find the "hit" memory folder that stores the pattern that most closely matches the successful prompt pattern; and (g) means for delivering the entire contents of the "hit" memory folder as the output of the cognitive memory system.

In another aspect, the invention provides an embodiment (6), the cognitive memory system of (5) is further defined such that the autoassociative neural network is a multi-layer perceptron that is trained by the back-propagation algorithm.

In another aspect, the invention provides an embodiment (7), the cognitive memory system of (5), wherein the successful prompt pattern is selected from the multiple prompt patterns by applying in sequence the multiple prompt patterns to the autoassociative neural network, measuring the mean square error between the input and output patterns of the autoassociative neural network, selecting the prompt pattern with the lowest mean square error, and calling this prompt pattern successful if its mean square error is below a pre-determined threshold.

In another aspect, the invention provides an embodiment (8), the cognitive memory system of (5), wherein the "hit" memory folder is selected from all the memory folders by comparing in sequence all training patterns of all memory folders to the successful prompt pattern, measuring the mean square error between each training pattern and the successful prompt pattern, and selecting the "hit" memory folder as the memory folder containing the pattern whose difference from the successful prompt pattern has the smallest mean square error of all the patterns in all of the memory folders.

In another aspect, the invention provides an embodiment (9), the cognitive memory system of (5), wherein the input data, images, or patterns are visual patterns.

In another aspect, the invention provides an embodiment (10), the cognitive memory system of (5), wherein the prompt patterns are derived from a single visual query pattern by pre-processing, including a pre-processing selected from the set consisting of at least one of a rotation, a translation, a scaling, a brightness change, a contrast change, a frequency or spatial frequency filter, and any combination of these.

In another aspect, the invention provides an embodiment (11), the cognitive memory system of (5), wherein the input data, images, or patterns are both visual and auditory patterns.

In another aspect, the invention provides an embodiment (12), the cognitive memory system of (5), wherein the prompt patterns are derived from: (a) a single auditory input query pattern by pre-processing, including time dilation and contraction, amplitude scaling, spectrum-analysis, and translation in time; and (b) a single visual input query pattern by pre-processing, including rotation, translation, scale change, brightness change, and contrast change.

In another aspect, the invention provides an embodiment (13), the cognitive memory system of (5), wherein the cognitive memory system can be expanded in memory capacity by replicating said cognitive memory system, adding more segments, each segment having its own memory folders and autoassociative neural network, wherein: (a) input data, images or patterns arrive at the inputs of all segments on a common data bus; (b) each segment makes empty memory folders available for input data recording; and (c) prompt patterns arrive at all the same segments on a common data bus for simultaneous sensing of said autoassociative neural networks, so that access time does not increase as size of memory is scaled up.

In another aspect, the invention provides an embodiment (14), an aircraft navigation system comprising: (a) a cognitive memory system as in (5), wherein the input data, images or patterns are multiple photographs of a geographic area of the Earth, wherein each photograph is stored together with its geographic location in a single folder; (b) a telescope on an aircraft looking down toward the earth; and (c) a window scanning over the field of view of the telescope, wherein the window scans by rotation, translation, scaling, brightness adjustment, and contrast adjustment, to provide prompt patterns for the cognitive memory system; so that the track of the aircraft, comprising a sequence of determined locations and headings of the aircraft, is calculated from the amount of translation and rotation required to find successive successful prompt patterns for the cognitive memory system and the geographic locations of the photographs of the Earth in the "hit" memory folders of the cognitive memory system.

In another aspect, the invention provides an embodiment (15), a satellite or aerial surveillance system, comprising: (a) a cognitive memory system as in (5), wherein the input data, images, or patterns to be stored in the memory folders of the cognitive memory system are satellite or aerial photographs of the objects of interest, and the respective identities of the objects of interest are stored as ancillary data, wherein the autoassociative neural network of the cognitive memory system is trained with the input data, images, or patterns stored in the memory folders; (b) a telescope or other optical or sensor device, which is onboard an aircraft or on a satellite, looking down toward the earth taking photographs of the earth to provide the input data, images, or patterns to the cognitive memory system; and (c) a window scanning over the photographs taken of the field of view of the telescope, wherein the window scans by rotation, translation, scaling, brightness adjustment, and contrast adjustment, to provide prompt patterns for the cognitive memory system; whereby the identities of objects of interest that may be present in the satellite or aerial photographs are delivered as outputs of the "hit" memory folders of the cognitive memory system, and whereby locations and orientations of objects of interest that may be present in the satellite or aerial photographs are calculated from the amount of translation and rotation required to find the successful prompt patterns for the cognitive memory system.

In another aspect, the invention provides an embodiment (16), a character recognition system comprising: (a) a cognitive memory system as in (5), wherein the input data, images, or patterns to be stored in the memory folders are written or printed characters, logos, street traffic signs, etc., wherein many versions of each type of the characters stored in a separate memory folder, and the identification of each the character is stored as ancillary data in the same the memory folder as the versions of the character, wherein variations of each character corresponding to distortion, perspective, rotation, translation, brightness adjustment, scale, contrast adjustment, partial occlusion, wherein the autoassociative neural network of the cognitive memory system is trained with the input data, images, or patterns stored in the memory folders; (b) a camera photographing characters on paper, on other media, or elsewhere to provide the input data, images or patterns to the cognitive memory system; and (c) a window scanning over the photographs taken by the camera wherein the window scans by rotation, translation, scaling, brightness adjustment, and contrast adjustment, to provide the prompt patterns for the cognitive memory system; so that the identities of the characters that may be present in the photographs are delivered as outputs of "hit" memory folders of the cognitive memory system, and whereby locations, orientations, and relative positions of the characters that may be present in the photographs are calculated from the amount of translation and rotation required to find the successful prompt patterns for the cognitive memory system.

In another aspect, the invention provides an embodiment (17), a face (e.g. human face) recognition system for recognizing person's faces contained in a query photograph comprising: (a) images of faces of interest and respective ancillary data stored in memory folders of a computer or other information appliance, where the faces are trained into an autoassociative neural network; (b) a variable window that can be scanned over the query photograph by, for example, translation, rotation, scaling, brightness adjustment, or contrast adjustment that provides prompt input patterns to the autoassociative neural network; (c) means for measuring the error between the input and output patterns of the autoassociative neural network, and comparing the error to a pre-set threshold; (d) means for selecting successful prompt patterns whose measured errors are less than the pres-set threshold value; (e) means for comparing on a pixel-by-pixel basis the successful prompt patterns with the patterns stored in the memory folders; (f) means for selecting the "hit" memory folder that contains patterns that most closely match the successful prompt patterns; and (g) means for delivering the contents of the "hit" folder as the output, where the contents include the identity of the person's face that most closely matches a person's face in the query photograph.

In another aspect, the invention provides an embodiment (18), a face (e.g. human face) recognition system comprising: (a) a cognitive memory system as in (5), wherein the input data, images, or patterns to be stored in the memory folders of the cognitive memory system are high-resolution photographs of persons of interest, including their faces, wherein one or many photographs of the same person are stored in the same memory folder, and the identity of each the person is stored as ancillary data in the same the memory folder as the one or many photographs of the person, wherein the autoassociative neural network of the cognitive memory system is trained with the input data, images, or patterns stored in the memory folders; (b) high-resolution photographs of the persons of interest providing the input data, images, or patterns to the cognitive memory system; (c) means for producing low-resolution versions of the high-resolution photographs stored in the memory folders; (d) a low-resolution autoassociative neural network trained by the low-resolution versions of the high-resolution photographs stored in memory folders; (e) means providing high-resolution photographs of persons to provide high-resolution input query patterns for the cognitive memory system; (f) means for producing low-resolution versions of the high-resolution input query patterns; (g) a low-resolution window scanning over the low-resolution versions of the high-resolution input query patterns, wherein the low-resolution window scans by rotation, translation, scaling, brightness adjustment, and contrast adjustment, to provide prompt patterns to the low-resolution autoassociative neural network, whereby the location, orientation and scale of detected facial images within the high-resolution input query patterns are calculated from the amount of translation, rotation and scaling required to find the successful prompt patterns for the low-resolution autoassociative neural network; (h) a high-resolution window, having an initial location, orientation and scale corresponding to the location, orientation and scale of the detected facial images as determined by the low-resolution autoassociative neural network, and scanning over the high-resolution input query patterns, wherein the high-resolution window scans by rotation, translation, scaling, brightness adjustment, and contrast adjustment to provide high-resolution prompt patterns for the autoassociative neural network of said cognitive memory system; (i) successful high-resolution prompt patterns that produce errors lower than a pre-set threshold when sensed by the autoassociative neural network; (j) means for comparing the successful high-resolution prompt patterns on a pixel-by-pixel basis with all patterns stored in the memory folders, where the memory folder that contains patterns that best match each of the successful high-resolution prompt patterns is identified as the "hit" folder; and (k) means for delivering as output the contents of the "hit" folder, which contains the identity of the stored facial images that correspond with the faces in the input query photograph.

In another aspect, the invention provides an embodiment (19), a security checkpoint system comprising: (a) a human face recognition system as in (18) functioning as a detection system; (b) cameras or other sensors for obtaining high-resolution photographs at a security checkpoint that provide the high-resolution input query patterns for the detection system; and (c) an alarm or notification system; whereby the persons of interest passing through the security checkpoint system are detected and identified by the detection system, and the alarm system can be activated based on the outcome of the detection and identification process.

In another aspect, the invention provides an embodiment (20), a surveillance system comprising: (a) multiple security checkpoint systems as in (19); (b) an intelligence center; (c) a means of two-way communication between the security checkpoint systems and the intelligence center; (d) a data base located at the intelligence center that contains facial images of persons of interest and identities of the persons of interest; and (e) a computer or other information appliance located at the intelligence center that is capable of training the facial images of the persons of interest into an autoassociative neural network, and transmitting the weights, the structure, and the training patterns of the autoassociative neural network via the means of two-way communication to the security checkpoint systems, whereupon the weights, structure and training patterns of the autoassociative neural network are copied into the cognitive memories of the detection systems of the security checkpoint systems; (f) whereby the persons of interest who pass through the security checkpoint systems are detected and identified, whereupon the detection event is transmitted via the means of two-way communication to the intelligence center, and new high-resolution photographs of the persons of interest that were taken at the security checkpoint, are transmitted via the means of two-way communication to the intelligence center to be added to the data base for further training.

In another aspect, the invention provides an embodiment (21), a photographic search engine for a computer or other information appliance, wherein photographs stored in the computer or other information appliance are accessible to the photographic search engine, and are retrieved in response to receipt of a query consisting of a photograph, the query photograph, which has a relationship to the photographs stored in the computer or other information appliance.

In another aspect, the invention provides an embodiment (22), a photographic search engine for a computer or other information appliance, wherein photographs stored in the computer or other information appliance are accessible to the photographic search engine, and are retrieved in response to receipt of a query consisting of text and a photograph which both have a relationship to the photographs stored in the computer or other information appliance.

In another aspect, the invention provides an embodiment (23), the photographic search engine for a computer or other information appliance of (21), wherein the query photograph has one or more objects of interest or people's faces, and the photographs stored in the computer or other information appliance are retrieved in response to receipt of a query photograph containing at least one object of interest or person's face in common with the photographs stored in the computer or other information appliance.

In another aspect, the invention provides an embodiment (24), a photographic search engine for a computer or other information appliance, wherein photographs stored in the computer or other information appliance are accessible to the photographic search engine, and are retrieved in response to receipt of a query consisting of a photograph, the query photograph, where the query photograph has one or more objects of interest or people's faces, and the photographs stored in the computer or other information appliance contain objects of interest or people's faces, where the photographic search engine has: (a) first means for locating the objects of interest or people's faces in both the query photograph and in the photographs stored in the computer or other information appliance; and (b) second means for relating the objects of interest in the query photograph to corresponding objects in the photographs stored in the computer or other information appliance.

In another aspect, the invention provides an embodiment (25), the photographic search engine for a computer or other information appliance of (24), wherein: (a) the first means of the photographic search engine for locating objects of interest or people's faces is based on a low-resolution autoassociative neural network trained on low-resolution photographs of an arbitrary selection of the people's faces or multiple variations of the objects of interest; and (b) the second means of the photographic search engine for relating objects of interest or people's faces is based on high-resolution autoassociative neural networks, each trained on high-resolution photographs of a single person's face or on a single object of interest.

In another aspect, the invention provides an embodiment (26), the photographic search engine for a computer or other information appliance of (25), wherein: (a) the low-resolution autoassociative neural network of the photographic search engine, already trained, senses input prompt patterns generated by a window scanning over each the photograph stored in the computer or information appliance by rotation, translation, scaling, variation in brightness, and variation in contrast, seeking a low error in the difference between the input and sensed output of the low-resolution autoassociative neural network, where the low error in the difference, when below a pre-set threshold, indicates a detected object of interest or person's face, and the corresponding position, orientation, and scale is recorded; (b) each high-resolution autoassociative neural network of the photographic search engine, already trained on a specific object of interest or a specific person's facial image, receives input patterns generated by a window scanning over each the photograph stored in the computer or information appliance, initiated in each the position, orientation and scale of the detected objects of interest or persons' faces recorded from the low-resolution procedure; (c) the scanning performs rotation, translation, scaling, brightness adjustment, and contrast adjustment, seeking a low error in the difference between the input and sensing output of the high-resolution autoassociative neural network; and (d) the low error in the difference, when below a pre-set threshold, indicates a hit and the corresponding photograph stored in the computer or information appliance is delivered as an output of the search.

In another aspect, the invention provides an embodiment (27), a photographic search engine for the World Wide Web or other types of networks of information appliances, wherein: (a) photographs and documents containing photographs stored on web servers or other types of information storage appliances are accessible to the photographic search engine, and paths, addresses, or universal resource locators (URL's) that refer to the photographs and the documents containing photographs; and (b) the paths, addresses, or URL's are retrieved in response to receipt of a query consisting of a photograph, the query photograph, which has a relationship to the photographs and documents containing photographs stored on the web servers or other types of information storage appliances.

In another aspect, the invention provides an embodiment (28), a photographic search engine for the World Wide Web or other types of networks of information appliances, wherein: (a) photographs and documents containing photographs stored on web servers or other types of information storage appliances are accessible to the photographic search engine, and paths, addresses, or universal resource locators (URL's) that refer to the photographs and the documents containing photographs; and (b) the paths addresses, or URL's are retrieved in response to receipt of a query consisting of text and a query photograph, which have a relationship to the photographs and documents containing photographs stored on the web servers or other types of information storage appliances.

In another aspect, the invention provides an embodiment (29), the photographic search engine for the World Wide Web or other network of information storage appliances of (27), wherein the query photograph has one or more objects of interest or people's faces, and the photographs stored on the web servers or the other types of information storage appliances are retrieved in response to receipt of a query photograph containing at least one object of interest or person's face in common with the photographs stored on the web servers or the other types of information storage appliances.

In another aspect, the invention provides an embodiment (30), a photographic search engine for the World Wide Web or other network of information appliances, wherein photographs are stored on web servers or other information storage appliances are accessible to the photographic search engine, and are retrieved in response to receipt of a query consisting of a photograph, the query photograph, where the query photograph has one or more objects of interest or people's faces, and the photographs stored on the web servers or the other information storage appliances contain objects of interest or people's faces, where the photographic search engine has: (a) first means for locating the objects of interest or people's faces in both the query photograph and in the photographs stored on the web servers or the other information storage appliances; and (b) second means for relating the objects of interest in the query photograph to corresponding objects in the photographs stored on the web servers or the other information storage appliances.

In another aspect, the invention provides an embodiment (31), the photographic search engine for the World Wide Web or other network of information appliances of (10) comprising: (a) means for crawling the World Wide Web or other network of information appliances to collect photographs and the paths, addresses, or URL's of the photographs or of documents containing the photographs; (b) means for locating images of objects of interest or people's faces from the photographs, and storing the located images with the paths, addresses, or URL's of the photographs or the documents containing the photographs in a buffer; (c) means for storing the located images and their respective paths, addresses or URL's in the photographic search engine; (d) means for detecting if the located images contain objects of interest or people's faces that are contained in located images already stored in the photographic search engine; (e) means for storing together in a list all paths, addresses and URL's of all the located images containing the same object of interest or person's face; and (f) means for responding to a query photograph, and providing as a search output the list of all paths, addresses, and URL's for each located image related to the query photograph.

In another embodiment, the photographic or image search engine is further defined to require a relationship exists between a query photograph or query image and the photographs or images and documents containing photographs or images stored on the web servers or other types of information storage appliances; and the relationship is detected and confirmed by sensing a plurality of autoassociative neural networks, each having weights that were trained off-line with training patterns which were or were derived from the photographs or images and documents containing photographs stored on the web servers or other types of information appliances.

In another embodiment, the photographic search engine of wherein: the weights, having been trained on images of a first subject of interest such as a person or an object of interest, and the training patterns are downloaded, labeled by the subject of interest category description, and stored in the memory of a conventional computer or information appliance, thus freeing the photographic search engine to be retrained on a second subject of interest, and returning and downloading the weights and the training patterns into the photographic search engine when a new query arrives relating to the first subject of interest, thus greatly extending the usefulness, speed, and flexibility of the photographic search engine.

In another embodiment, the invention provides a database structure defined in a conventional memory storing the weights.

Additional Description

Various techniques, methods, procedures, and algorithms have been described in connection with the several embodiments of the invention. Aspects of these various techniques, methods, procedures, and algorithms are susceptible to implementation in either hardware, firmware, software, or any combination of these. For example, a particular techniques, method, procedure, and algorithm or combination of these may be implemented a special purpose hardware (such as using analog and/or digital circuits, ASICS, microprocessor, or other logic), or in software using a computer program or computer program product for execution within a processor, microprocessor, controller or the like logic element) either alone or in conjunction with a coupled memory and optionally with other input/output devices. Furthermore, where various means for performing a function or operation on data are performed within a computer, computer network, or information appliance, such means may include performing the function or operation using a computer program (software and/or firmware) executing within the computer, computer network, information appliance, or portion thereof.

The foregoing descriptions of specific embodiments and best mode of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A search engine for searching a computer or other information appliance, wherein said search engine seeks stored images, said stored images depicting persons' faces or objects of interest, wherein said stored images are retrieved in response to receipt of a query comprising a query image; said query image depicting one or more persons' faces, or depicting one or more objects of interest; wherein said search engine comprises:
    (a) first means for locating images of persons' faces or objects of interest within both said query image and said stored images, said first means comprising:
        i. first autoassociative neural network trained on first low resolution input patterns and first variations, wherein each of said first low resolution input patterns depicts one person's face or one object of interest, wherein each of said first low resolution input patterns and said first variations contains 2000 or fewer pixels, and wherein said first variations are created from said first low resolution input patterns by at least one of or any combination of rotation, translation, changes in scale, brightness, and contrast, and other image processing techniques;
        ii. first window means for scanning over said query image and over all said stored images, creating second low resolution input patterns and second variations, said second variations generated by at least one of or any combination of rotation, translation, changes in scale, brightness, and contrast, spatial filtering, frequency filtering, spatial frequency filtering, edge detection, perspective transformation, warping, distorting, distortion correction, image to image registration, gray-level histogram modification or equalization, adjusting color characteristics, varying or adjusting color saturation, removing color, distending, compressing, squeezing, shearing, and changes in intensity;
        iii. means for applying, as inputs to trained said first autoassociative neural network, said second low resolution input patterns and said second variations, seeking a low error in the difference between the input and output of said first autoassociative neural network, where said low error in difference, when below a preset threshold, indicates a detected face or object of interest;
    (b) second means for interrelating said query image, depicting persons' faces or objects of interest, to stored images depicting the same persons' faces or objects of interest, said second means comprising:
        second autoassociative neural network trained on first high resolution input patterns and first high resolution variations, wherein each of said first high resolution input patterns depicts one detected person's face or object of interest, said detected person's face or object of interest detected in said query image by said first means, wherein each of said first high resolution input patterns and said first high resolution variations contains 2000 or more pixels, and wherein said first high resolution variations are created from said first high resolution input patterns by at least one of or any combinations of rotation, translation, changes in scale, brightness, and contrast, spatial filtering, frequency filtering, spatial frequency filtering, edge detection, perspective transformation, warping, distorting, distortion correction, image to image registration, gray-level histogram modification or equalization, adjusting color characteristics, varying or adjusting color saturation, removing color, distending, compressing, squeezing, shearing, and changes in intensity;
        ii. second window means for scanning over said stored images, creating second high resolution input patterns and second high resolution variations, said second high resolution variations generated by at least one of or any combinations of rotation, translation, changes in scale, brightness, and contrast, and other image processing techniques;
        iii. means for applying, as inputs to trained said second autoassociative neural network, said second high resolution input patterns and said second high resolution variations derived from a given stored image by said second window means, seeking a second low error in the difference between the input and output of said second autoassociative neural network; and
        iv. means for identifying the given stored image that is related to said query image, wherein said given stored image is related to said query image when said second low error is below a pre-set threshold; and
    (c) third means for delivering as output response to said query image said stored images related by said second means.

2. In a computer or other information appliance, a computer-implemented method for searching and interrelating stored original images, said stored original images depicting persons' faces or objects of interest, said method comprising:
    (a) assigning a unique identifier for each stored original image;
    (b) locating and segmenting images of faces or objects of interest depicted in each said stored original image;

(c) creating variations of each segmented image of said faces or objects of interest by at least one of or any combinations of rotation, translation, changes in scale, brightness, and contrast, spatial filtering, frequency filtering, spatial frequency filtering, edge detection, perspective transformation, warping, distorting, distortion correction, image to image registration, gray-level histogram modification or equalization, adjusting color characteristics, varying or adjusting color saturation, removing color, distending, compressing, squeezing, shearing, and changes in intensity;

(d) creating separate folders for storage of each segmented image of a face or object of interest, each of said folders further containing said variations generated from each said segmented image of a face or object of interest, each of said folders further containing said unique identifier of said stored original image from which said segmented image of a face or object of interest was derived, wherein a folder represents any means of associating the contents thereof;

(e) training an individual autoassociative neural network for each of said folders, the training patterns for said individual autoassociative neural network comprising the images and their respective variations stored in the respective folder, thus relating each said individual autoassociative neural network to the folder containing its training patterns;

(f) storing the weights and parameters of each trained said individual autoassociative neural network;

(g) applying input patterns to each trained autoassociative neural network, said input patterns comprising all images stored in all said folders;

(h) determining the error, the difference between a given input pattern and the corresponding output pattern of a particular trained autoassociative neural network;

(i) adding all unique identifiers stored in the folder of said given input pattern to the list of unique identifiers stored in the folder related to said particular trained autoassociative neural network, if said error is below a pre-set threshold; and (j) performing steps (h) and (i) for all pairings of input patterns and trained autoassociative neural networks;

whereby each of said folders contains a unique identifier or a set of unique identifiers, thereby connecting the images of faces or objects of interest in each folder to a stored original image or to a set of stored original images, and thereby interrelating stored original images that depict faces or objects of interest in common.

3. The method of claim 2, further comprising:
(a) grouping a particular folder with other folders when images stored in said other folders are applied as input patterns to the autoassociative neural network related to said particular folder and the error between input and output patterns of said autoassociative neural network is below a pre-set threshold;
(b) performing said grouping step for each folder and establishing all possible such groups, each such group containing all of the folders containing images of a given face or object of interest;
(c) attaching the name or keywords to a group if one or more of the folders of the group contain images that were derived from a stored original image in which segmented faces or objects of interest had been identified by said name or keywords; and
(d) attaching the name or keywords to a group if one or more of the images stored in the folders of the group were manually identified by said name or keywords.

4. The method of claim 2, further comprising:
(a) locating and segmenting images of faces or objects of interest depicted in a query image;
(b) creating query variations from each of the segmented images of faces or objects of interest depicted in said query image, said query variations created by at least one of or any combinations of rotation, translation, changes in scale, brightness, and contrast, spatial filtering, frequency filtering, spatial frequency filtering, edge detection, perspective transformation, warping, distorting, distortion correction, image to image registration, gray-level histogram modification or equalization, adjusting color characteristics, varying or adjusting color saturation, removing color, distending, compressing, squeezing, shearing, and changes in intensity;
(c) applying query input patterns to a given trained autoassociative neural network related to a given folder, said query input patterns comprising all segmented images of faces and objects of interest in the query image, said query input patterns further comprising all said query variations;
(d) determining the query error, the difference between a given query input pattern and the resulting output pattern from a given trained autoassociative neural network;
(e) delivering as part of the output response to the query image the stored original images corresponding to all unique identifiers stored in the folder corresponding to said given trained autoassociative network if said query error is below a pre-set threshold; and
(f) performing steps (c), (d), and (e) for said trained autoassociative neural networks corresponding to all said folders.

5. The method of claim 3, further comprising:
(a) identifying all matching groups, said all matching groups being all said groups with attached matching names or matching keywords, said matching names or matching keywords being those names or keywords that match the text of a text query;
(b) identifying all matching folders, said all matching folders being all folders of said all matching groups;
(c) identifying all matching unique identifiers, said all matching unique identifiers being all unique identifiers stored in said all matching folders; and
(d) delivering as output the original stored images corresponding to said all matching unique identifiers.

6. In a computer or other information appliance, a computer-implemented method for searching and interrelating stored original images, said stored original images depicting persons' faces or objects of interest, said method comprising:
(a) locating each stored original image;
(b) locating and segmenting images of faces or objects of interest depicted in each said stored original image;
(c) creating variations of each segmented image of said faces or objects of interest by at least one of or any combinations of rotation, translation, changes in scale, brightness, and contrast, spatial filtering, frequency filtering, spatial frequency filtering, edge detection, perspective transformation, warping, distorting, distortion correction, image to image registration, gray-level histogram modification or equalization, adjusting color characteristics, varying or adjusting color saturation, removing color, distending, compressing, squeezing, shearing, and changes in intensity;

(d) creating separate folders for storage of each image of a segmented face or object of interest, each of said folders further containing said variations generated from each said segmented image of a face or object of interest, wherein a folder represents any means of associating the contents thereof;

(e) training an individual autoassociative neural network for each of said folders, the training patterns for said individual autoassociative neural network comprising said segmented images of faces or objects of interest, and further comprising their respective said variations stored in the same folder;

(f) storing the weights and parameters of said individual autoassociative neural network;

(g) applying input patterns to each trained autoassociative neural network, said input patterns comprising all images stored in all said folders;

(h) grouping together the folder containing a given input pattern and the folder associated with a particular trained autoassociative neural network, whenever the error is below a pre-set threshold, wherein said error is the difference between said given input pattern and said particular trained autoassociative neural network output pattern;

(i) performing said grouping step for each folder and establishing all possible such groups, each such group containing all of the folders containing images of a given face or object of interest;

(j) attaching the name or keywords to a group if one or more of the folders of the group contain images that were derived from a stored original image in which segmented faces or objects of interest had been identified by said name or keywords; and (k) attaching the name or keywords to a group if one or more of the images stored in the folders of the group were manually identified by said name or keywords.

7. The method of claim 6, further comprising:

(a) locating and segmenting images of faces or objects of interest depicted in a query image;

(b) creating query variations from each of the segmented images of faces or objects of interest depicted in the query image, said query variations created by at least one of or any combinations of rotation, translation, changes in scale, brightness, and contrast, spatial filtering, frequency filtering, spatial frequency filtering, edge detection, perspective transformation, warping, distorting, distortion correction, image to image registration, gray-level histogram modification or equalization, adjusting color characteristics, varying or adjusting color saturation, removing color, distending, compressing, squeezing, shearing, and changes in intensity;

(c) applying query input patterns to a given trained autoassociative neural network associated with a given folder, said query input patterns comprising all segmented images of faces or objects of interest in the query image, said query input patterns further comprising all said query variations;

(d) determining the query error, said query error being the difference between a given query input pattern and the resulting output pattern from a given trained autoassociative neural network;

(e) delivering as part of the output response to the query the name or keywords attached to the group containing the folder corresponding to said given trained autoassociative neural network if said query error is below a pre-set threshold; and (f) performing steps (c), (d), and (e) for said trained autoassociative neural networks corresponding to all said folders.

8. In a computer or other information appliance, a computer-implemented method for searching and interrelating original images, said original images depicting persons' faces or objects of interest, wherein said original images are stored on web servers or other information storage appliances, wherein said original images are accessible to said computer or other information appliance, said method comprising:

(a) crawling or searching a computer network, the World Wide Web, or other types of interconnected networks, to collect original images and their universal resource locators, URLs, said URLs indicating the locations of said collected original images;

(b) locating and segmenting images of faces or objects of interest depicted in collected original images;

(c) creating variations of each segmented image of said faces or objects of interest by at least one of or any combinations of rotation, translation, changes in scale, brightness, and contrast, spatial filtering, frequency filtering, spatial frequency filtering, edge detection, perspective transformation, warping, distorting, distortion correction, image to image registration, gray-level histogram modification or equalization, adjusting color characteristics, varying or adjusting color saturation, removing color, distending, compressing, squeezing, shearing, and changes in intensity;

(d) creating a single folder for storage of said each segmented image of a face or an object of interest, each said single folder further containing said variations generated from each said segmented image of a face or an object of interest, each said single folder further containing the URL of said collected original image from which said segmented image of a face or object of interest was derived, wherein a folder represents any means of associating the contents thereof;

(e) applying input patterns to an autoassociative neural network, said input patterns comprising the images contained within said single folder;

(f) determining the error, wherein said error is the difference between one of said input patterns from one said single folder and the corresponding output pattern from said autoassociative neural network;

(g) training said autoassociative neural network with the patterns contained in said single folder, if said error is above a pre-set threshold for every pattern in said single folder;

(h) performing the following steps for a hit pattern in said single folder, wherein said hit pattern is a pattern for which said error is below said pre-set threshold:

i. comparing said hit pattern to all patterns in all other folders; and ii. adding the hit URL to the folder containing the matching pattern, wherein said matching pattern is the pattern having the smallest difference between said matching pattern and said hit pattern, wherein said hit URL is the URL in the folder containing said hit pattern; and (i) performing steps (d), (e), (f), (g), and (h) for each said segmented image;

whereby each folder contains a URL or a set of URLs, thereby connecting the images of faces or objects of interest in each folder to an original image or to a set of original images, thus interrelating original images depicting faces or objects of interest that are in common.

9. The method of claim 8, further comprising:
(a) locating and segmenting images of faces or objects of interest depicted in a query image;
(b) creating query variations from each of the segmented images of faces or objects of interest depicted in said query image, said query variations created by at least one of or any combinations of rotation, translation, changes in scale, brightness, and contrast, spatial filtering, frequency filtering, spatial frequency filtering, edge detection, perspective transformation, warping, distorting, distortion correction, image to image registration, gray-level histogram modification or equalization, adjusting color characteristics, varying or adjusting color saturation, removing color, distending, compressing, squeezing, shearing, and changes in intensity;
(c) applying query input patterns to said autoassociative neural network, said query input patterns comprising all segmented images of faces or objects of interest in the query image, said query input patterns further comprising all said query variations;
(d) determining the query error for each query input pattern, wherein said query error is the difference between a given query input pattern and the resulting output pattern from said autoassociative neural network; and
(e) performing the following steps for each query hit pattern, wherein a query hit pattern is a query input pattern resulting in a query error below a pre-set threshold:
  i. comparing said query hit pattern to all patterns in each said folder; and
  ii. delivering as part of the output response to the query image the one or more URLs contained in the folder containing the query matching pattern, wherein said query matching pattern is the pattern having the smallest difference between said query matching pattern and said query hit pattern.

10. In a computer or other information appliance, a computer-implemented method for searching and interrelating original images, said original images depicting persons faces or objects of interest, wherein said original images are stored on web servers or other information storage appliances, wherein said original images are accessible to said computer or other information appliance, said method comprising:
(a) crawling or searching a computer network, the World Wide Web, or other types of interconnected networks, to collect original images and their universal resource locators, URLs, said URLs indicating the locations of said collected original images;
(b) locating and segmenting images of faces or objects of interest depicted in collected original images;
(c) creating variations of each segmented image of said faces or objects of interest by at least one of or any combinations of rotation, translation, changes in scale, brightness, and contrast, spatial filtering, frequency filtering, spatial frequency filtering, edge detection, perspective transformation, warping, distorting, distortion correction, image to image registration, gray-level histogram modification or equalization, adjusting color characteristics, varying or adjusting color saturation, removing color, distending, compressing, squeezing, shearing, and changes in intensity;

(d) creating a single folder for storage of said each segmented image of a face or an object of interest, each said single folder further containing said variations generated from each said segmented image of a face or an object of interest, each said single folder further containing the URL of said collected original image from which said segmented image of a face or object of interest was derived, wherein a folder represents any means of associating the contents thereof;
(e) applying input patterns to each autoassociative neural network of a plurality of autoassociative neural networks, said input patterns comprising the images contained within said single folder;
(f) determining the errors, wherein said errors are the differences between one of said input patterns from one said single folder and the corresponding output pattern from said plurality of autoassociative neural networks;
(g) training one of said autoassociative neural networks with the patterns contained in said single folder thereby associating said single folder with said one of said autoassociative neural networks, if all said errors are above a pre-set threshold for every pattern in said single folder;
(h) performing the following steps for a hit pattern in said single folder, wherein said hit pattern is a pattern for which said error is below said pre-set threshold:
  i. comparing said hit pattern to all patterns in all folders associated with any of said autoassociative neural networks whose error, when presented with said hit pattern, is below said pre-set threshold; and
  ii. adding the hit URL to the folder containing the matching pattern, wherein said matching pattern is the pattern having the smallest difference between said matching pattern and said hit pattern, wherein said hit URL is the URL in the folder containing said hit pattern; and
(i) performing steps (d), (e), (f), (g), and (h) for each said segmented image;
whereby each folder contains a URL or a set of URLs, thereby connecting the images of faces or objects of interest in each folder to an original image or to a set of original images, thus interrelating original images depicting faces or objects of interest that are in common.

11. The method of claim 10, further comprising:
(a) locating and segmenting images of faces or objects of interest depicted in a query image;
(b) creating query variations from each of the segmented images of faces or objects of interest depicted in said query image, said query variations created by at least one of or any combinations of rotation, translation, changes in scale, brightness, and contrast, spatial filtering, frequency filtering, spatial frequency filtering, edge detection, perspective transformation, warping, distorting, distortion correction, image to image registration, gray-level histogram modification or equalization, adjusting color characteristics, varying or adjusting color saturation, removing color, distending, compressing, squeezing, shearing, and changes in intensity;
(c) applying query input patterns to said each autoassociative neural network of a plurality of autoassociative neural networks, said query input patterns comprising all segmented images of faces or objects of interest in the query image, said query input patterns further comprising all said query variations;

(d) determining the query errors for each query input pattern, wherein said query errors are the differences between a given query input pattern and the resulting output patterns from all said autoassociative neural networks; and (e) performing the following steps for each query hit pattern, wherein a query hit pattern is a query input pattern resulting in a query error below a query pre-set threshold:

i. comparing said query hit pattern to all patterns in all folders associated with any of said autoassociative neural networks whose query error, when presented with said query hit pattern, is below said query pre-set threshold; and ii. delivering as part of the output response to the query image the one or more URLs contained in the folder containing the query matching pattern, wherein said query matching pattern is the pattern having the smallest difference between said query matching pattern and said query hit pattern.

12. The method of claim 11, further comprising:

(a) compiling a list of all image URLs, wherein said image URLs are URLs delivered as part of the output response to said input query image, wherein said input query image is the image component of an input query;

(b) compiling a list of all text URLs, wherein said text URLs are URLs delivered as the output response to a keyword search of a computer, a network of computers, the World Wide Web, or other interconnected networks of computers, wherein said keyword search is performed in response to the keyword component of said input query; and (c) delivering as the output to said input query all URLs that are in common to said list of all image URLs and to said list of all text URLs.

13. A computer program product for use with a computer or information appliance comprising: a computer operable medium having computer readable code, the computer readable code being effective to perform a computer-implemented method for searching and interrelating stored original images, said stored original images depicting persons' faces or objects of interest, said computer-implemented method comprising:

(a) assigning a unique identifier for each stored original image;

(b) locating and segmenting images of faces or objects of interest depicted in each said stored original image;

(c) creating variations of each segmented image of said faces or objects of interest by at least one of or any combinations of rotation, translation, changes in scale, brightness, and contrast, spatial filtering, frequency filtering, spatial frequency filtering, edge detection, perspective transformation, warping, distorting, distortion correction, image to image registration, gray-level histogram modification or equalization, adjusting color characteristics, varying or adjusting color saturation, removing color, distending, compressing, squeezing, shearing, and changes in intensity;

(d) creating separate folders for storage of each segmented image of a face or object of interest, each of said folders further containing said variations generated from each said segmented image of a face or object of interest, each of said folders further containing said unique identifier of said stored original image from which said segmented image of a face or object of interest was derived, wherein a folder represents any means of associating the contents thereof;

(e) training an individual autoassociative neural network for each of said folders, the training patterns for said individual autoassociative neural network comprising the images and their respective variations stored in the respective folder, thus relating each said individual autoassociative neural network to the folder containing its training patterns;

(f) storing the weights and parameters of each trained said individual autoassociative neural network;

(g) applying input patterns to each trained autoassociative neural network, said input patterns comprising all images stored in all said folders;

(h) determining the error, the difference between a given input pattern and the corresponding output pattern of a particular trained autoassociative neural network;

(i) adding all unique identifiers stored in the folder of said given input pattern to the list of unique identifiers stored in the folder related to said particular trained autoassociative neural network, if said error is below a pre-set threshold; and (j) performing steps (h) and (i) for all pairings of input patterns and trained autoassociative neural networks;

whereby each of said folders contains a unique identifier or a set of unique identifiers, thereby connecting the images of faces or objects of interest in each folder to a stored original image or to a set of stored original images, and thereby interrelating stored original images that depict faces or objects of interest in common.

14. A computer system for searching and interrelating stored images, said stored images depicting persons' faces or objects of interest, said computer system comprising:

(a) means for assigning a unique identifier for each stored original image;

(b) means for locating and segmenting images of faces or objects of interest depicted in each said stored original image;

(c) means for creating variations of each segmented image of said faces or objects of interest by at least one of or any combinations of rotation, translation, changes in scale, brightness, and contrast, spatial filtering, frequency filtering, spatial frequency filtering, edge detection, perspective transformation, warping, distorting, distortion correction, image to image registration, gray-level histogram modification or equalization, adjusting color characteristics, varying or adjusting color saturation, removing color, distending, compressing, squeezing, shearing, and changes in intensity;

(d) means for creating separate folders for storage of each segmented image of a face or object of interest, each of said folders further containing said variations generated from each said segmented image of a face or object of interest, each of said folders further containing said unique identifier of said stored original image from which said segmented image of a face or object of interest was derived, wherein a folder represents any means of associating the contents thereof;

(e) means for training an individual autoassociative neural network for each of said folders, the training patterns for said individual autoassociative neural network comprising the images and their respective variations stored in the respective folder, thus relating each said individual autoassociative neural network to the folder containing its training patterns;

(f) means for storing the weights and parameters of each trained said individual autoassociative neural network;

(g) means for applying input patterns to each trained autoassociative neural network, said input patterns comprising all images stored in all said folders;

(h) means for determining the error, the difference between a given input pattern and the corresponding output pattern of a particular trained autoassociative neural network;

(i) means for adding all unique identifiers stored in the folder of said given input pattern to the list of unique identifiers stored in the folder related to said particular trained autoassociative neural network, if said error is below a pre-set threshold; and (j) means for performing steps (h) and (i) for all pairings of input patterns and trained autoassociative neural networks;

whereby each of said folders contains a unique identifier or a set of unique identifiers, thereby connecting the images of faces or objects of interest in each folder to a stored original image or to a set of stored original images, and thereby interrelating stored original images that depict faces or objects of interest in common.

15. A computer program product for use with a computer or information appliance comprising: a computer operable medium having computer readable code, the computer readable code being effective to perform a computer-implemented method for searching and interrelating stored original images, said stored original images depicting persons faces or objects of interest, said method comprising:

(a) locating each stored original image;

(b) locating and segmenting images of faces or objects of interest depicted in each said stored original image;

(c) creating variations of each segmented image of said faces or objects of interest by at least one of or any combinations of rotation, translation, changes in scale, brightness, and contrast, spatial filtering, frequency filtering, spatial frequency filtering, edge detection, perspective transformation, warping, distorting, distortion correction, image to image registration, gray-level histogram modification or equalization, adjusting color characteristics, varying or adjusting color saturation, removing color, distending, compressing, squeezing, shearing, and changes in intensity;

(d) creating separate folders for storage of each image of a segmented face or object of interest, each of said folders further containing said variations generated from each said segmented image of a face or object of interest, wherein a folder represents any means of associating the contents thereof;

(e) training an individual autoassociative neural network for each of said folders, the training patterns for said individual autoassociative neural network comprising said segmented images of faces or objects of interest, and further comprising their respective said variations stored in the same folder;

(f) storing the weights and parameters of said individual autoassociative neural network;

(g) applying input patterns to each trained autoassociative neural network, said input patterns comprising all images stored in all said folders;

(h) grouping together the folder containing a given input pattern and the folder associated with a particular trained autoassociative neural network, whenever the error is below a pre-set threshold, wherein said error is the difference between said given input pattern and said particular trained autoassociative neural network output pattern;

(i) performing said grouping step for each folder and establishing all possible such groups, each such group containing all of the folders containing images of a given face or object of interest;

(j) attaching the name or keywords to a group if one or more of the folders of the group contain images that were derived from a stored original image in which segmented faces or objects of interest had been identified by said name or keywords; and (k) attaching the name or keywords to a group if one or more of the images stored in the folders of the group were manually identified by said name or keywords.

16. A computer system for searching and interrelating stored original images, said stored original images depicting persons faces or objects of interest, said system comprising:

(a) means for locating each stored original image;

(b) means for locating and segmenting images of faces or objects of interest depicted in each said stored original image;

(c) means for creating variations of each segmented image of said faces or objects of interest by at least one of or any combinations of rotation, translation, changes in scale, brightness, and contrast, spatial filtering, frequency filtering, spatial frequency filtering, edge detection, perspective transformation, warping, distorting, distortion correction, image to image registration, gray-level histogram modification or equalization, adjusting color characteristics, varying or adjusting color saturation, removing color, distending, compressing, squeezing, shearing, and changes in intensity;

(d) means for creating separate folders for storage of each image of a segmented face or object of interest, each of said folders further containing said variations generated from each said segmented image of a face or object of interest, wherein a folder represents any means of associating the contents thereof;

(e) means for training an individual autoassociative neural network for each of said folders, the training patterns for said individual autoassociative neural network comprising said segmented images of faces or objects of interest, and further comprising their respective said variations stored in the same folder;

(f) means for storing the weights and parameters of said individual autoassociative neural network;

(g) means for applying input patterns to each trained autoassociative neural network, said input patterns comprising all images stored in all said folders;

(h) means for grouping together the folder containing a given input pattern and the folder associated with a particular trained autoassociative neural network, whenever the error is below a pre-set threshold, wherein said error is the difference between said given input pattern and said particular trained autoassociative neural network output pattern;

(i) means for performing said grouping step for each folder and establishing all possible such groups, each such group containing all of the folders containing images of a given face or object of interest;

(j) means for attaching the name or keywords to a group if one or more of the folders of the group contain images that were derived from a stored original image in which segmented faces or objects of interest had been identified by said name or keywords; and (k) means for attaching the name or keywords to a group if one or more of the images stored in the folders of the group were manually identified by said name or keywords.

17. A computer program product for use with a computer or information appliance comprising: a computer operable medium having computer readable code, the computer readable code being effective to perform a computer-implemented method for searching and interrelating original images, said original images depicting persons' faces or objects of interest, wherein said original images are stored on web servers or other information storage appliances, wherein said original images are accessible to said computer or other information appliance, said method comprising:
  (a) crawling or searching a computer network, the World Wide Web, or other types of interconnected networks, to collect original images and their universal resource locators, URLs, said URLs indicating the locations of said collected original images;
  (b) locating and segmenting images of faces or objects of interest depicted in collected original images;
  (c) creating variations of each segmented image of said faces or objects of interest by at least one of or any combinations of rotation, translation, changes in scale, brightness, and contrast, spatial filtering, frequency filtering, spatial frequency filtering, edge detection, perspective transformation, warping, distorting, distortion correction, image to image registration, gray-level histogram modification or equalization, adjusting color characteristics, varying or adjusting color saturation, removing color, distending, compressing, squeezing, shearing, and changes in intensity;
  (d) creating a single folder for storage of said each segmented image of a face or an object of interest, each said single folder further containing said variations generated from each said segmented image of a face or an object of interest, each said single folder further containing the URL of said collected original image from which said segmented image of a face or object of interest was derived, wherein a folder represents any means of associating the contents thereof;
  (e) applying input patterns to an autoassociative neural network, said input patterns comprising the images contained within said single folder;
  (f) determining the error, wherein said error is the difference between one of said input patterns from one said single folder and the corresponding output pattern from said autoassociative neural network;
  (g) training said autoassociative neural network with the patterns contained in said single folder, if said error is above a pre-set threshold for every pattern in said single folder;
  (h) performing the following steps for a hit pattern in said single folder, wherein said hit pattern is a pattern for which said error is below said pre-set threshold:
    i. comparing said hit pattern to all patterns in all other folders; and
    ii. adding the hit URL to the folder containing the matching pattern, wherein said matching pattern is the pattern having the smallest difference between said matching pattern and said hit pattern, wherein said hit URL is the URL in the folder containing said hit pattern; and
  (i) performing steps (d), (e), (f), (g), and (h) for each said segmented image;
  whereby each folder contains a URL or a set of URLs, thereby connecting the images of faces or objects of interest in each folder to an original image or to a set of original images, thus interrelating original images depicting faces or objects of interest that are in common.

18. A computer system for searching and interrelating original images depicting persons' faces or objects of interest, wherein said original images are stored on external web servers or other information storage appliances, and wherein said original images are accessible to said computer system, said system comprising:
  (a) means for crawling or searching a computer network, the World Wide Web, or other types of interconnected networks, to collect original images and their universal resource locators, URLs, said URLs indicating the locations of said collected original images;
  (b) means for locating and segmenting images of faces or objects of interest depicted in collected original images;
  (c) means for creating variations of each segmented image of said faces or objects of interest by at least one of or any combinations of rotation, translation, changes in scale, brightness, and contrast, spatial filtering, frequency filtering, spatial frequency filtering, edge detection, perspective transformation, warping, distorting, distortion correction, image to image registration, gray-level histogram modification or equalization, adjusting color characteristics, varying or adjusting color saturation, removing color, distending, compressing, squeezing, shearing, and changes in intensity;
  (d) means for creating a single folder for storage of said each segmented image of a face or an object of interest, each said single folder further containing said variations generated from each said segmented image of a face or an object of interest, each said single folder further containing the URL of said collected original image from which said segmented image of a face or object of interest was derived, wherein a folder represents any means of associating the contents thereof;
  (e) means for applying input patterns to an autoassociative neural network, said input patterns comprising the images contained within said single folder;
  (f) means for determining the error, wherein said error is the difference between one of said input patterns from one said single folder and the corresponding output pattern from said autoassociative neural network;
  (g) means for training said autoassociative neural network with the patterns contained in said single folder, if said error is above a pre-set threshold for every pattern in said single folder;
  (h) means for performing the following steps for a hit pattern in said single folder, wherein said hit pattern is a pattern for which said error is below said pre-set threshold:
    i. comparing said hit pattern to all patterns in all other folders; and
    ii. adding the hit URL to the folder containing the matching pattern, wherein said matching pattern is the pattern having the smallest difference between said matching pattern and said hit pattern, wherein said hit URL is the URL in the folder containing said hit pattern; and
  (i) means for performing steps (d), (e), (f), (g), and (h) for each said segmented image;
  whereby each folder contains a URL or a set of URLs, thereby connecting the images of faces or objects of interest in each folder to an original image or to a set of original images, thus interrelating original images depicting faces or objects of interest that are in common.

19. A computer program product for use with a computer or information appliance comprising: a computer operable medium having computer readable code, the computer readable code being effective to perform a computer-implemented method for searching and interrelating original images, said original images depicting persons' faces or objects of interest, wherein said original images are stored on web servers or other information storage appliances, wherein said original images are accessible to said computer or other information appliance, said method comprising:

(a) crawling or searching a computer network, the World Wide Web, or other types of interconnected networks, to collect original images and their universal resource locators, URLs, said URLs indicating the locations of said collected original images;

(b) locating and segmenting images of faces or objects of interest depicted in collected original images;

(c) creating variations of each segmented image of said faces or objects of interest by at least one of or any combinations of rotation, translation, changes in scale, brightness, and contrast, spatial filtering, frequency filtering, spatial frequency filtering, edge detection, perspective transformation, warping, distorting, distortion correction, image to image registration, gray-level histogram modification or equalization, adjusting color characteristics, varying or adjusting color saturation, removing color, distending, compressing, squeezing, shearing, and changes in intensity;

(d) creating a single folder for storage of said each segmented image of a face or an object of interest, each said single folder further containing said variations generated from each said segmented image of a face or an object of interest, each said single folder further containing the URL of said collected original image from which said segmented image of a face or object of interest was derived, wherein a folder represents any means of associating the contents thereof;

(e) applying input patterns to each autoassociative neural network of a plurality of autoassociative neural networks, said input patterns comprising the images contained within said single folder;

(f) determining the errors, wherein said errors are the differences between one of said input patterns from one said single folder and the corresponding output pattern from said plurality of autoassociative neural networks;

(g) training one of said autoassociative neural networks with the patterns contained in said single folder thereby associating said single folder with said one of said autoassociative neural networks, if all said errors are above a pre-set threshold for every pattern in said single folder;

(h) performing the following steps for a hit pattern in said single folder, wherein said hit pattern is a pattern for which said error is below said pre-set threshold:

i. comparing said hit pattern to all patterns in all folders associated with any of said autoassociative neural networks whose error, when presented with said hit pattern, is below said pre-set threshold; and ii. adding the hit URL to the folder containing the matching pattern, wherein said matching pattern is the pattern having the smallest difference between said matching pattern and said hit pattern, wherein said hit URL is the URL in the folder containing said hit pattern; and (i) performing steps (d), (e), (f), (g), and (h) for each said segmented image;

whereby each folder contains a URL or a set of URLs, thereby connecting the images of faces or objects of interest in each folder to an original image or to a set of original images, thus interrelating original images depicting faces or objects of interest that are in common.

20. A computer system for searching and interrelating original images depicting faces or objects of interest, wherein said original images are stored on web servers or other information storage appliances, and said original images are accessible to said computer system, said system further comprising:

(a) means for crawling or searching a computer network, the World Wide Web, or other types of interconnected networks, to collect original images and their universal resource locators, URLs, said URLs indicating the locations of said collected original images;

(b) means for locating and segmenting images of faces or objects of interest depicted in collected original images;

(c) means for creating variations of each segmented image of said faces or objects of interest by at least one of or any combinations of rotation, translation, changes in scale, brightness, and contrast, spatial filtering, frequency filtering, spatial frequency filtering, edge detection, perspective transformation, warping, distorting, distortion correction, image to image registration, gray-level histogram modification or equalization, adjusting color characteristics, varying or adjusting color saturation, removing color, distending, compressing, squeezing, shearing, and changes in intensity;

(d) means for creating a single folder for storage of said each segmented image of a face or an object of interest, each said single folder further containing said variations generated from each said segmented image of a face or an object of interest, each said single folder further containing the URL of said collected original image from which said segmented image of a face or object of interest was derived, wherein a folder represents any means of associating the contents thereof;

(e) means for applying input patterns to each autoassociative neural network of a plurality of autoassociative neural networks, said input patterns comprising the images contained within said single folder;

(f) means for determining the errors, wherein said errors are the differences between one of said input patterns from one said single folder and the corresponding output pattern from said plurality of autoassociative neural networks;

(g) means for training one of said autoassociative neural networks with the patterns contained in said single folder thereby associating said single folder with said one of said autoassociative neural networks, if all said errors are above a pre-set threshold for every pattern in said single folder;

(h) means for performing the following steps for a hit pattern in said single folder, wherein said hit pattern is a pattern for which said error is below said pre-set threshold:

i. comparing said hit pattern to all patterns in all folders associated with any of said autoassociative neural networks whose error, when presented with said hit pattern, is below said pre-set threshold; and ii. adding the hit URL to the folder containing the matching pattern, wherein said matching pattern is the pattern having the smallest difference between said matching pattern and said hit pattern, wherein said hit URL is the URL in the folder containing said hit pattern; and (i) means for performing steps (d), (e), (f), (g), and (h) for each said segmented image;

whereby each folder contains a URL or a set of URLs, thereby connecting the images of faces or objects of interest in each folder to an original image or to a set of original images, thus interrelating original images depicting faces or objects of interest that are in common.

* * * * *